(12) United States Patent
Kwak et al.

(10) Patent No.: US 9,913,299 B2
(45) Date of Patent: Mar. 6, 2018

(54) BROADCAST TRANSMISSION APPARATUS, OPERATION METHOD OF BROADCAST TRANSMISSION APPARATUS, BROADCAST RECEPTION APPARATUS, AND OPERATION METHOD OF BROADCAST RECEPTION APPARATUS

(71) Applicant: LG ELECTRONICS INC., Seoul (KR)

(72) Inventors: Minsung Kwak, Seoul (KR); Woosuk Kwon, Seoul (KR); Sejin Oh, Seoul (KR); Kyoungsoo Moon, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 42 days.

(21) Appl. No.: 14/906,985

(22) PCT Filed: Aug. 21, 2015

(86) PCT No.: PCT/KR2015/008766
§ 371 (c)(1),
(2) Date: Jan. 22, 2016

(87) PCT Pub. No.: WO2016/028118
PCT Pub. Date: Feb. 25, 2016

(65) Prior Publication Data
US 2016/0234867 A1 Aug. 11, 2016

Related U.S. Application Data

(60) Provisional application No. 62/040,418, filed on Aug. 22, 2014.

(51) Int. Cl.
*H04W 76/00* (2009.01)
*H04L 1/00* (2006.01)
(Continued)

(52) U.S. Cl.
CPC .......... *H04W 76/002* (2013.01); *H04H 20/26* (2013.01); *H04H 60/48* (2013.01);
(Continued)

(58) Field of Classification Search
CPC .................................................. H04W 76/002
See application file for complete search history.

(56) References Cited

U.S. PATENT DOCUMENTS 6,421,333 B1 * 7/2002 Jalali ................. H03M 13/2703
370/209
2002/0142757 A1 10/2002 Leung et al.
(Continued)

FOREIGN PATENT DOCUMENTS

WO WO 2012/036429 A2 3/2012

*Primary Examiner* — John Blanton
(74) *Attorney, Agent, or Firm* — Birch, Stewart, Kolasch & Birch, LLP

(57) ABSTRACT

Methods and apparatuses for transmitting and receiving a broadcast signal are disclosed. The broadcast signal transmission method includes encoding broadcast data and fast information for rapid scanning and acquisition of a broadcast service, generating a broadcast signal comprising the encoded broadcast data and fast information, and transmitting the generated broadcast signal.

12 Claims, 80 Drawing Sheets

(51) Int. Cl.
*H04H 60/48* (2008.01)
*H04W 4/06* (2009.01)
*H04W 48/10* (2009.01)
*H04H 20/26* (2008.01)
*H04H 60/73* (2008.01)
*H04W 48/12* (2009.01)

(52) U.S. Cl.
CPC ............... *H04H 60/73* (2013.01); *H04L 1/00* (2013.01); *H04L 1/0041* (2013.01); *H04L 1/0071* (2013.01); *H04L 1/0075* (2013.01); *H04W 4/06* (2013.01); *H04W 48/10* (2013.01); *H04W 48/12* (2013.01); *H04L 1/0057* (2013.01); *H04L 1/0061* (2013.01); *H04L 2001/0093* (2013.01)

(56) References Cited

U.S. PATENT DOCUMENTS

| | | | |
|---|---|---|---|
| 2004/0260823 A1 | 12/2004 | Tiwari et al. | |
| 2010/0034140 A1* | 2/2010 | Song | H04N 21/235 370/328 |
| 2010/0195633 A1 | 8/2010 | Vare et al. | |
| 2011/0055887 A1 | 3/2011 | Väre et al. | |
| 2014/0195879 A1* | 7/2014 | Hong | H04H 20/42 714/776 |

* cited by examiner

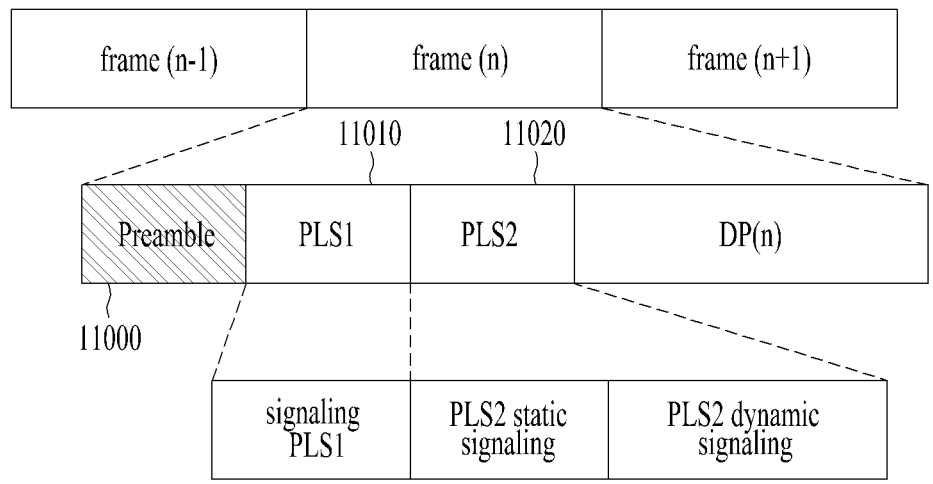

FIG. 13

| Content | Bits |
|---|---|
| PREAMBLE_DATA<br>NUM_FRAME_FRU<br>PAYLOAD_TYPE<br>NUM_FSS<br>SYSTEM_VERSION | 20<br>2<br>3<br>2<br>8 |
| CELL_ID<br>NETWORK_ID<br>SYSTEM_ID | 16<br>16<br>16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4 |
| PLS2_FEC_TYPE<br>PLS2_MOD<br>PLS2_SIZE_CELL<br>PLS2_STAT_SIZE_BIT<br>PLS2_SYN_SIZE_BIT<br>PLS2_REP_FLAG<br>PLS2_REP_SIZE_CELL<br>PLS2_NEXT_FEC_TYPE<br>PLS2_NEXT_MODE<br>PLS2_NEXT_REP_FLAG<br>PLS2_NEXT_REP_SIZE_CELL<br>PLS2_NEXT_REP_STAT_SIZE_BIT<br>PLS2_NEXT_REP_DYN_SIZE_BIT<br>PLS2_AP_MODE<br>PLS2_AP_SIZE_CELL<br>PLS2_NEXT_AP_MODE<br>PLS2_NEXT_AP_SIZE_CELL | 2<br>3<br>15<br>14<br>14<br>1<br>15<br>2<br>3<br>1<br>15<br>14<br>14<br>2<br>15<br>2<br>15 |
| RESERVED<br>CRC 32 | 32<br>32 |

FIG. 14

| Content | Bits |
|---|---|
| FIC_FLAG | 1 |
| AUX_FLAG | 1 |
| NUM_DP | 6 |
| for i = 1: NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1 : NUM_AUX | |
|         AUX_STREAM_TYPE | 4 |
|         AUX_PRIVATE_CONF | 28 |
|     end | |
| end | |

| Content | | Bit |
|---|---|---|
| FRAME_INDEX | | 5 |
| PLS_CHANGE_COUNTER | | 4 |
| FIC_CHANGE_COUNTER | | 4 |
| RESERVED | | 16 |
| for i = 1: NUM_DP | | |
| | DP_ID | 6 |
| | DP_START | 15 (or13) |
| | DP_NUM_BLOCK | 10 |
| end | RESERVED | 8 |
| EAC_FLAG | | 1 |
| EAS_WAKE_UP_VERSION_NUM | | 8 |
| if EAC_FLAG == 1 | | |
| | EAC_LENGTH_BYTE | 12 |
| else | | |
| | EAC_COUNTER | 12 |
| end | | |
| for i=1:NUM_AUX | | |
| | AUX_PRIVATE_DYN | 48 |
| end | | |
| CRC 32 | | 32 |

FIG. 25
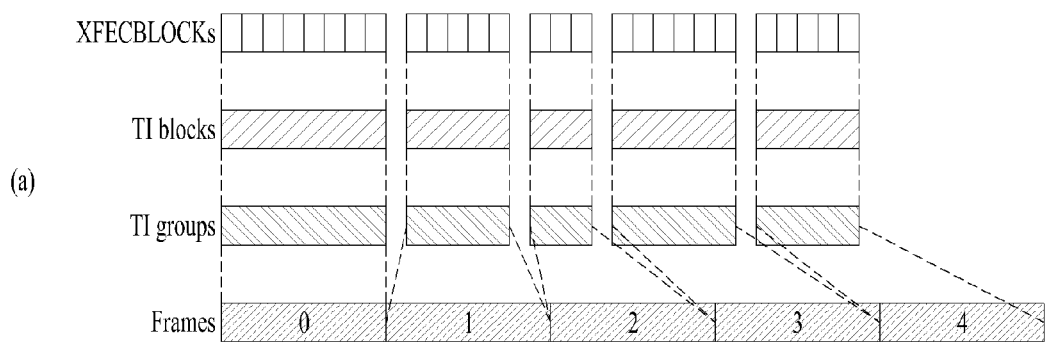
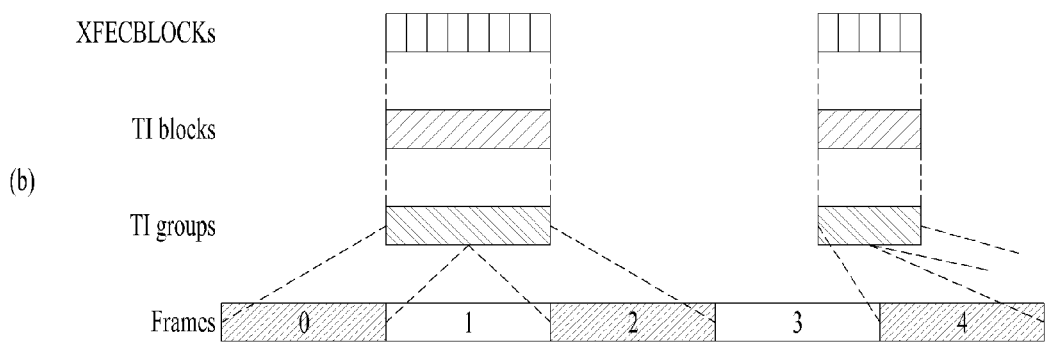
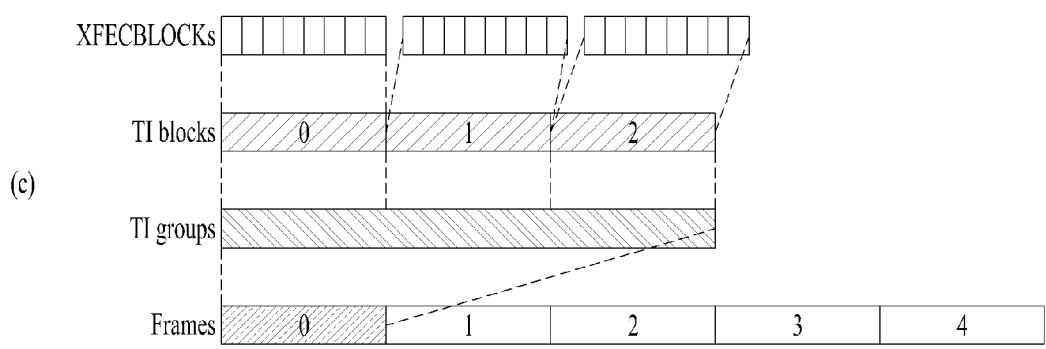

FIG. 32

| P1 | L1 | Common PLP | Scheduled & interleaved PLP's | | | | Auxiliary data |
|----|----|----|----|----|----|----|----|
| | | | PLP1 | PLP2 | ... | PLPn | |

FIG. 33

| P1 | L1 | Fast Information Channel | Scheduled & interleaved PLP's | | | | Auxiliary data |
|----|----|----|----|----|----|----|----|
| | | | PLP1 | PLP2 | ... | PLPn | |

FIG. 34

| Syntax | No. of bits | Format |
|---|---|---|
| Fast_Information_Chunk(){ | | |
|   FIT_data_version | 8 | uimsbf |
|   num_broadcast | 8 | uimsbf |
|   for(i=0;i<num_broadcast;i++){ | | |
|     broadcast_id | 16 | uimsbf |
|     delivery_system_id | 16 | uimsbf |
|     num_service | 8 | uimsbf |
|     for(j=0;j<num_service | | |
|       service_id | 16 | uimsbf |
|       service_category | 6 | uimsbf |
|       service_hidden_flag | 1 | bslbf |
|       SP_indicator | 1 | bslbf |
|     } | | |
|   } | | |
| } | | |

FIG. 37

| Syntax | No. of bits | Format |
|---|---|---|
| Fast_Information_Chunk(){ | | |
|   FIT_data_version | 8 | uimsbf |
|   num_broadcast | 8 | uimsbf |
|   for(i=0;i<num_broadcast;i++){ | | |
|     broadcast_id | 16 | uimsbf |
|     delivery_system_id | 16 | uimsbf |
|     base_PLP_id | 8 | uimsbf |
|     base_PLP_version | 5 | uimsbf |
|     reserved | 3 | '111' |
|     num_service | 8 | uimsbf |
|     for(j=0;j<num_service;j++){ | | |
|       service_id | 16 | uimsbf |
|       service_category | 6 | uimsbf |
|       service_hidden_flag | 1 | bslbf |
|       SP_indicator | 1 | bslbf |
|     } | | |
|   } | | |
| } | | |

FIG. 38

| Syntax | No. of bits | Format |
|---|---|---|
| Fast_Information_Chunk(){ | | |
|   FIT_data_version | 8 | uimsbf |
|   num_broadcast | 5 | uimsbf |
|   reserved | 3 | '111' |
|   for(i=0;i<num_broadcast;i++){ | | |
|     broadcast_id | 16 | uimsbf |
|     delivery_system_id | 16 | uimsbf |
|     base_PLP_id | 6 | uimsbf |
|     base_PLP_version | 5 | uimsbf |
|     num_service | 5 | uimsbf |
|     for(j=0;j<num_service;j++){ | | |
|       service_id | 16 | uimsbf |
|       service_category | 6 | uimsbf |
|       service_hidden_flag | 1 | bslbf |
|       SP_indicator | 1 | bslbf |
|     } | | |
|   } | | |
| } | | |

FIG. 39

| Syntax | No. of bits | Format |
|---|---|---|
| Fast_Information_Chunk(){ | | |
|   FIT_data_version | 8 | uimsbf |
|   num_broadcast | 8 | uimsbf |
|   for(i=0;i<num_broadcast;i++){ | | |
|     broadcast_id | 16 | uimsbf |
|     delivery_system_id | 16 | uimsbf |
|     base_PLP_id | 8 | uimsbf |
|     base_PLP_version | 5 | uimsbf |
|     reserved | 3 | '111' |
|     num_service | 8 | uimsbf |
|     for(j=0;j<num_service;j++){ | | |
|       service_id | 16 | uimsbf |
|       service_category | 6 | uimsbf |
|       service_hidden_flag | 1 | bslbf |
|       SP_indicator | 1 | bslbf |
|       num_component | 8 | uimsbf |
|       for(k=0;k<num_component;k++){ | | |
|         component_ | | |
|         PLP_id | 8 | bslbf |
|          | 8 | bslbf |
|       } | | |
|     } | | |
|   } | | |
| } | | |

FIG. 40

| Syntax | No. of bits | Format |
|---|---|---|
| Fast_Information_Chunk(){ | | |
|   FIT_data_version | 8 | uimsbf |
|   num_broadcast | 8 | uimsbf |
|   for(i=0;i<num_broadcast;i++){ | | |
|     broadcast_id | 16 | uimsbf |
|     delivery_system_id | 16 | uimsbf |
|     base_PLP_id | 8 | uimsbf |
|     base_PLP_version | 5 | uimsbf |
|      | 3 | '111' |
|     num_service | 8 | uimsbf |
|     for(j=0;j<num_service;j++){ | | |
|       service_id | 16 | uimsbf |
|       service_category | 6 | uimsbf |
|       service_hidden_flag | 1 | bslbf |
|       SP_indicator | 1 | bslbf |
|       num_component | 8 | uimsbf |
|       for(k=0;k<num_component;k++){ | | |
|         component_ | 8 | bslbf |
|         PLP_id | 8 | bslbf |
|       } | | |
|     } | | |
|   } | | |
| } | | |

FIG. 45

| Syntax | No. of bits | Format |
|---|---|---|
| fast_information_table(){ | | |
|     table_id | 8 | uimsbf |
|     section_syntax_indicator | 1 | '0' |
|     private_indicator | 1 | '1' |
|     reserved | 2 | '11' |
|     section_length | 12 | uimsbf |
|     table_id_extension | 16 | uimsbf |
|     reserved | 2 | '11' |
|     FIT_data_version | 5 | uimsbf |
|     current_next_indicator | 1 | bslbf |
|     section_number | 8 | uimsbf |
|     last_section_number | 8 | uimsbf |
|     num_broadcast | 8 | uimsbf |
|     for(i=0;i<num_broadcast;i++){ | | |
|         broadcast_id | 16 | uimsbf |
|         delivery_system_id | 16 | uimsbf |
|         base_PLP_id | 8 | uimsbf |
|         base_PLP_version | 5 | uimsbf |
|         reserved | 3 | '111' |
|         num_service | 8 | uimsbf |
|         for(j=0;j<num_service;j++){ | | |
|             service_id | 16 | uimsbf |
|             service_category | 6 | uimsbf |
|             service_hidden_flag | 1 | bslbf |
|             SP_indicator | 1 | bslbf |
|             num_component | 8 | uimsbf |
|             for(k=0;k<num_component;k++){ | | |
|                 component_id | 8 | bslbf |
|                 PLP_id | 8 | bslbf |
|             } | | |
|         } | | |
|     } | | |
| } | | |

FIG. 46

| Syntax | No. of bits | Format |
|---|---|---|
| fast_information_table(){ | | |
|   table_id | 8 | uimsbf |
|   section_syntax_indicator | 1 | '0' |
|   private_indicator | 1 | '1' |
|   reserved | 2 | '11' |
|   section_length | 12 | uimsbf |
|   table_id_extension | 16 | uimsbf |
|   reserved | 2 | '11' |
|   FIT_data_version | 5 | uimsbf |
|   current_next_indicator | 1 | bslbf |
|   section_number | 8 | uimsbf |
|   last_section_number | 8 | uimsbf |
|   num_broadcast | 8 | uimsbf |
|   for(i=0;i<num_broadcast;i++){ | | |
|     broadcast_id | 16 | uimsbf |
|     delivery_system_id | 16 | uimsbf |
|     base_PLP_id | 8 | uimsbf |
|     base_PLP_version | 5 | uimsbf |
|     reserved | 3 | '111' |
|     num_service | 8 | uimsbf |
|     for(j=0;j<num_service;j++){ | | |
|       service_id | 16 | uimsbf |
|       service_category | 6 | uimsbf |
|       service_hidden_flag | 1 | bslbf |
|       SP_indicator | 1 | bslbf |
|       reserved | 5 | '11111' |
|       short_service_name_length/*m*/ | 3 | uimsbf |
|       short_service_name | 16*m | bslbf |
|       num_component | 8 | bslbf |
|       for(k=0;k<num_component;k++){ | | |
|         component_id | 8 | bslbf |
|         PLP_id | 8 | bslbf |
|       } | | |
|       num_descriptors | 8 | bslbf |
|       for(k=0;k<num_component;k++){ | | |
|         service_descriptor | var | |
|       } | | |
| } | | |

FIG. 47

| Element/Attribute (with @) | Cardinality | Data Type | Description & Value |
|---|---|---|---|
| Fast Information Table | | | |
| @ FITDataVersion | 0..1 | Integer, range 0..31 | Data version of this table, default='1' |
| Broadcaster | 1..N | | Broadcaster associated with this table |
| @ broadcasterID | 1 | unsignedShort | Broadcaster identifier |
| @ deliverySystemID | 1 | unsignedShort | An identifier of delivery system exploiting certain transmission parameters |
| @ basePLPID | 1 | string | An identifier for base PLP delivering necessary data, e.g., PSI/SI signaling, to decode associated other data, e.g., audio or video content components |
| @ basePLPVersion | 0..1 | unsignedByte | data version of data delivered via base PLP, default = '1' |
| Service | 0..N | | Service associated with this broadcaster. |
| @ serviceID | 1 | unsignedShort | Service identifier |
| @ serviceShortName | 1 | string | Service name (which can be displayed to the user) |
| @ serviceCategory | 1 | unsignedByte | Service category(e.g, TV, redio) |
| @ serviceHidden | 0..1 | boolean | Default= "false" |
| @ serviceProtection | 0..1 | boolean | Default= "false" |
| Component | 1..N | | Content component used by this service |
| @ componentID | 1 | unsignedByte | Component identifier |
| @ PLPID | 1 | unsignedByte | PLP identifier to deliver this component |

FIG. 48

| Syntax | No. of Bits | Format |
|---|---|---|
| Fast_information_table_section | | |
|   table_id | 8 | TBD |
|   section_syntax_indicator | 1 | '0' |
|   private_indicator | 1 | '1' |
|   reserved | 2 | '11' |
|   section_length | 12 | uimsbf |
|   table_id_extension { | | |
|     protocol_version | 8 | uimsbf |
|     reserved | 8 | uimsbf |
|   } | | |
|   reserved | 2 | '11' |
|   FIT_data_version | 5 | uimsbf |
|   current_next_indicator | 1 | '1' |
|   section_number | 8 | uimsbf |
|   last_section_number | 8 | uimsbf |
|   fit_bytes() | var | bslbf |
| } | | |

FIG. 49

| Syntax | No. of bits | Format |
|---|---|---|
| Fast_Information_Chunk(){ | | |
|   FIT_data_version | 8 | uimsbf |
|   num_broadcast | 8 | uimsbf |
|   for(i=0;i<num_broadcast;i++){ | | |
|     broadcast_id | 16 | uimsbf |
|     delivery_system_id | 16 | uimsbf |
|     base_PLP_id | 8 | uimsbf |
|     base_PLP_version | 5 | uimsbf |
|     reserved | 3 | '111' |
|     num_service | 8 | uimsbf |
|     for(j=0;j<num_service;j++){ | | |
|       service_id | 16 | uimsbf |
|       service_category | 6 | uimsbf |
|       service_hidden_flag | 1 | bslbf |
|       SP_indicator | 1 | bslbf |
|     } | | |
|   } | | |
|   system_time | 32 or 64 | uimsbf |
| } | | |

FIG. 50

| Element/Attribute (with @) | Cardinality | Data Type | Description & Value |
|---|---|---|---|
| Fast Information Table | | | |
| @ FITDataVersion | 0..1 | Integer, range 0..31 | Data version of this table, default='1' |
| SystemTime | 0..1 | string | System time that can be shared among services or components |
| Broadcaster | 1..N | | Broadcaster associated with this table |
| @ broadcasterID | 1 | unsignedShort | Broadcaster identifier |
| @ deliverySystemID | 1 | unsignedShort | An identifier of delivery system exploting certain transmission parameters |
| @ basePLPID | 1 | string | An identifier for base PLP delivering necessary data, e.g., PSI/SI signaling, to decode associated other data, e.g., audio or video content components |
| @ basePLPVersion | 0..1 | unsignedByte | data version of data delivered via base PLP, default = '1' |
| Service | 0..N | | Service associated with this broadcaster. |
| @ serviceID | 1 | unsignedShort | Service identifier |
| @ serviceShortName | 1 | string | Service name (which can be displayed to the user) |
| @ serviceCategory | 1 | unsignedByte | Service category(e.g, TV, redio) |
| @ serviceHidden | 0..1 | boolean | Default="false" |
| @ serviceProtection | 0..1 | boolean | Default="false" |
| Component | 1..N | | Content component used by this service |
| @ componentID | 1 | unsignedByte | Component identifier |
| @ PLPID | 1 | unsignedByte | PLP identifier to deliver this component |

FIG. 51

| Syntax | No. of bits | Format |
|---|---|---|
| Fast_Information_Chunk(){ | | |
|   FIT_data_version | 8 | uimsbf |
|   num_broadcast | 8 | uimsbf |
|   for(i=0;i<num_broadcast;i++){ | | |
|     broadcast_id | 16 | uimsbf |
|     delivery_system_id | 16 | uimsbf |
|     base_PLP_id | 8 | uimsbf |
|     base_PLP_version | 5 | uimsbf |
|     reserved | 3 | '111' |
|     num_service | 8 | uimsbf |
|     for(j=0;j<num_service;j++){ | | |
|       service_id | 16 | uimsbf |
|       service_category | 6 | uimsbf |
|       service_hidden_flag | 1 | bslbf |
|       SP_indicator | 1 | bslbf |
|     } | | |
|   } | | |
|   system_time_format | 8 | uimsbf |
|   system_time | 32 or 64 | uimsbf |
| } | | |

FIG. 52

| Element/Attribute (with @) | Cardinality | Data Type | Description & Value |
|---|---|---|---|
| Fast Information Table | | | |
| @ FITDataVersion | 0..1 | Integer, range 0..31 | Data version of this table, default= '1' |
| systemTimeFormat | 0..1 | string | System time format for following systemTime |
| SystemTime | 0..1 | string | System time that can be shared among services or components |
| Broadcaster | 1..N | | Broadcaster associated with this table |
| @ broadcasterID | 1 | unsignedShort | Broadcaster identifier |
| @ deliverySystemID | 1 | unsignedShort | An identifier of delivery system exploiting certain transmission parameters |
| @ basePLPID | 1 | string | An identifier for base PLP delivering necessary data, e.g., PSI/SI signaling, to decode associated other data, e.g., audio or video content components |
| @ basePLPVersion | 0..1 | unsignedByte | data version of data delivered via base PLP, default = '1' |
| Service | 0..N | | Service associated with this broadcaster. |
| @ serviceID | 1 | unsignedShort | Service identifier |
| @ serviceShortName | 1 | string | Service name (which can be displayed to the user) |
| @ serviceCategory | 1 | unsignedByte | Service category(e.g, TV, redio) |
| @ serviceHidden | 0..1 | boolean | Default= "false" |
| @ serviceProtection | 0..1 | boolean | Default= "false" |
| Component | 1..N | | Content component used by this service |
| @ componentID | 1 | unsignedByte | Component identifier |
| @ PLPID | 1 | unsignedByte | PLP identifier to deliver this component |

FIG. 53

| Syntax | No. of bits | Format |
|---|---|---|
| Fast_Information_Chunk(){ | | |
|   FIT_data_version | 8 | uimsbf |
|   num_broadcast | 8 | uimsbf |
|   for(i=0;i<num_broadcast;i++){ | | |
|     broadcast_id | 16 | uimsbf |
|     delivery_system_id | 16 | uimsbf |
|     base_PLP_id | 8 | uimsbf |
|     base_PLP_version | 5 | uimsbf |
|     reserved | 3 | '111' |
|     num_service | 8 | uimsbf |
|     for(j=0;j<num_service;j++){ | | |
|       service_id | 16 | uimsbf |
|       service_category | 6 | uimsbf |
|       service_hidden_flag | 1 | bslbf |
|       SP_indicator | 1 | bslbf |
|     } | | |
|     reference_clock_format | 16 | uimsbf |
|     reference_clock | 32 or 64 | uimsbf |
|   } | | |
| } | | |

FIG. 54

| Element/Attribute (with @) | Cardinality | Data Type | Description & Value |
|---|---|---|---|
| Fast Information Table | | | |
| @ FITDataVersion | 0..1 | Integer, range 0..31 | Data version of this table, default='1' |
| SystemTime | 0..1 | | |
| Broadcaster | 1..N | | Broadcaster associated with this table |
| @ broadcasterID | 1 | unsignedShort | Broadcaster identifier |
| @ deliverySystemID | 1 | unsignedShort | An identifier of delivery system exploiting certain transmission parameters |
| @ basePLPID | 1 | string | An identifier for base PLP delivering necessary data, e.g., PSI/SI signaling, to decode associated other data, e.g., audio or video content components |
| @ basePLPVersion | 0..1 | unsignedByte | data version of data delivered via base PLP, default = '1' |
| referenceClockFormat | 0,,1 | string | Reference clock format |
| referenceClock | 0,,1 | string | Reference clock that can be shared among services or components |
| Service | 0..N | | Service associated with this broadcaster. |
| @serviceID | 1 | unsignedShort | Service identifier |
| Component | 1..N | | Content component used by this service |
| @ componentID | 1 | unsignedByte | Component identifier |
| @ PLPID | 1 | unsignedByte | PLP identifier to deliver this component |

FIG. 55

| Syntax | No. of bits | Format |
|---|---|---|
| fast_information_table(){ | | |
|     table_id | 8 | uimsbf |
|     section_syntax_indicator | 1 | '0' |
|     private_indicator | 1 | '1' |
|     reserved | 2 | '11' |
|     section_length | 12 | uimsbf |
|     table_id_extension | 16 | uimsbf |
|     reserved | 2 | '11' |
|     FIT_data_version | 5 | uimsbf |
|     current_next_indicator | 1 | bslbf |
|     section_number | 8 | uimsbf |
|     last_section_number | 8 | uimsbf |
|     system_time_format | 8 | uimsbf |
|     system_time | 32 or 64 | uimsbf |
|     num_broadcast | 8 | uimsbf |
|     for(i=0;i<num_broadcast;i++){ | | |
|         broadcast_id | 16 | uimsbf |
|         delivery_system_id | 16 | uimsbf |
|         base_PLP_id | 8 | uimsbf |
|         base_PLP_version | 5 | uimsbf |
|         reserved | 3 | '111' |
|         num_service | 8 | uimsbf |
|         for(j=0;j<num_service;j++){ | | |
|             service_id | 16 | uimsbf |
|             service_category | 6 | uimsbf |
|             service_hidden_flag | 1 | bslbf |
|             SP_indicator | 1 | bslbf |
|             num_component | 8 | uimsbf |
|             for(k=0;k<num_component;k++){ | | |
|                 component_id | 8 | bslbf |
|                 PLP_id | 8 | bslbf |
|             } | | |
|         } | | |
|     } | | |
| } | | |

FIG. 56

| Syntax | No. of bits | Format |
|---|---|---|
| fast_information_table(){ | | |
|     table_id | 8 | uimsbf |
|     section_syntax_indicator | 1 | '0' |
|     private_indicator | 1 | '1' |
|     reserved | 2 | '11' |
|     section_length | 12 | uimsbf |
|     table_id_extension | 16 | uimsbf |
|     reserved | 2 | '11' |
|     FIT_data_version | 5 | uimsbf |
|     current_next_indicator | 1 | bslbf |
|     section_number | 8 | uimsbf |
|     last_section_number | 8 | uimsbf |
|     num_broadcast | 8 | uimsbf |
|     for(i=0;i<num_broadcast;i++){ | | |
|         broadcast_id | 16 | uimsbf |
|         delivery_system_id | 16 | uimsbf |
|         base_PLP_id | 8 | uimsbf |
|         base_PLP_version | 5 | uimsbf |
|         reserved | 3 | '111' |
|         num_service | 8 | uimsbf |
|         for(j=0;j<num_service;j++){ | | |
|             service_id | 16 | uimsbf |
|             service_category | 6 | uimsbf |
|             service_hidden_flag | 1 | bslbf |
|             SP_indicator | 1 | bslbf |
|             num_component | 8 | uimsbf |
|             for(k=0;k<num_component;k++){ | | |
|                 component_id | 8 | bslbf |
|                 PLP _id | 8 | bslbf |
|             } | | |
|         } | | |
|         reference_clock_format | 16 | uimsbf |
|         reference_clock | 32 or 64 | uimsbf |
|     } | | |
| } | | |

FIG. 57

| Syntax | No. of bits | Format |
|---|---|---|
| Fast_Information_Chunk(){ | | |
|     FIT_data_version | 8 | uimsbf |
|     num_broadcast | 8 | uimsbf |
|     for(i=0;i<num_broadcast;i++){ | | |
|         broadcast_id | 16 | uimsbf |
|         delivery_system_id | 16 | uimsbf |
|         base_PLP_id | 8 | uimsbf |
|         base_PLP_version | 5 | uimsbf |
|         reserved | 3 | '111' |
|         num_service | 8 | uimsbf |
|         for(j=0;j<num_service;j++){ | | |
|             service_id | 16 | uimsbf |
|             service_category | 6 | uimsbf |
|             service_hidden_flag | 1 | bslbf |
|             SP_indicator | 1 | bslbf |
|             PLP_id | 8 | bslbf |
|         } | | |
|     } | | |
| } | | |

FIG. 58

| Syntax | No. of bits | Format |
|---|---|---|
| fast_information_table(){ | | |
|     table_id | 8 | uimsbf |
|     section_syntax_indicator | 1 | '0' |
|     private_indicator | 1 | '1' |
|     reserved | 2 | '11' |
|     section_length | 12 | uimsbf |
|     table_id_extension | 16 | uimsbf |
|     reserved | 2 | '11' |
|     FIT_data_version | 5 | uimsbf |
|     current_next_indicator | 1 | bslbf |
|     section_number | 8 | uimsbf |
|     last_section_number | 8 | uimsbf |
|     num_broadcast | 8 | uimsbf |
|     for(i=0;i<num_broadcast;i++){ | | |
|         broadcast_id | 16 | uimsbf |
|         delivery_system_id | 16 | uimsbf |
|         base_PLP_id | 8 | uimsbf |
|         base_PLP_version | 5 | uimsbf |
|         Reserved | 3 | '111' |
|         num_service | 8 | uimsbf |
|         for(j=0;j<num_service;j++){ | | |
|             service_id | 16 | uimsbf |
|             service_category | 6 | uimsbf |
|             service_hidden_flag | 1 | bslbf |
|             SP_indicator | 1 | bslbf |
|             PLP_id | 6 or 8 | uimsbf |
|         } | | |
|     } | | |
| } | | |

FIG. 59

| Syntax | No. of bits | Format |
|---|---|---|
| Fast_Information_Chunk(){ | | |
|     FIT_data_version | 8 | uimsbf |
|     num_broadcast | 8 | uimsbf |
|     for(i=0;i<num_broadcast;i++){ | | |
|         broadcast_id | 16 | uimsbf |
|         delivery_system_id | 16 | uimsbf |
|         base_PLP_id | 8 | uimsbf |
|         base_PLP_version | 5 | uimsbf |
|         Reserved | 3 | '111' |
|         num_service | 8 | uimsbf |
|         for(j=0;j<num_service;j++){ | | |
|             service_id | 16 | uimsbf |
|             service_category | 6 | uimsbf |
|             service_hidden_flag | 1 | bslbf |
|             SP_indicator | 1 | bslbf |
|             DP_delivery_type | 8 | uimsbf |
|             if(DP_delivery_type == service){ | | |
|                 DP_ID | 6 or 8 | uimsbf |
|             } | | |
|             else if(DP_delivery_type == component){ | | |
|                 num_component | 8 | uimsbf |
|                 for(k=0;k<num_component;k++){ | | |
|                     component_id_length | 8 | uimsbf |
|                     component_id | 8*N | var |
|                     DP_ID | 6 or 8 | uimsbf |
|                 } | | |
|             } | | |
|         } | | |
|     } | | |
| } | | |

FIG. 60

| Syntax | No. of bits | Format |
|---|---|---|
| fast_information_table(){ | | |
|     table_id | 8 | uimsbf |
|     section_syntax_indicator | 1 | '0' |
|     private_indicator | 1 | '1' |
|     reserved | 2 | '11' |
|     section_length | 12 | uimsbf |
|     section_length | 16 | uimsbf |
|     reserved | 2 | '11' |
|     FIT_data_version | 5 | uimsbf |
|     current_next_indicator | 1 | bslbf |
|     section_number | 8 | uimsbf |
|     last_section_number | 8 | uimsbf |
|     num_broadcast | 8 | uimsbf |
|     for(i=0;i<num_broadcast;i++){ | | |
|         broadcast_id | 16 | uimsbf |
|         delivery_system_id | 16 | uimsbf |
|         base_PLP_id | 8 | uimsbf |
|         base_PLP_version | 5 | uimsbf |
|         Reserved | 3 | '111' |
|         num_service | 8 | uimsbf |
|         for(j=0;j<num_service;j++){ | | |
|             service_id | 16 | uimsbf |
|             service_category | 6 | uimsbf |
|             service_hidden_flag | 1 | bslbf |
|             SP_indicator | 1 | bslbf |
|             DP_delivery_type | 8 | uimsbf |
|             if(DP_delivery_type == service){ | | |
|                 DP_ID | 6 or 8 | uimsbf |
|             } | | |
|             else if(DP_delivery_type == component){ | | |
|                 num_component | 8 | uimsbf |
|                 for(k=0;k<num_component;k++){ | | |
|                     component_id_length | 8 | uimsbf |
|                     component_id | 8*N | var |
|                     DP_ID | 6 or 8 | uimsbf |
|                 } | | |
|             } | | |
|         } | | |
|     } | | |
| } | | |

|  |  | FI_mode | |
|---|---|---|---|
|  |  | 0 | 1 |
| N_sym | even | FI scheme #1 | FI scheme #1 |
|  | odd | FI scheme #1 | FI scheme #2 |

FIG. 68

|   |   | FI_mode | |
|---|---|---|---|
|   |   | 0 | 1 |
| N_sym | even | off | off |
|   | odd | on | off |

FIG. 69 t50010 — $O_{m,l} = [x_{m,l,0}, \ldots, x_{m,l,p}, \ldots, x_{m,l,N_{data}-1}]$   $l = 0, \ldots, N_{sym}-1$ t50020 — $P_{m,l} = [v_{m,l,0}, \ldots, v_{m,l,N_{data}-1}]$   $l = 0, \ldots, N_{sym}-1$

FIG. 70 t51010 — $v_{m,l,H_l(p)} = x_{m,l,p}$   $l = 0, 1, \ldots, N_{sym}-1$   $p = 0, 1, \ldots, N_{data}-1,$ t51020 — $v_{m,l,p} = x_{m,l,H_l(p)}$   $l = 0, 1, \ldots, N_{sym}-1$   $p = 0, 1, \ldots, N_{data}-1,$

FIG. 78

*for* $0 \le k \le N_{cells} N'_{BLOCK\_TI} - 1$ $r_k = \mathrm{mod}(k, N_{cells})$, $t_k = \mathrm{mod}(S_T \times r_k, N'_{BLOCK\_TI})$, $c_k = \mathrm{mod}(t_{j,k} + \left\lfloor \dfrac{k}{N_{cells}} \right\rfloor, N'_{BLOCK\_TI})$, $\pi(k) = N_{cells} c_k + r_k$

*end*

*where $S_T$ is defined as*

$S_T = \dfrac{N'_{BLOCK\_TI} - 1}{2} + 1 \; for \; \begin{cases} N'_{BLOCK\_TI} = N_{BLOCK\_TI} + 1, & if \; N_{BLOCK\_TI} \bmod 2 = 0 \\ N'_{BLOCK\_TI} = N_{BLOCK\_TI}, & if \; N_{BLOCK\_TI} \bmod 2 = 1 \end{cases}$ $\pi(k)$: the k-th address for reading memory data
$S_T$ : shift value for use in interleaving (constant value)

FIG. 79

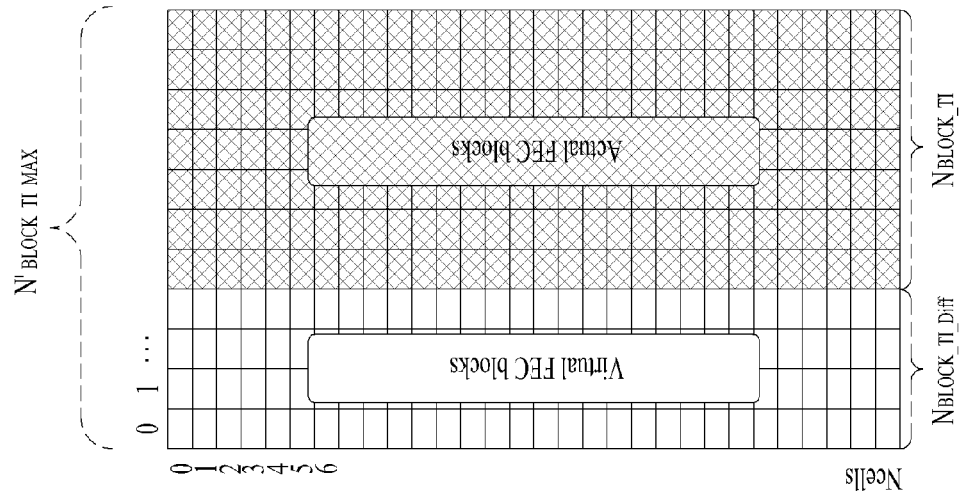

$N'_{BLOCK\_TI\_MAX}$ : Maximum number of FEC blocks in a TI group $N_{BLOCK\_TI}$ : The actual number of FEC blocks in a TI group $N_{BLOCK\_TI\_Diff} = N'_{BLOCK\_TI\_MAX} - N_{BLOCK\_TI}$ $\begin{cases} N'_{BLOCK\_TI\_MAX} = N_{BLOCK\_TI\_MAX}+1, & if\ N_{BLOCK\_TI\_MAX} \bmod 2 = 0 \\ N'_{BLOCK\_TI\_MAX} = N_{BLOCK\_TI\_MAX}, & if\ N_{BLOCK\_TI\_MAX} \bmod 2 = 1 \end{cases}$ $N_{BLOCK\_TI\_Diff,j} = N'_{BLOCK\_TI\_MAX} - N_{BLOCK\_TI,j}$

FIG. 80

$$\text{for } 0 \leq k \leq N_{cells} N'_{BLOCK\_TI\_MAX} - 1$$
$$r_k = \text{mod}(k, N_{cells}),$$
$$t_k = \text{mod}(S_T \times r_k, N'_{BLOCK\_TI\_MAX}),$$
$$c_k = \text{mod}\left(t_k + \left\lfloor \frac{k}{N_{cells}} \right\rfloor, N'_{BLOCK\_TI\_MAX}\right),$$
$$V(k) = N_{cells} c_k + r_k,$$
$$\overline{\text{if } V(k) \geq N_{cells} N_{BLOCK\_TI\_Diff}} \quad \text{Skip virtual FEC blocks}$$
$$\pi(C_{cnt}) = \theta(k),$$
$$C_{cnt} = C_{cnt} + 1,$$
$$\text{end}$$
$$\text{end}$$

where
$$C_{cnt} = 0,$$
$$S_T = \frac{N'_{BLOCK\_TI\_MAX} - 1}{2} + 1 \text{ for } \begin{cases} N'_{BLOCK\_TI\_MAX} = N_{BLOCK\_TI\_MAX} + 1, & \text{if } N_{BLOCK\_TI\_MAX} \bmod 2 = 0 \\ N'_{BLOCK\_TI\_MAX} = N_{BLOCK\_TI\_MAX}, & \text{if } N_{BLOCK\_TI\_MAX} \bmod 2 = 1, \end{cases}$$
$$N_{BLOCK\_TI\_Diff} = N'_{BLOCK\_TI\_MAX} - N_{BLOCK\_TI}$$

FIG. 82

$N_{TI\_NUM} = 2$, $N_{cells} = 30$,
$N_{BLOCK\_TI,0} = 5$,
$N_{BLOCK\_TI,1} = 6$, ☐ At that time, $N_{cells} = 30$, $N_{BLOCK\_TI\_MAX} = \max(5,6) = 6$ $$N_{BLOCK\_TI\_MAX} = \begin{cases} N'_{BLOCK\_TI\_MAX} = N_{BLOCK\_TI\_MAX} + 1, & if\ N_{BLOCK\_TI\_MAX} \bmod 2 = 0 \\ N'_{BLOCK\_TI\_MAX} = N_{BLOCK\_TI\_MAX}, & if\ N_{BLOCK\_TI\_MAX} \bmod 2 = 1 \end{cases}$$

$\boxed{N'_{BLOCK\_TI\_MAX} = 7}$ $$S_T = \frac{N'_{BLOCK\_TI\_MAX} - 1}{2} + 1$$

$\boxed{S_T = 4}$

|   | 0 | 1 | 2 | 3 | 4 |
|---|---|---|---|---|---|
| 0 | 1 | 13 | 25 | 7 | 19 |
| 1 | 3 | 15 | 27 | 9 | 21 |
| 2 | 4 | 16 | 28 | 10 | 22 |
| 3 | 5 | 17 | 29 | 11 | 23 |
| 4 | 6 | 18 | 0 | 12 | 24 |
| 5 | 8 | 20 | 2 | 14 | 26 |
| 6 | 10 | 22 | 4 | 16 | 28 |
| 7 | 11 | 23 | 5 | 17 | 29 |
| 8 | 12 | 24 | 6 | 18 | 0 |
| 9 | 13 | 25 | 7 | 19 | 1 |
| 10 | 15 | 27 | 9 | 21 | 3 |
| 11 | 17 | 29 | 11 | 23 | 5 |
| 12 | 18 | 0 | 12 | 24 | 6 |
| 13 | 19 | 1 | 13 | 25 | 7 |
| 14 | 20 | 2 | 14 | 26 | 8 |
| 15 | 22 | 4 | 16 | 28 | 10 |
| 16 | 24 | 6 | 18 | 0 | 12 |
| 17 | 25 | 7 | 19 | 1 | 13 |
| 18 | 26 | 8 | 20 | 2 | 14 |
| 19 | 27 | 9 | 21 | 3 | 15 |
| 20 | 29 | 11 | 23 | 5 | 17 |
| 21 | 1 | 13 | 25 | 7 | 19 |
| 22 | 2 | 14 | 26 | 8 | 20 |
| 23 | 3 | 15 | 27 | 9 | 21 |
| 24 | 4 | 16 | 28 | 10 | 22 |
| 25 | 6 | 18 | 0 | 12 | 24 |
| 26 | 8 | 20 | 2 | 14 | 26 |
| 27 | 9 | 21 | 3 | 15 | 27 |
| 28 | 10 | 22 | 4 | 16 | 28 |
| 29 | 11 | 23 | 5 | 17 | 29 |

$N_{BLOCK\_T1,0}=5$

|   | 0 | 1 | 2 | 3 | 4 | 5 |
|---|---|---|---|---|---|---|
| 0 | 1 | 6 | 11 | 16 | 21 | 26 |
| 1 | 2 | 7 | 12 | 17 | 22 | 27 |
| 2 | 3 | 8 | 13 | 18 | 23 | 28 |
| 3 | 4 | 9 | 14 | 19 | 24 | 29 |
| 4 | 5 | 10 | 15 | 20 | 25 | 0 |
| 5 | 6 | 11 | 16 | 21 | 26 | 1 |
| 6 | 8 | 13 | 18 | 23 | 28 | 3 |
| 7 | 9 | 14 | 19 | 24 | 29 | 4 |
| 8 | 10 | 15 | 20 | 25 | 0 | 5 |
| 9 | 11 | 16 | 21 | 26 | 1 | 6 |
| 10 | 12 | 17 | 22 | 27 | 2 | 7 |
| 11 | 13 | 18 | 23 | 28 | 3 | 8 |
| 12 | 15 | 20 | 25 | 0 | 5 | 10 |
| 13 | 16 | 21 | 26 | 1 | 6 | 11 |
| 14 | 17 | 22 | 27 | 2 | 7 | 12 |
| 15 | 18 | 23 | 28 | 3 | 8 | 13 |
| 16 | 19 | 24 | 29 | 4 | 9 | 14 |
| 17 | 20 | 25 | 0 | 5 | 10 | 15 |
| 18 | 22 | 27 | 2 | 7 | 12 | 17 |
| 19 | 23 | 28 | 3 | 8 | 13 | 18 |
| 20 | 24 | 29 | 4 | 9 | 14 | 19 |
| 21 | 25 | 0 | 5 | 10 | 15 | 20 |
| 22 | 26 | 1 | 6 | 11 | 16 | 21 |
| 23 | 27 | 2 | 7 | 12 | 17 | 22 |
| 24 | 29 | 4 | 9 | 14 | 19 | 24 |
| 25 | 0 | 5 | 10 | 15 | 20 | 25 |
| 26 | 1 | 6 | 11 | 16 | 21 | 26 |
| 27 | 2 | 7 | 12 | 17 | 22 | 27 |
| 28 | 3 | 8 | 13 | 18 | 23 | 28 |
| 29 | 4 | 9 | 14 | 19 | 24 | 29 |

$N_{BLOCK\_T1,0}=6$

FIG. 88 for $0 \leq k \leq N_{cells} N'_{BLOCK\_TI\_MAX} - 1$ $r_k = \text{mod}(k, N_{cells})$, $t_k = \text{mod}(S_R \times r_k, N'_{BLOCK\_TI\_MAX})$, $c_k = \text{mod}(t_k + \left\lfloor \dfrac{k}{N_{cells}} \right\rfloor, N'_{BLOCK\_TI\_MAX})$, $V(k) = N_{cells} c_k + r_k$, if $V(k) \geq N_{cells} N_{BLOCK\_TI\_Diff}$ $\pi(C_{cnt}) = \theta(k)$, $C_{cnt} = C_{cnt} + 1$, end Skip virtual FEC blocks end where $C_{cnt} = 0$, $S_R = N'_{BLOCK\_TI\_MAX} - S_T$, $N_{BLOCK\_TI\_Diff} = N'_{BLOCK\_TI\_MAX} - N_{BLOCK\_TI}$

BROADCAST TRANSMISSION APPARATUS, OPERATION METHOD OF BROADCAST TRANSMISSION APPARATUS, BROADCAST RECEPTION APPARATUS, AND OPERATION METHOD OF BROADCAST RECEPTION APPARATUS

CROSS REFERENCE TO RELATED APPLICATIONS

This application is the National Phase of PCT International Application No. PCT/KR2015/008766, filed on Aug. 21, 2015, which claims priority under 35 U.S.C. 119(e) to U.S. Provisional Application No. 61/040,418, filed on Aug. 22, 2014, all of which are hereby expressly incorporated by reference into the present application.

TECHNICAL FIELD

The present invention relates to a broadcast transmission apparatus, an operation method of the broadcast transmission apparatus, a broadcast reception apparatus, and an operation method of the broadcast reception apparatus.

BACKGROUND ART

In digital broadcasting, a plurality of broadcast services may be transmitted through a specific frequency, unlike analog broadcasting. In addition, detailed information necessary to receive a broadcast service may change depending on the circumstances of broadcast providers. In order to receive each broadcast service, therefore, a broadcast reception apparatus must scan the broadcast service to acquire connection information necessary to receive the broadcast service. To this end, the broadcast reception apparatus must sequentially tune to frequencies in a baseband, which is a frequency band in which a broadcast service is transmitted, to receive a broadcast signal, and must acquire service connection information from the received broadcast signal. In order to view a broadcast, therefore, a viewer must wait until broadcast service scanning has completed. For this reason, many broadcast providers prescribe a maximum time in which to complete broadcast service scanning, and require manufacturers to manufacture broadcast reception apparatuses such that the broadcast reception apparatuses are capable of completing broadcast service scanning within this maximum time. Therefore, it is necessary to provide a broadcast transmission apparatus, an operation method of the broadcast transmission apparatus, a broadcast reception apparatus, and an operation method of the broadcast reception apparatus for broadcast service scanning.

DISCLOSURE

Technical Problem

It is an object of an embodiment of the present invention to provide a broadcast transmission apparatus, an operation method of the broadcast transmission apparatus, a broadcast reception apparatus, and an operation method of the broadcast reception apparatus that are capable of efficiently scanning a broadcast service.

In particular, it is an object of an embodiment of the present invention to provide a broadcast transmission apparatus, an operation method of the broadcast transmission apparatus, a broadcast reception apparatus, and an operation method of the broadcast reception apparatus that are capable of rapidly acquiring broadcast service connection information.

Technical Solution

A broadcast signal transmission method according to an embodiment of the present invention may include encoding broadcast data and fast information for rapid scanning and acquisition of a broadcast service, generating a broadcast signal comprising the encoded broadcast data and fast information, and/or transmitting the generated broadcast signal.

The fast information may include identification information of a Physical Layer Pipe (PLP), through which service layer signaling information, including information about a broadcast service and components, is transmitted.

The fast information may include information indicating whether all components constituting a broadcast service are transmitted in a state of being contained in a single physical layer pipe.

In a case in which all components constituting a broadcast service are transmitted in a state of being contained in a single physical layer pipe, the fast information may include identification information of the physical layer pipe, through which the broadcast service is transmitted, and, in a case in which all components constituting a broadcast service are transmitted in a state of being contained in different physical layer pipes, the fast information may include identification information of the respective physical layer pipes, through which the components constituting the broadcast service are transmitted.

In a case in which components constituting a broadcast service are transmitted in a state of being contained in different physical layer pipes, the fast information may include component identification information identifying the respective components constituting the broadcast service and length information of the component identification information.

The fast information may be transmitted in a state of being contained in a common PLP, through which information shared by a plurality of physical layer pipes is transmitted.

A broadcast signal reception method according to another embodiment of the present invention may include receiving a broadcast signal including broadcast data and fast information for rapid scanning and acquisition of a broadcast service, parsing the broadcast data and fast information from the received broadcast signal, and/or decoding the parsed broadcast data and fast information.

The fast information may include identification information of a Physical Layer Pipe (PLP), through which service layer signaling information comprising information about a broadcast service and components is transmitted.

The fast information may include information indicating whether all components constituting a broadcast service are transmitted in a state of being contained in a single physical layer pipe.

In a case in which all components constituting a broadcast service are transmitted in a state of being contained in a single physical layer pipe, the fast information may include identification information of the physical layer pipe, through which the broadcast service is transmitted, and, in a case in which all components constituting a broadcast service are transmitted in a state of being contained in different physical layer pipes, the fast information may include identification information of the respective physical layer pipes, through which the components constituting the broadcast service are transmitted.

In a case in which components constituting a broadcast service are transmitted in a state of being contained in different physical layer pipes, the fast information may include component identification information identifying the respective components constituting the broadcast service and length information of the component identification information.

The fast information may be transmitted in a state of being contained in a common PLP, through which information shared by a plurality of physical layer pipes is transmitted.

A broadcast signal transmission apparatus according to another embodiment of the present invention may include an encoder for encoding broadcast data and fast information for rapid scanning and acquisition of a broadcast service, a broadcast signal generation unit for generating a broadcast signal comprising the encoded broadcast data and fast information, and a transmission unit for transmitting the generated broadcast signal.

A broadcast signal reception apparatus according to a further embodiment of the present invention may include a reception unit for receiving a broadcast signal including broadcast data and fast information for rapid scanning and acquisition of a broadcast service, a parsing unit for parsing the broadcast data and fast information from the received broadcast signal, and a decoder for decoding the parsed broadcast data and fast information.

The fast information may include identification information of a Physical Layer Pipe (PLP), through which service layer signaling information comprising information about a broadcast service and components is transmitted.

Advantageous Effects

An embodiment of the present invention provides a broadcast transmission apparatus, an operation method of the broadcast transmission apparatus, a broadcast reception apparatus, and an operation method of the broadcast reception apparatus that are capable of efficiently scanning a broadcast service.

In particular, an embodiment of the present invention provides a broadcast transmission apparatus, an operation method of the broadcast transmission apparatus, a broadcast reception apparatus, and an operation method of the broadcast reception apparatus that are capable of rapidly acquiring broadcast service connection method.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 11 illustrates a signaling hierarchy structure of the frame according to an embodiment of the present invention.

FIG. 12 illustrates preamble signaling data according to an embodiment of the present invention.

FIG. 13 illustrates PLS1 data according to an embodiment of the present invention.

FIG. 14 illustrates PLS2 data according to an embodiment of the present invention.

FIG. 25 illustrates a time interleaving according to an embodiment of the present invention.

FIG. 32 illustrates a broadcast transport frame according to an embodiment of the present invention;

FIG. 33 illustrates a broadcast transport frame according to another embodiment of the present invention;

FIG. 34 illustrates the syntax of a fast information chunk according to an embodiment of the present invention;

FIG. 37 illustrates the syntax of a fast information chunk according to another embodiment of the present invention;

FIG. 38 illustrates the syntax of a fast information chunk according to another embodiment of the present invention;

FIG. 39 illustrates the syntax of a fast information chunk according to another embodiment of the present invention;

FIG. 40 illustrates the syntax of a fast information chunk according to another embodiment of the present invention;

FIG. 45 illustrates the syntax of a fast information table according to an embodiment of the present invention;

FIG. 46 illustrates the syntax of a fast information table according to another embodiment of the present invention;

FIG. 47 illustrates the syntax of a fast information table according to another embodiment of the present invention;

FIG. 48 illustrates the syntax of a fast information table according to another embodiment of the present invention;

FIG. 49 illustrates the syntax of a fast information chunk according to another embodiment of the present invention;

FIG. 50 illustrates the syntax of a fast information table according to another embodiment of the present invention;

FIG. 51 illustrates the syntax of a fast information chunk according to another embodiment of the present invention;

FIG. 52 illustrates the syntax of a fast information table according to another embodiment of the present invention;

FIG. 53 illustrates the syntax of a fast information chunk according to a further embodiment of the present invention;

FIG. 54 illustrates the syntax of a fast information table according to another embodiment of the present invention;

FIG. 55 illustrates the syntax of a fast information table according to another embodiment of the present invention;

FIG. 56 illustrates the syntax of a fast information table according to a further embodiment of the present invention;

FIG. 57 is a view illustrating the configuration of Fast_Information_Chunk( ) according to another embodiment of the present invention in a case in which all components constituting a broadcast service are transmitted through the same Physical Layer Pipe;

FIG. 58 is a view illustrating the configuration of Fast_Information_Chunk( ) according to another embodiment of the present invention in a case in which all components constituting a broadcast service are transmitted through the same Physical Layer Pipe;

FIG. 59 is a view illustrating the configuration of Fast_Information_Chunk( ) according to another embodiment of the present invention;

FIG. 60 is a view illustrating the configuration of Fast_Information_Chunk( ) according to another embodiment of the present invention;

FIG. 68 illustrates operation of a reset mode in signaling for single-memory deinterleaving irrespective of the number of symbols in a frame according to an embodiment of the present invention.

FIG. 69 illustrates equations indicating input and output of the frequency interleaver in signaling for single-memory deinterleaving irrespective of the number of symbols in a frame according to an embodiment of the present invention.

FIG. 70 illustrates equations of a logical operation mechanism of frequency interleaving based on FI scheme #1 and FI scheme #2 in signaling for single-memory deinterleaving irrespective of the number of symbols in a frame according to an embodiment of the present invention.

FIG. 78 shows equations representing block interleaving according to an embodiment of the present invention.

FIG. 79 illustrates virtual FEC blocks according to an embodiment of the present invention.

FIG. 80 shows equations representing reading operation after insertion of virtual FEC blocks according to an embodiment of the present invention.

FIG. 82 shows equations representing a process of determining a shift value and a maximum TI block size according to an embodiment of the present invention.

FIG. 83 illustrates writing operation according to an embodiment of the present invention.

FIG. 84 illustrates reading operation according to an embodiment of the present invention.

FIG. 85 illustrates a result of skip operation in reading operation according to an embodiment of the present invention.

FIG. 86 shows a writing process of time deinterleaving according to an embodiment of the present invention.

FIG. 87 illustrates a writing process of time deinterleaving according to another embodiment of the present invention.

FIG. 88 shows equations representing reading operation of time deinterleaving according to another embodiment of the present invention.

BEST MODE

Figure 1:
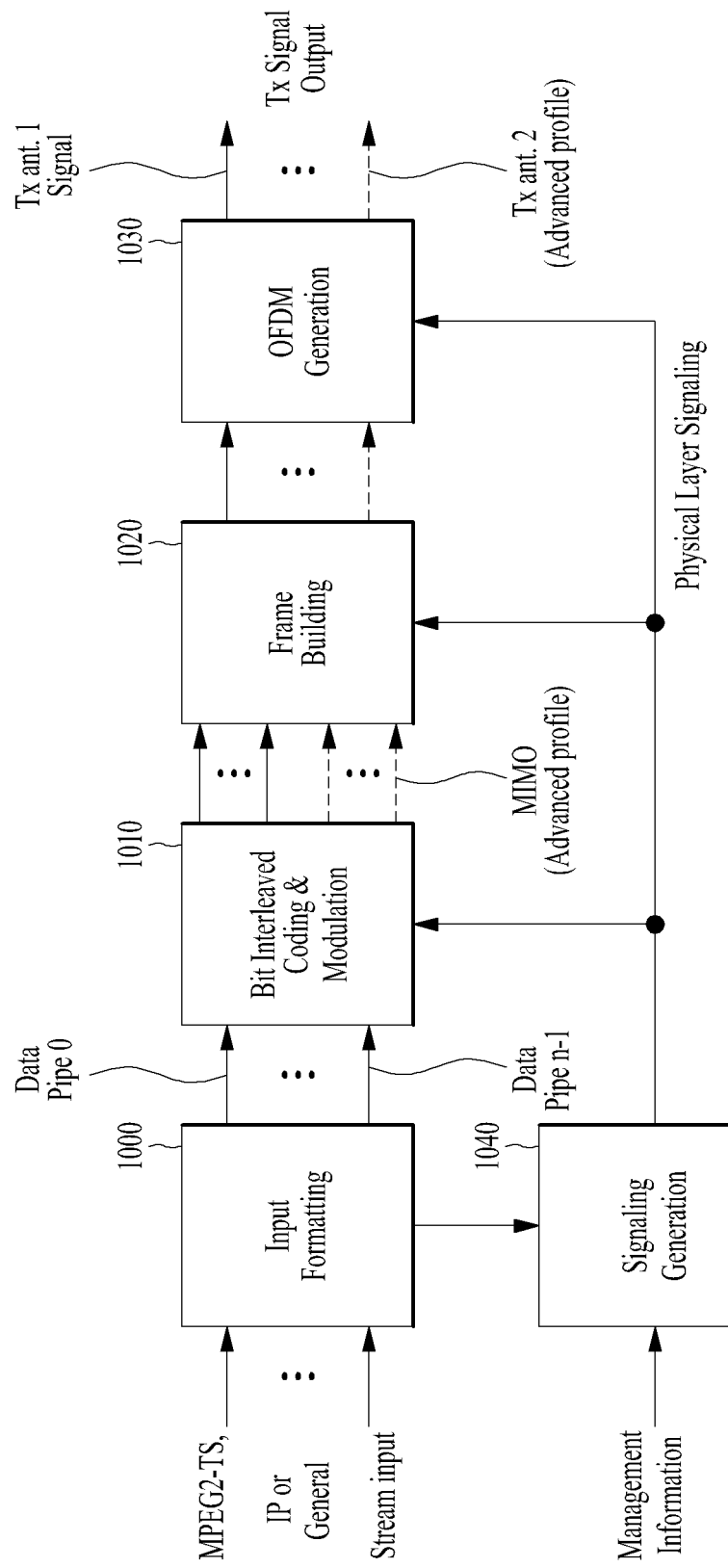
FIG. 1 illustrates a structure of an apparatus for transmitting broadcast signals for future broadcast services according to an embodiment of the present invention.

Reference will now be made in detail to the preferred embodiments of the present invention, examples of which are illustrated in the accompanying drawings, such that the present invention can be easily embodied by a person having ordinary skill in the art to which the present invention pertains. However, the present invention may be embodied in many different forms and should not be construed as limited to the embodiments set forth herein. In order to clearly describe the prevent invention, parts of the drawings that are irrelevant to the description will be omitted, and the like reference numbers will be used throughout the specification to refer to the like parts.

In addition, the term "comprises" or "includes" described herein should be interpreted not to exclude other elements but to further include such other elements unless mentioned otherwise.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas. The present invention may defines three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16 K, 64 K bits |
| Constellation size | 4~10 bpcu (bits per channel use) |
| Time de-interleaving memory size | $\leq 2^{19}$ data cells |
| Pilot patterns | Pilot pattern for fixed reception |
| FFT size | 16 K, 32 K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16 K bits |
| Constellation size | 2~8 bpcu |
| Time de-interleaving memory size | ≤$2^{18}$ data cells |
| Pilot patterns | Pilot patterns for mobile and indoor reception |
| FFT size | 8 K, 16 K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16 K, 64 K bits |
| Constellation size | 8~12 bpcu |
| Time de-interleaving memory size | ≤$2^{19}$ data cells |
| Pilot patterns | Pilot pattern for fixed reception |
| FFT size | 16 K, 32 K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8-bit field identifies uniquely a DP within the system identified by the SYSTEM_ID dummy cell: cell carrying a pseudo-random value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFT-size.

reserved for future use: not defined by the present document but may be defined in future super-frame: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame building block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
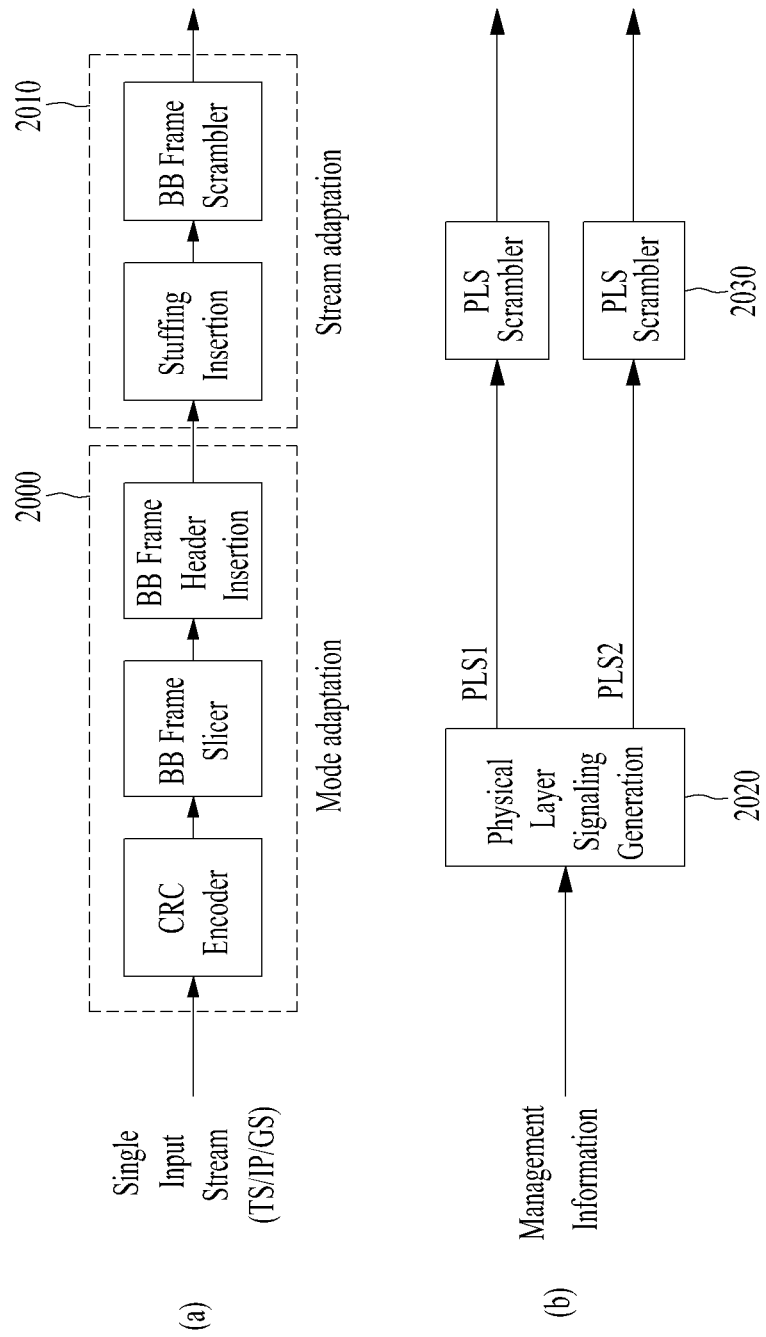
FIG. 2 illustrates an input formatting block according to one embodiment of the present invention.
Figure 3:
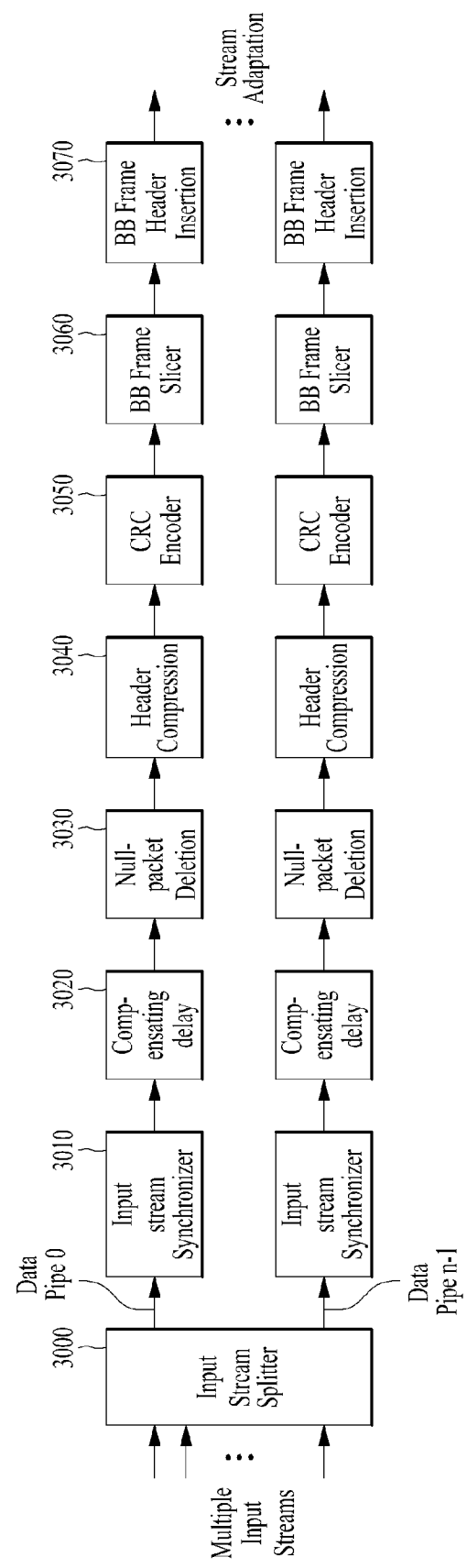
FIG. 3 illustrates an input formatting block according to another embodiment of the present invention.
Figure 4:
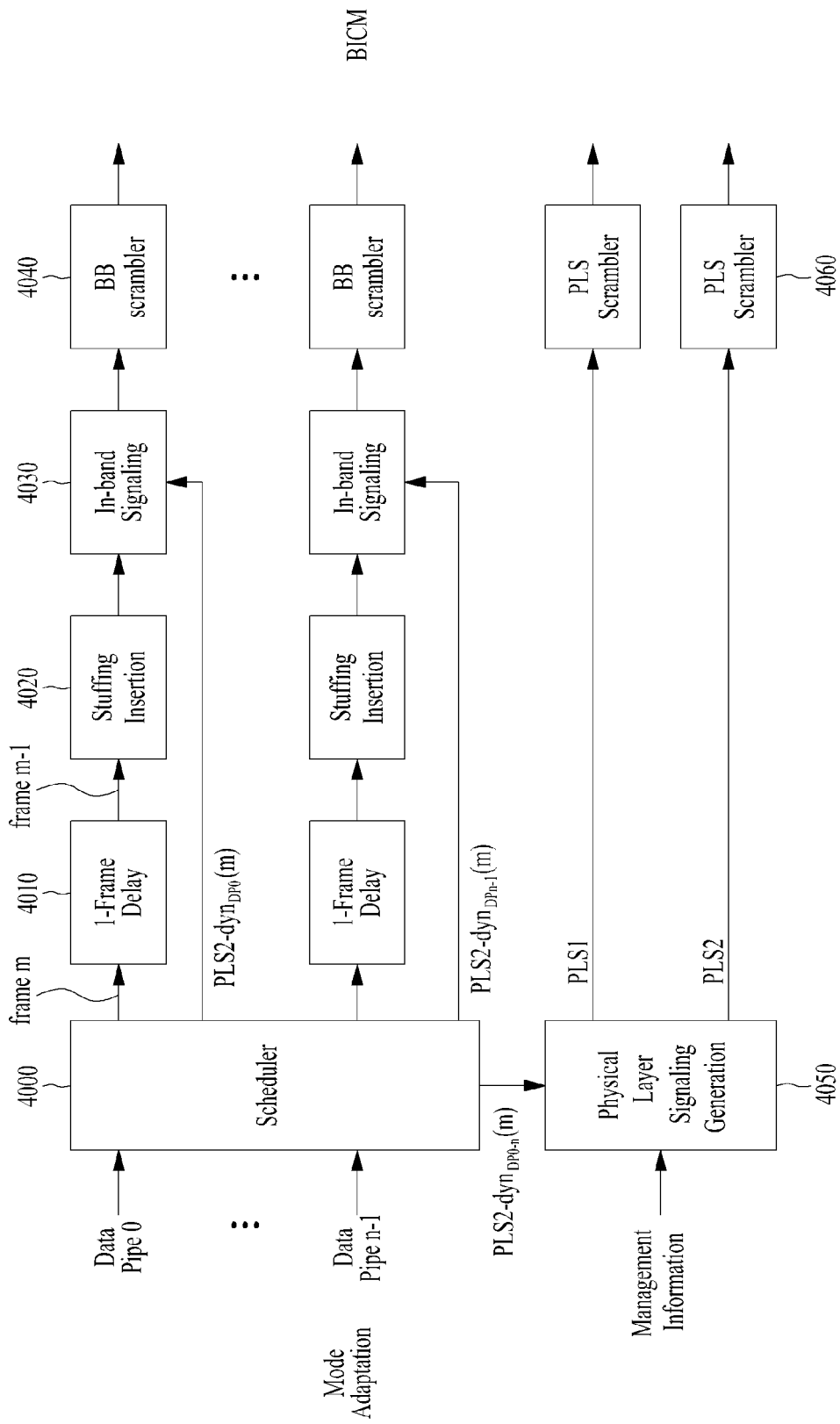
FIG. 4 illustrates an input formatting block according to another embodiment of the present invention.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler. The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream. The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FECBLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

Figure 5:
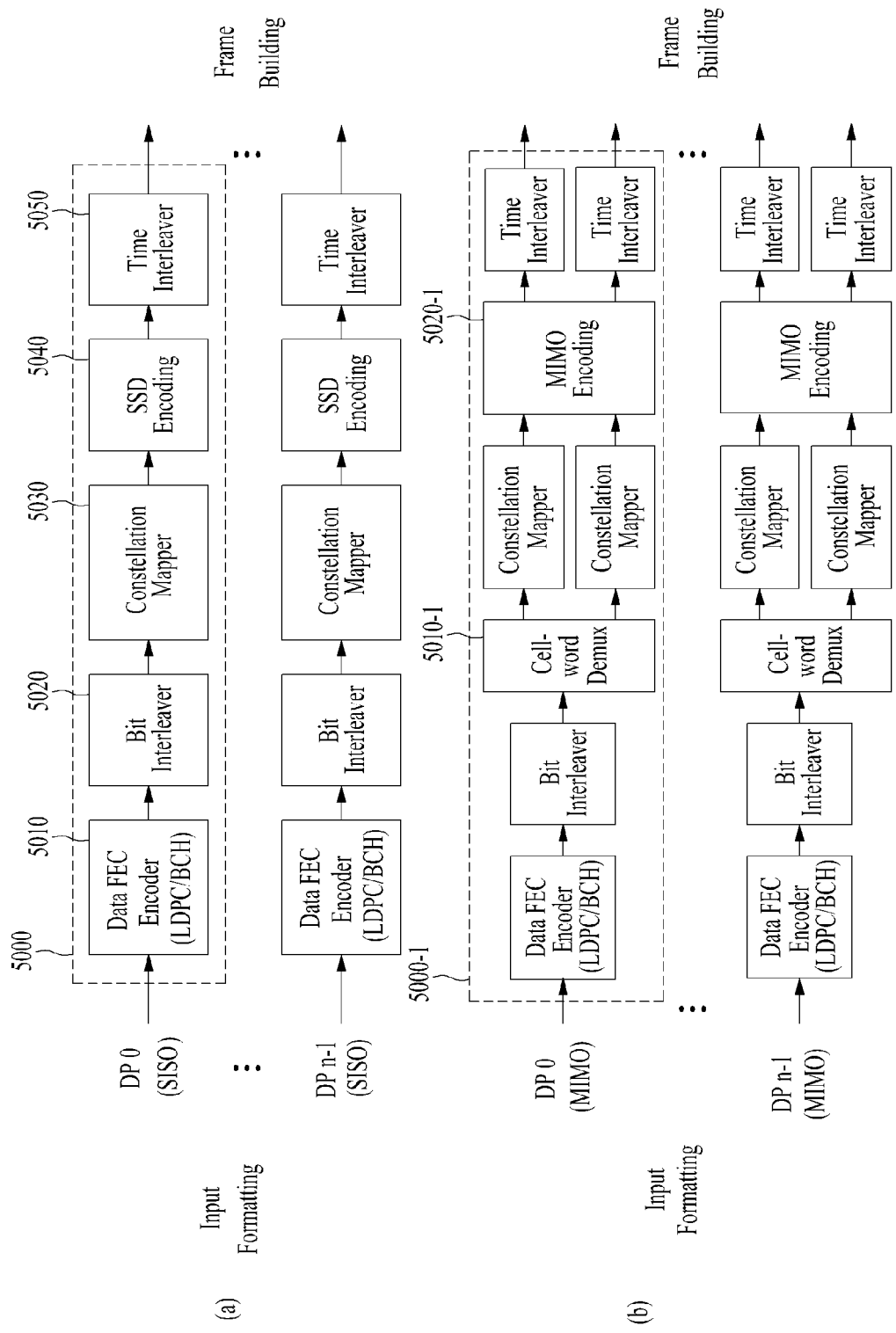
FIG. 5 illustrates a BICM block according to an embodiment of the present invention.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, e1. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver.

However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,i and e2,i) are fed to the input of the MIMO Encoder. Paired MIMO Encoder output (g1,i and g2,i) is transmitted by the same carrier k and OFDM symbol 1 of their respective TX antennas.

The above-described blocks may be omitted or replaced by blocks having similar or identical functions.

Figure 6:
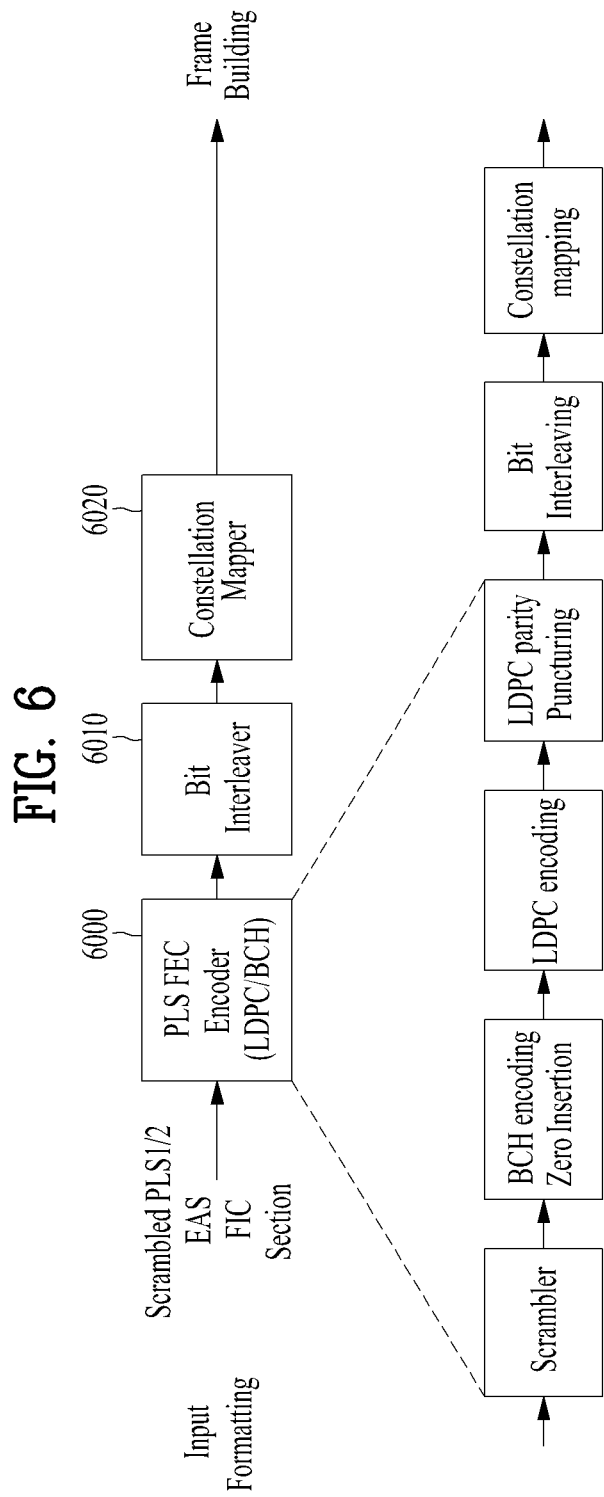
FIG. 6 illustrates a BICM block according to another embodiment of the present invention.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010 and a constellation mapper 6020.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permutted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc}=[I_{ldpc} P_{ldpc}]=[i_0, i_1, \ldots, i_{K_{ldpc}-1}, p_0, p_1, \ldots, p_{N_{ldpc}-K_{ldpc}-1}]$$ [Math figure 1]

The LDPC code parameters for PLS1 and PLS2 are as following table 4.

TABLE 4

| Signaling Type | $K_{sig}$ | $K_{bch}$ | $N_{bch\_parity}$ | $K_{ldpc}$ (=$N_{bch}$) | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit ineterleaved PLS1 data and PLS2 data onto constellations.

The above-described blocks may be omitted or replaced by blocks having similar or identical functions.

Figure 7:
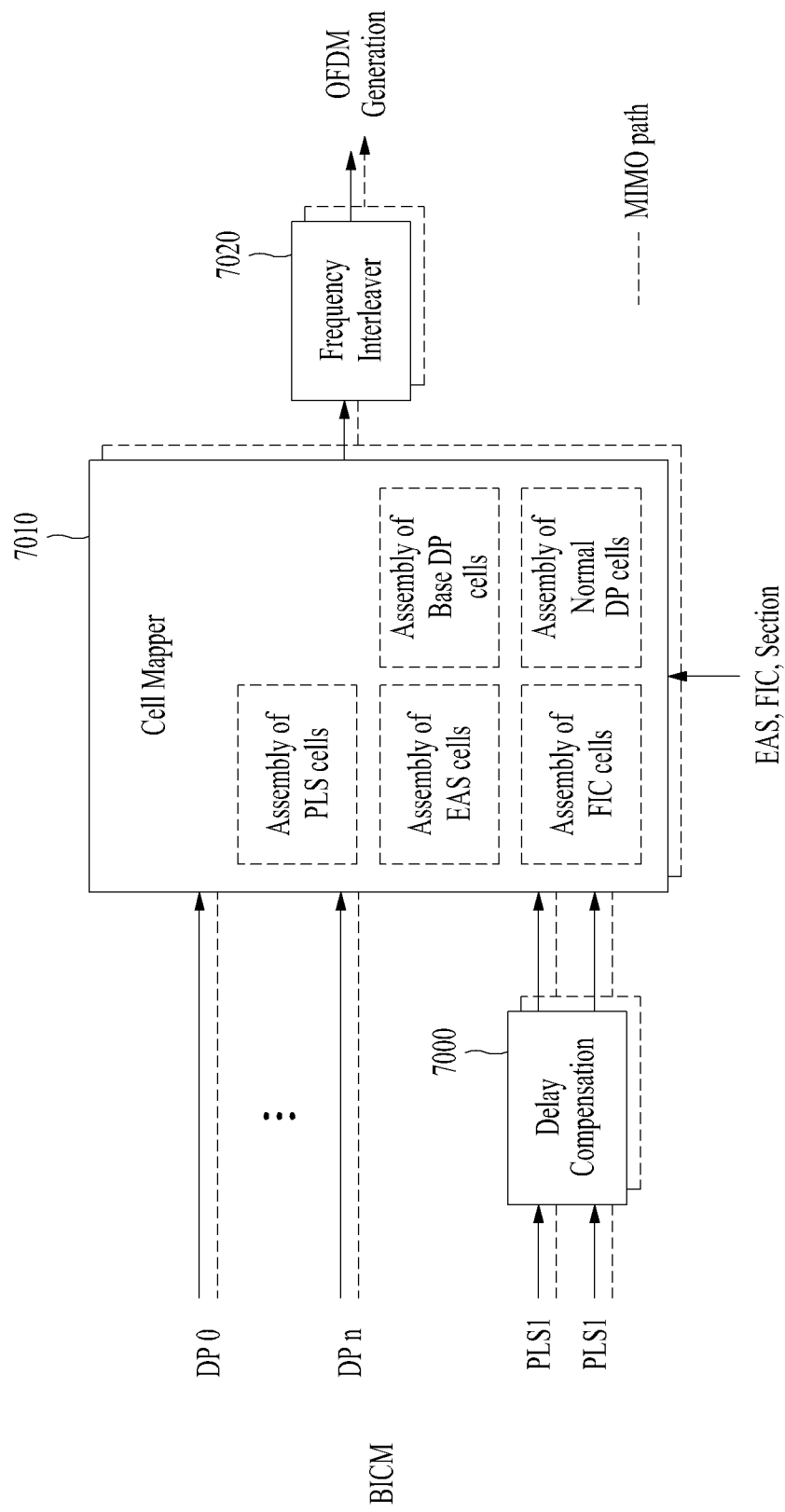
FIG. 7 illustrates a frame building block according to one embodiment of the present invention.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver 5050. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI(program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame.

The above-described blocks may be omitted or replaced by blocks having similar or identical functions.

Figure 8:
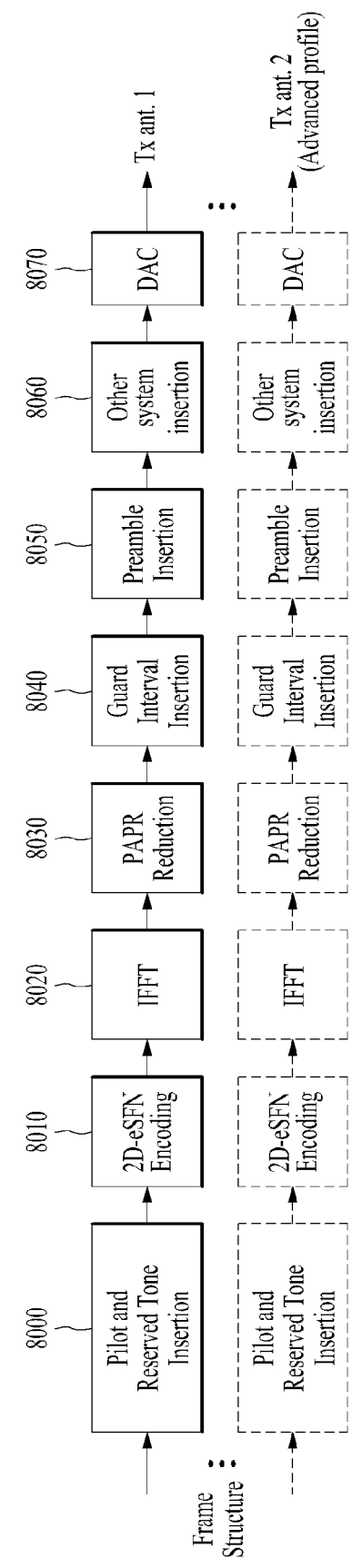
FIG. 8 illustrates an OFDM generation block according to an embodiment of the present invention.

FIG. 8 illustrates an OFDM generation block according to an embodiment of the present invention.

The OFDM generation block illustrated in FIG. 8 corresponds to an embodiment of the OFDM generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the OFDM generation block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later.

The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

Figure 9:
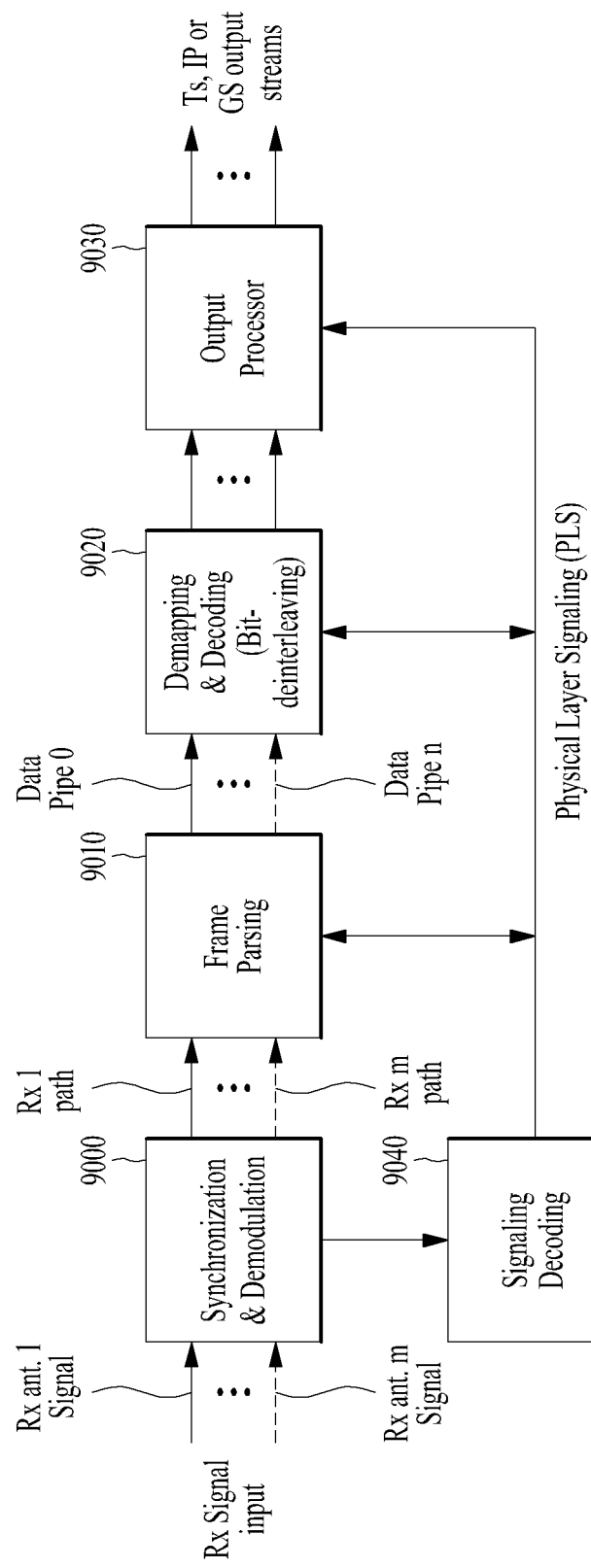
FIG. 9 illustrates a structure of an apparatus for receiving broadcast signals for future broadcast services according to an embodiment of the present invention.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9010 can parse input signal frames and extract data through which a service selected by a user is transmitted. If the apparatus for transmitting broadcast signals performs interleaving, the frame parsing module 9010 can carry out deinterleaving corresponding to a reverse procedure of interleaving. In this case, the positions of a signal and data that need to be extracted can be obtained by decoding data output from the signaling decoding module 9040 to restore scheduling information generated by the apparatus for transmitting broadcast signals.

The demapping & decoding module 9020 can convert the input signals into bit domain data and then deinterleave the same as necessary. The demapping & decoding module 9020 can perform demapping for mapping applied for transmission efficiency and correct an error generated on a transmission channel through decoding. In this case, the demapping & decoding module 9020 can obtain transmission parameters necessary for demapping and decoding by decoding the data output from the signaling decoding module 9040.

The output processor 9030 can perform reverse procedures of various compression/signal processing procedures which are applied by the apparatus for transmitting broadcast signals to improve transmission efficiency. In this case, the output processor 9030 can acquire necessary control information from data output from the signaling decoding module 9040. The output of the output processor 8300 corresponds to a signal input to the apparatus for transmitting broadcast signals and may be MPEG-TSs, IP streams (v4 or v6) and generic streams.

The signaling decoding module 9040 can obtain PLS information from the signal demodulated by the synchronization & demodulation module 9000. As described above, the frame parsing module 9010, demapping & decoding module 9020 and output processor 9030 can execute functions thereof using the data output from the signaling decoding module 9040.

Figure 10:
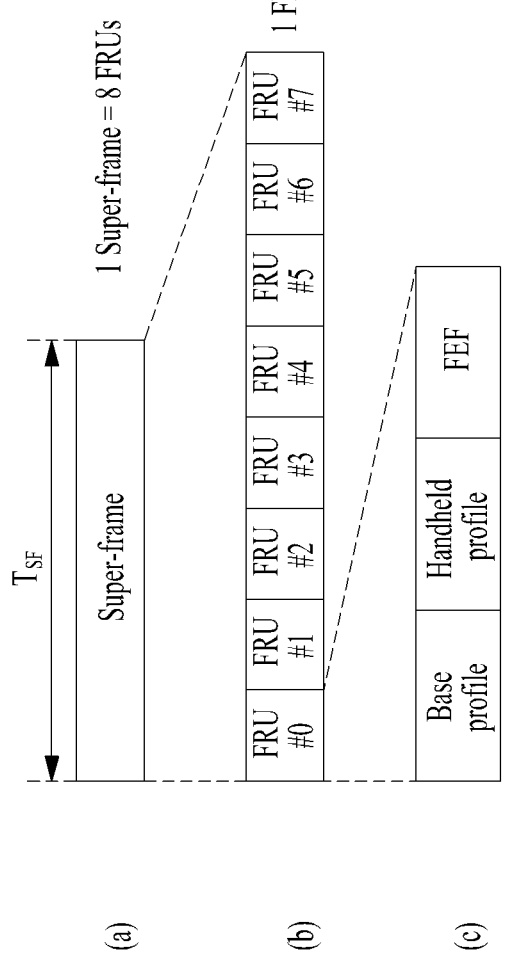
FIG. 10 illustrates a frame structure according to an embodiment of the present invention.

FIG. 10 illustrates a frame structure according to an embodiment of the present invention.

FIG. 10 shows an example configuration of the frame types and FRUs in a super-frame. (a) shows a super frame according to an embodiment of the present invention, (b)

shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
| --- | --- |
| 000 | Base profile |
| 001 | Handheld profile |
| 010 | Advanced profiled |

TABLE 5-continued

| Value | PHY profile |
| --- | --- |
| 011~110 | Reserved |
| 111 | FEF |

FFT_SIZE: This 2 bit field indicates the FFT size of the current frame within a frame-group, as described in below table 6.

TABLE 6

| Value | FFT size |
| --- | --- |
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
| --- | --- |
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2 FEC_TYPE: This 2-bit field indicates the FEC type used by the PLS2 protection. The FEC type is signaled according to table 10. The details of the LDPC codes will be described later.

TABLE 10

| Content | PLS2 FEC type |
|---|---|
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
|---|---|
| 000 | BPSK |
| 001 | QPSK |
| 010 | QAM-16 |
| 011 | NUQ-64 |
| 100~111 | Reserved |

PLS2_SIZE_CELL: This 15-bit field indicates Ctotal_partial_block, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotal_partial_block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2 NEXT_REP_SIZE_CELL: This 15-bit field indicates Ctotal_full_block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
|---|---|
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
|---|---|
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
|---|---|
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
|---|---|
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates PI, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (PI=1). The allowed PI values with 2-bit field are defined in the below table 18.

TABLE 18

| 2-bit field | $P_I$ | $N_{TI}$ |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates the frame interval (IJUMP) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver 5050. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
|---|---|
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

Figures 15, 16:
FIG. 15 illustrates PLS2 data according to another embodiment of the present invention.
FIG. 16 illustrates a logical structure of a frame according to an embodiment of the present invention.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| PHY profile | DP_START field size | |
|---|---|---|
| | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 17:
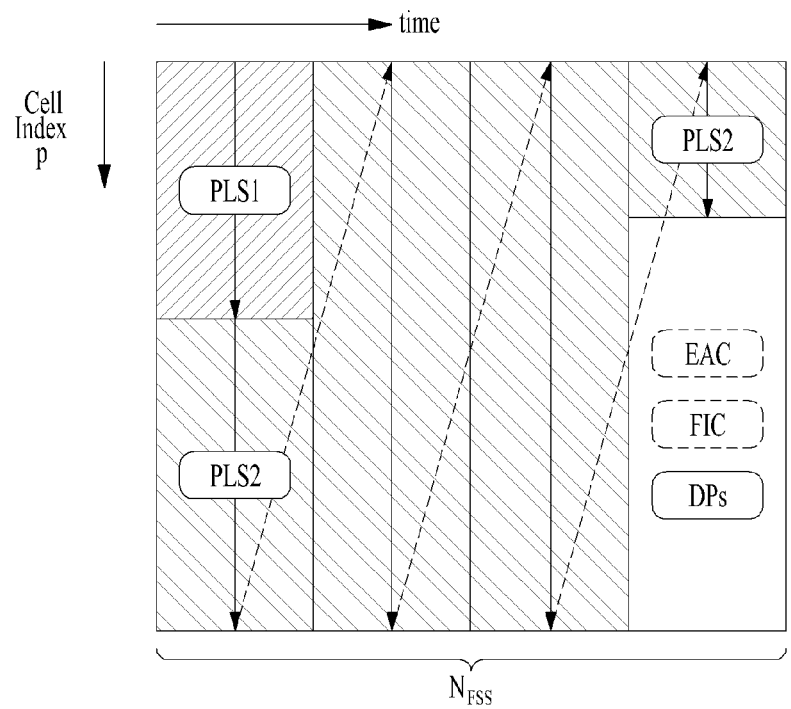
FIG. 17 illustrates PLS mapping according to an embodiment of the present invention.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the NFSS FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 18:
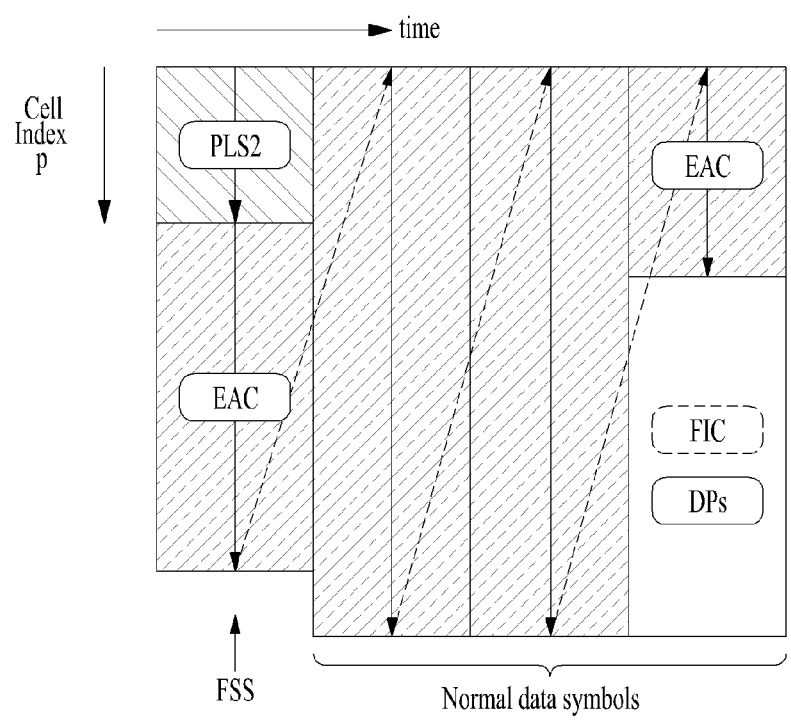
FIG. 18 illustrates EAC mapping according to an embodiment of the present invention.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

Figure 19:
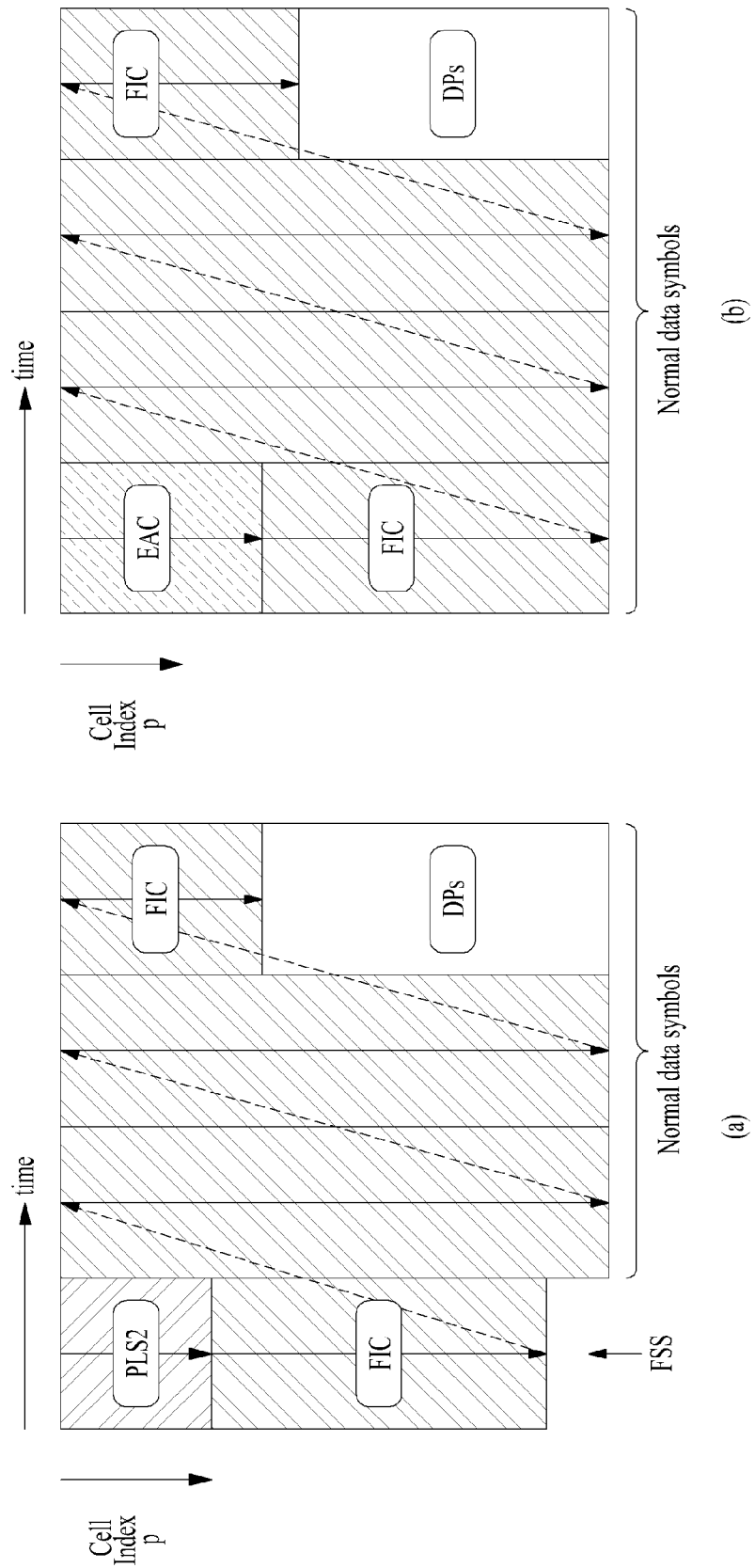
FIG. 19 illustrates FIC mapping according to an embodiment of the present invention.

FIG. 19 illustrates FIC mapping according to an embodiment of the present invention.

shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 20:
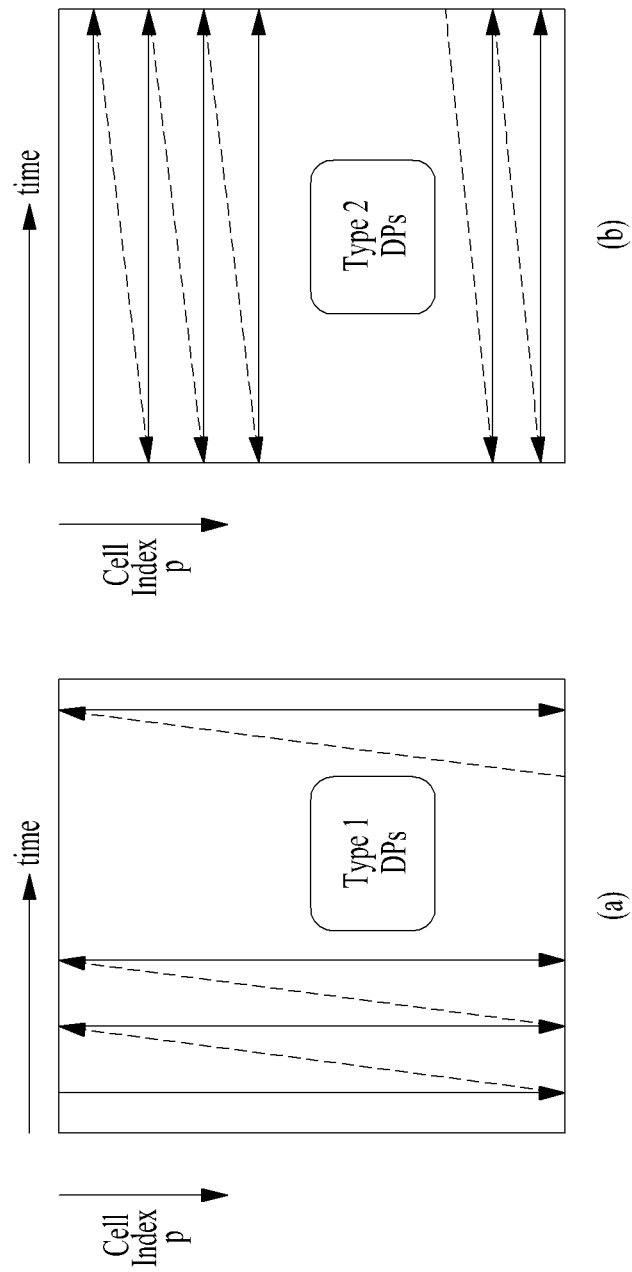
FIG. 20 illustrates a type of DP according to an embodiment of the present invention.

FIG. 20 illustrates a type of DP according to an embodiment of the present invention.

shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM
Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

$$D_{DP1}+D_{DP2} \leq D_{DP} \qquad \text{[Expression 2]}$$

where DDP1 is the number of OFDM cells occupied by Type 1 DPs, DDP2 is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

Figure 21:
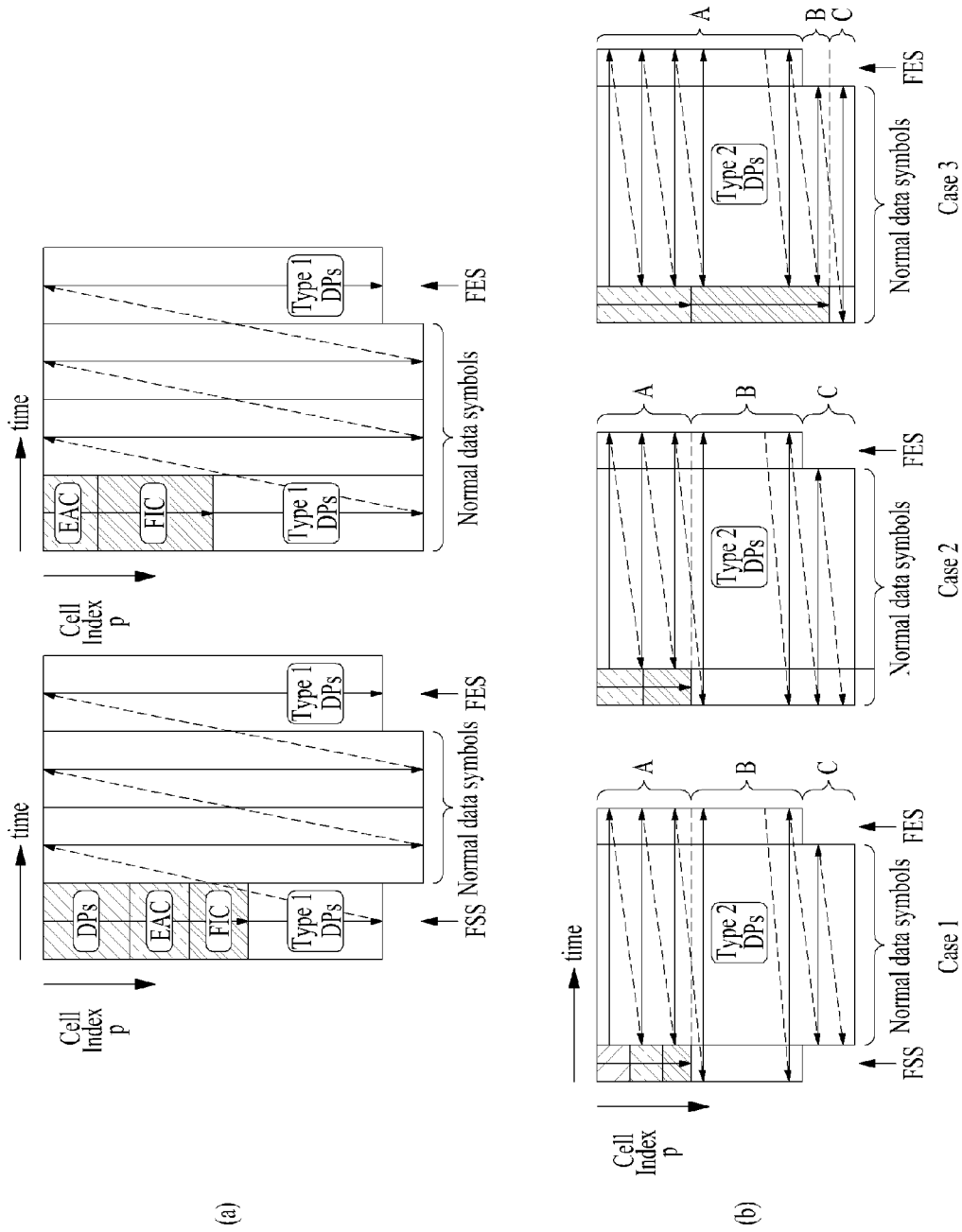
FIG. 21 illustrates DP mapping according to an embodiment of the present invention.

FIG. 21 illustrates DP mapping according to an embodiment of the present invention.

shows an addressing of OFDM cells for mapping type 1 DPs and (b) shows an addressing of OFDM cells for mapping for type 2 DPs.

Addressing of OFDM cells for mapping Type 1 DPs (0, . . . , DDP1-1) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, . . . DDP2-1) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than CFSS. The third case, shown on the right side in (b), is the same as the second case except that the number of FIC cells mapped on that symbol exceeds CFSS.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, Ncells, is dependent on the FECBLOCK size, Nldpc, and the number of transmitted bits per constellation symbol. A DPU is defined as the greatest common divisor of all possible values of the number of cells in a XFECBLOCK, Ncells, supported in a given PHY profile. The length of a DPU in cells is defined as LDPU. Since each PHY profile supports different combinations of FECBLOCK size and a different number of bits per constellation symbol, LDPU is defined on a PHY profile basis.

Figure 22:
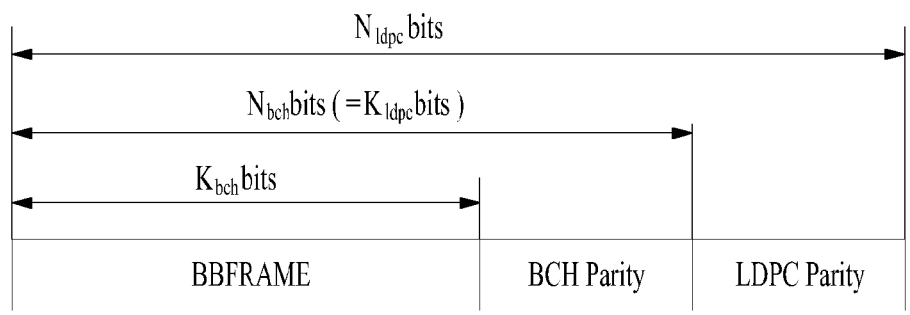
FIG. 22 illustrates an FEC structure according to an embodiment of the present invention.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF (Kbch bits), and then LDPC encoding is applied to BCH-encoded BBF (Kldpc bits=Nbch bits) as illustrated in FIG. 22.

The value of Nldpc is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch}-K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | $N_{ldpc}$ | $K_{ldpc}$ | $K_{bch}$ | BCH error correction capability | $N_{bch}-K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) are expressed as follow expression.

$$B_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}]$$ [expression 3]

The parameters for long FECBLOCK and short FECBLOCK are given in the above table 28 and 29, respectively.

The detailed procedure to calculate Nldpc−Kldpc parity bits for long FECBLOCK, is as follows:

1) Initialize the parity bits, $$p_0=p_1=p_2=\ldots=p_{N_{ldpc}-K_{ldpc}-1}=0$$ [expression 4]

2) Accumulate the first information bit −i0, at parity bit addresses specified in the first row of an addresses of parity check matrix. The details of addresses of parity check matrix will be described later. For example, for rate 13/15:

| expression 5 | |
|---|---|
| $p_{983} = p_{983} \oplus i_0$ | $p_{2815} = p_{2815} \oplus i_0$ |
| $p_{4837} = p_{4837} \oplus i_0$ | $p_{4989} = p_{4989} \oplus i_0$ |
| $p_{6138} = p_{6138} \oplus i_0$ | $p_{6458} = p_{6458} \oplus i_0$ |
| $p_{6921} = p_{6921} \oplus i_0$ | $p_{6974} = p_{6974} \oplus i_0$ |
| $p_{7572} = p_{7572} \oplus i_0$ | $p_{8260} = p_{8260} \oplus i_0$ |
| $p_{8496} = p_{8496} \oplus i_0$ | |

3) For the next 359 information bits, is, s=1, 2, . . . , 359 accumulate is at parity bit addresses using following expression.

$$\{x+(s \bmod 360) \times Q_{ldpc}\} \bmod(N_{ldpc}-K_{ldpc})$$ [expression 6]

where x denotes the address of the parity bit accumulator corresponding to the first bit i0, and Qldpc is a code rate dependent constant specified in the addresses of parity check matrix. Continuing with the example, Qldpc=24 for rate 13/15, so for information bit i1, the following operations are performed:

| expression 7 | |
|---|---|
| $p_{1007} = p_{1007} \oplus i_1$ | $p_{2839} = p_{2839} \oplus i_1$ |
| $p_{4861} = p_{4861} \oplus i_1$ | $p_{5013} = p_{5013} \oplus i_1$ |
| $p_{6162} = p_{6162} \oplus i_1$ | $p_{6482} = p_{6482} \oplus i_1$ |
| $p_{6945} = p_{6945} \oplus i_1$ | $p_{6998} = p_{6998} \oplus i_1$ |
| $p_{7596} = p_{7596} \oplus i_1$ | $p_{8284} = p_{8284} \oplus i_1$ |
| $p_{8520} = p_{8520} \oplus i_1$ | |

4) For the 361st information bit i360, the addresses of the parity bit accumulators are given in the second row of the addresses of parity check matrix. In a similar manner the addresses of the parity bit accumulators for the following 359 information bits is, s=361, 362, . . . , 719 are obtained using the expression 6, where x denotes the address of the parity bit accumulator corresponding to the information bit i360, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i=p_i \oplus p_{i-1}, i=1,2,\ldots,N_{ldpc}-K_{ldpc}-1$$ [Math figure 8]

where final content of pi, i=0,1, . . . Nldpc−Kldpc−1 is equal to the parity bit pi.

TABLE 30

| Code Rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

Figure 23:
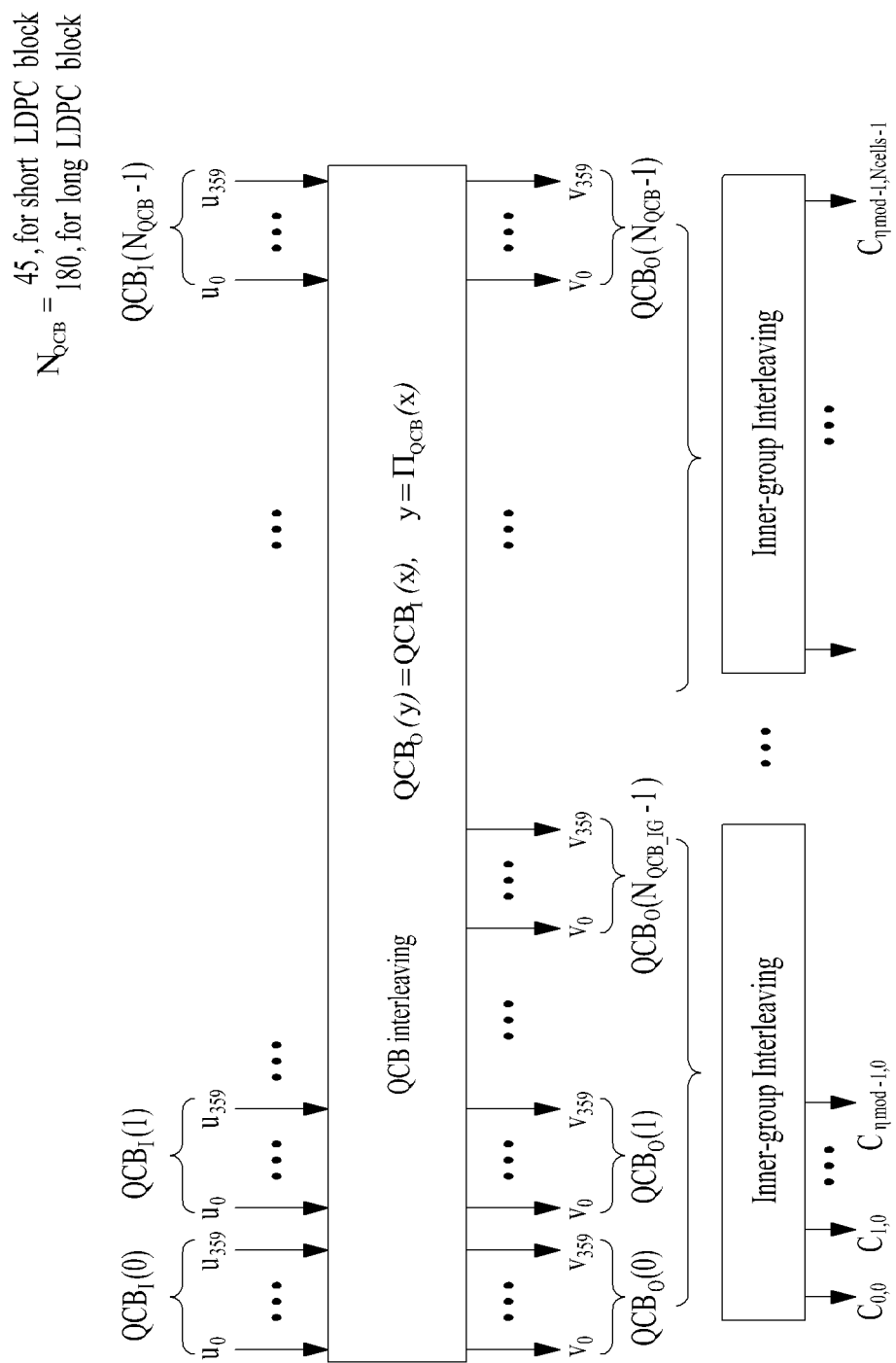
FIG. 23 illustrates a bit interleaving according to an embodiment of the present invention.

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where Ncells=64800/η mod or 16200/η mod according to the FECBLOCK length. The QCB interleaving pattern is unique to each combination of modulation type and LDPC code rate.

After QCB interleaving, inner-group interleaving is performed according to modulation type and order (η mod) which is defined in the below table 32. The number of QC blocks for one inner-group, NQCB_IG, is also defined.

TABLE 32

| Modulation type | $\eta_{mod}$ | $N_{QCB\_IG}$ |
|---|---|---|
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |
| NUQ-1024 | 10 | 5 |
| NUC-1024 | 10 | 10 |

TABLE 32-continued

The inner-group interleaving process is performed with NQCB_IG QC blocks of the QCB interleaving output. Inner-group interleaving has a process of writing and reading the bits of the inner-group using 360 columns and NQCB_IG rows. In the write operation, the bits from the QCB interleaving output are written row-wise. The read operation is performed column-wise to read out m bits from each row, where m is equal to 1 for NUC and 2 for NUQ.

Figure 24:
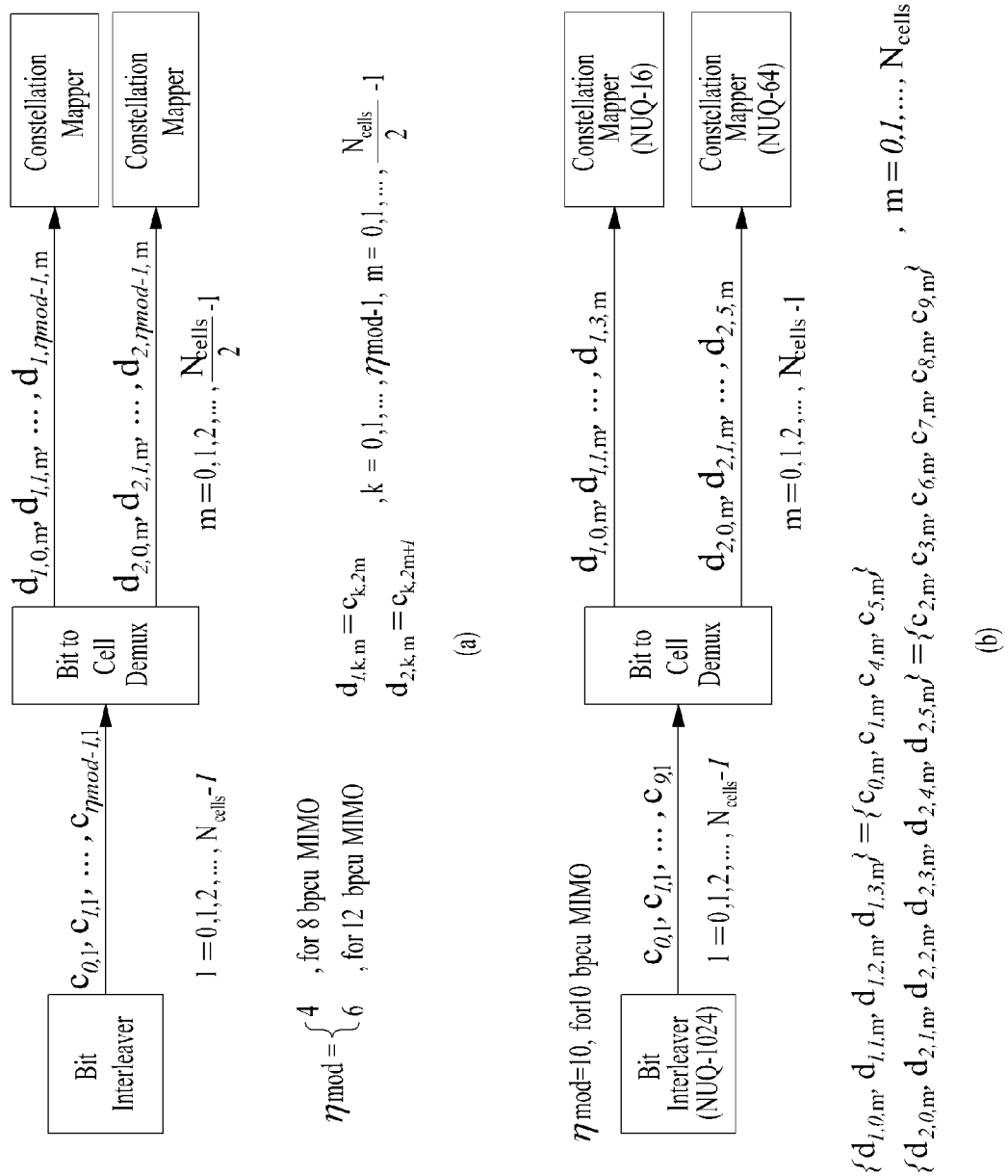
FIG. 24 illustrates a cell-word demultiplexing according to an embodiment of the present invention.

FIG. 24 illustrates a cell-word demultiplexing according to an embodiment of the present invention.

FIG. 24 shows a cell-word demultiplexing for 8 and 12 bpcu MIMO and (b) shows a cell-word demultiplexing for 10 bpcu MIMO.

Each cell word (c0,1, c1,1, ..., cη mod−1,1) of the bit interleaving output is demultiplexed into (d1,0,m, d1,1,m, d1η mod−1,m) and (d2,0,m, d2,1,m ..., d2,η mod−1,m) as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word (c0,1, c1,1, ..., c9,1) of the Bit Interleaver output is demultiplexed into (d1,0,m, d1,1, m ..., d1,3,m) and (d2,0,m, d2,1,m ..., d2,5,m), as shown in (b).

FIG. 25 illustrates a time interleaving according to an embodiment of the present invention.

to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE=1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames IJUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group (n) and is signaled as DP_NUM_BLOCK in the PLS2-DYN data. Note that NxBLOCK_Group(n) may vary from the minimum value of 0 to the maximum value NxBLOCK_Group_MAX (corresponding to DPNUM_BLOCKMAX) of which the largest value is 1023.

Each TI group is either mapped directly onto one frame or spread over PI frames. Each TI group is also divided into more than one TI blocks(NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Modes | Descriptions |
| --- | --- |
| Option-1 | Each TI group contains one TI block and is mapped directly to one frame as shown in (a). This option is signaled in the PLS2-STAT by DP_TI_TYPE = '0' and DP_TI_LENGTH = '1'($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{jump}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = $N_{TI}$, while $P_I$ = 1. |

In each DP, the TI memory stores the input XFECBLOCKs (output XFECBLOCKs from the SSD/MIMO encoding block). Assume that input XFECBLOCKs are defined as $$(d_{n,s,0,0}, d_{n,s,0,1}, \ldots, d_{n,s,0,N_{cells}-1}, d_{n,s,1,0}, \ldots, d_{n,s,1,N_{cells}-1}, \ldots,$$
$$d_{n,s,N_{xBLOCK\_TI}(n,s)-1,0}, \ldots, d_{n,s,N_{xBLOCK\_TI}(n,s)-1,N_{cells}-1}),$$

where $d_{n,s,r,q}$ is the qth cell of the rth XFECBLOCK in the sth TI block of the nth TI group and represents the outputs of SSD and MIMO encodings as follows $$d_{n,s,r,q} = \begin{cases} f_{n,s,r,q}, & \text{the output of } SSD \text{ encoding} \\ g_{n,s,r,q}, & \text{the output of } MIMO \text{ encoding} \end{cases}.$$

In addition, assume that output XFECBLOCKs from the time interleaver 5050 are defined as $$(h_{n,s,0}, h_{n,s,1}, \ldots, h_{n,s,i}, \ldots, h_{n,s,N_{xBLOCK\_TI}(n,s) \times N_{cells}-1}),$$

where $h_{n,s,i}$ is the ith output cell (for i=0, ..., $N_{xBLOCK\_TI}$ (n,s)×$N_{cells}$−1) in the sth TI block of the nth TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r=N_{cells}$ while the number of columns $N_c$ is equal to the number $N_{xBLOCK\_TI}(n,s)$.

Figure 26:
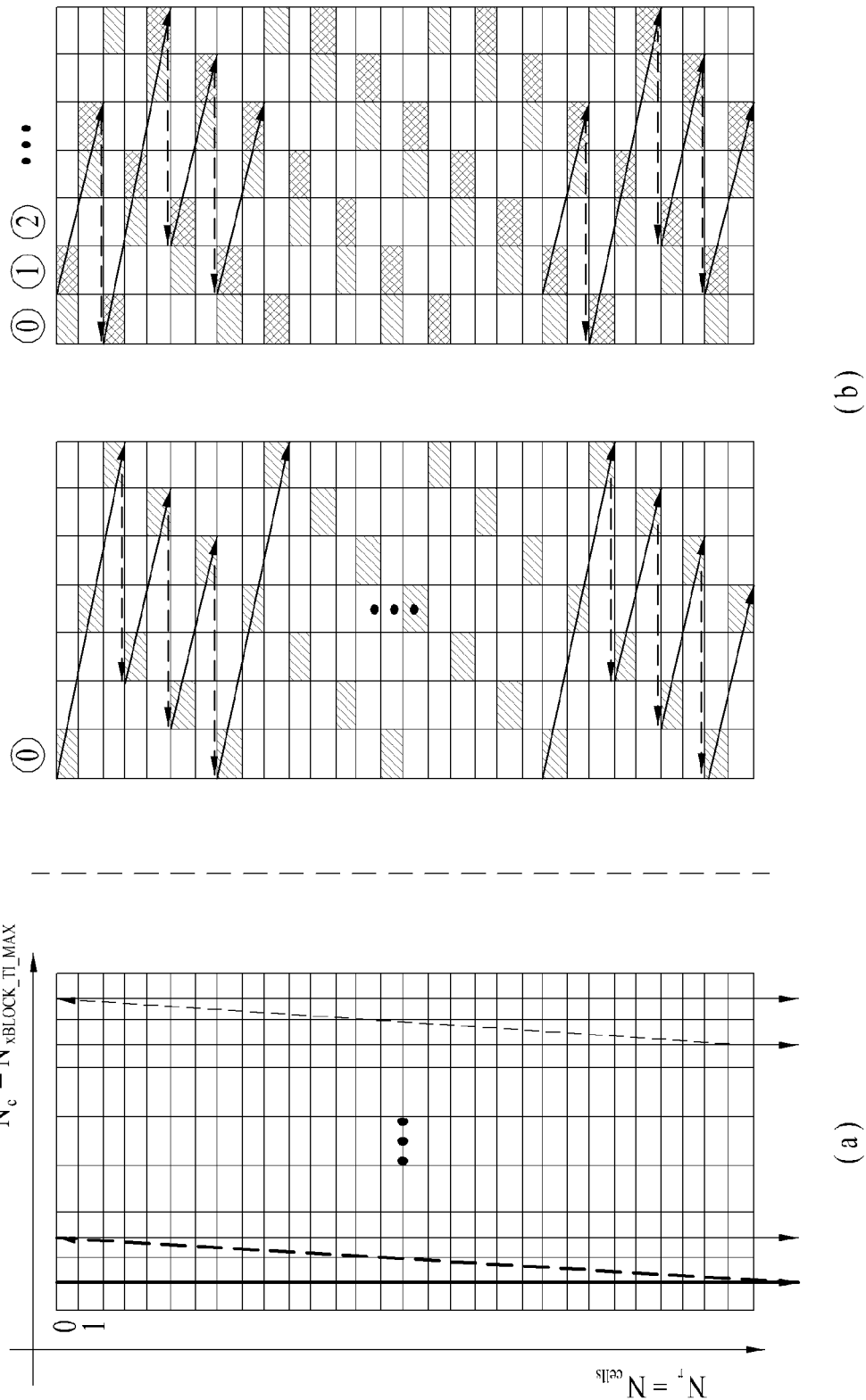
FIG. 26 illustrates the basic operation of a twisted row-column block interleaver according to an embodiment of the present invention.

FIG. 26 illustrates the basic operation of a twisted row-column block interleaver according to an embodiment of the present invention.

FIG. 26 (a) shows a writing operation in the time interleaver and FIG. 26(b) shows a reading operation in the time interleaver. The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}$(i=0, ..., $N_r N_c$) as the TI memory cell position to be read sequentially, the reading process in such an interleaving array is performed by calculating the row index $R_{n,s,i}$, the column index $C_{n,s,i}$, and the associated twisting parameter $T_{n,s,i}$ as follows expression.

[expression 9]

$$\text{GENERATE } (R_{n,s,i}, C_{n,s,i}) = \{$$
$$R_{n,s,i} = \mod(i, N_r),$$
$$T_{n,s,i} = \mod(S_{shift} \times R_{n,s,i}, N_c),$$
$$C_{n,s,i} = \mod\left(T_{n,s,i} + \left\lfloor \frac{i}{N_r} \right\rfloor, N_c\right)$$
$$\}$$

where $S_{shift}$ is a common shift value for the diagonal-wise reading process regardless of $N_{xBLOCK\_TI}(n,s)$, and it is determined by $N_{xBLOCK\_TI\_MAX}$ given in the PLS2-STAT as follows expression.

for

[expression 10]

$$\begin{cases} N'_{xBLOCK\_TI\_MAX} = N_{xBLOCK\_TI\_MAX} + 1, & \text{if } N_{xBLOCK\_TI\_MAX} \\ & \mod 2 = 0 \\ N'_{xBLOCK\_TI\_MAX} = N_{xBLOCK\_TI\_MAX}, & \text{if } N_{xBLOCK\_TI\_MAX} \\ & \mod 2 = 1 \end{cases},$$

$$S_{shift} = \frac{N'_{xBLOCK\_TI\_MAX} - 1}{2}$$

As a result, the cell positions to be read are calculated by a coordinate as $z_{n,s,i} = N_r C_{n,s,i} + R_{n,s,i}$.

Figure 27:
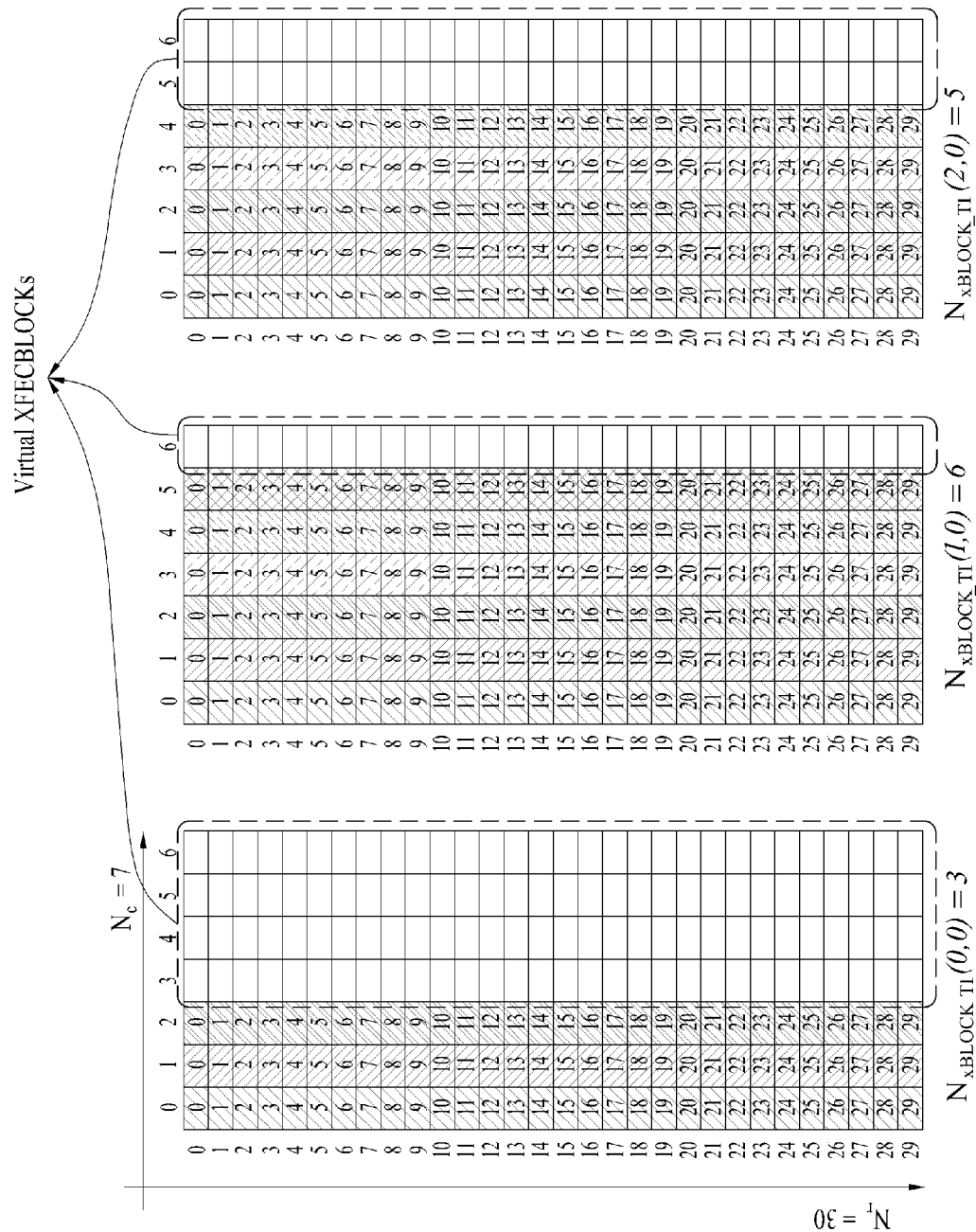
FIG. 27 illustrates an operation of a twisted row-column block interleaver according to another embodiment of the present invention.

FIG. 27 illustrates an operation of a twisted row-column block interleaver according to another embodiment of the present invention.

More specifically, FIG. 27 illustrates the interleaving array in the TI memory for each TI group, including virtual XFECBLOCKs when $N_{xBLOCK\_TI}(0,0)=3$, $N_{xBLOCK\_TI}(1,0)=6$, $N_{xBLOCK\_TI}(2,0)=5$.

The variable number $N_{xBLOCK\_TI}(n,s)=N_r$ will be less than or equal to $N'_{xBLOCK\_TI\_MAX}$. Thus, in order to achieve a single-memory deinterleaving at the receiver side, regardless of $N_{xBLOCK\_TI}(n,s)$, the interleaving array for use in a twisted row-column block interleaver is set to the size of $N_r \times N_c = N_{cells} \times N'_{xBLOCK\_TI\_MAX}$ by inserting the virtual XFECBLOCKs into the TI memory and the reading process is accomplished as follow expression.

[expression 11]

```
p = 0;
for i = 0;i < N_cells N_xBLOCK_TI_MAX;i = i + 1
{GENERATE (R_n,s,i,C_n,s,i);
V_i = N_r C_n,s,j + R_n,s,j
    if V_i < N_cells N_xBLOCK_TI(n,s)
    {
        Z_n,s,p = V_i; p = p + 1;
    }
}
```

The number of TI groups is set to 3. The option of time interleaver is signaled in the PLS2-STAT data by DP_TI_TYPE='0', DP_FRAME_INTERVAL='1', and DP_TI_LENGTH='1', i.e., NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. The maximum number of XFECBLOCK is signaled in the PLS2-STAT data by NxBLOCK_Group_MAX, which leads to $\lfloor N_{xBLOCK\_Group\_MAX}/N_{TI} \rfloor = N_{xBLOCK\_TI\_MAX} = 6$.

Figure 28:
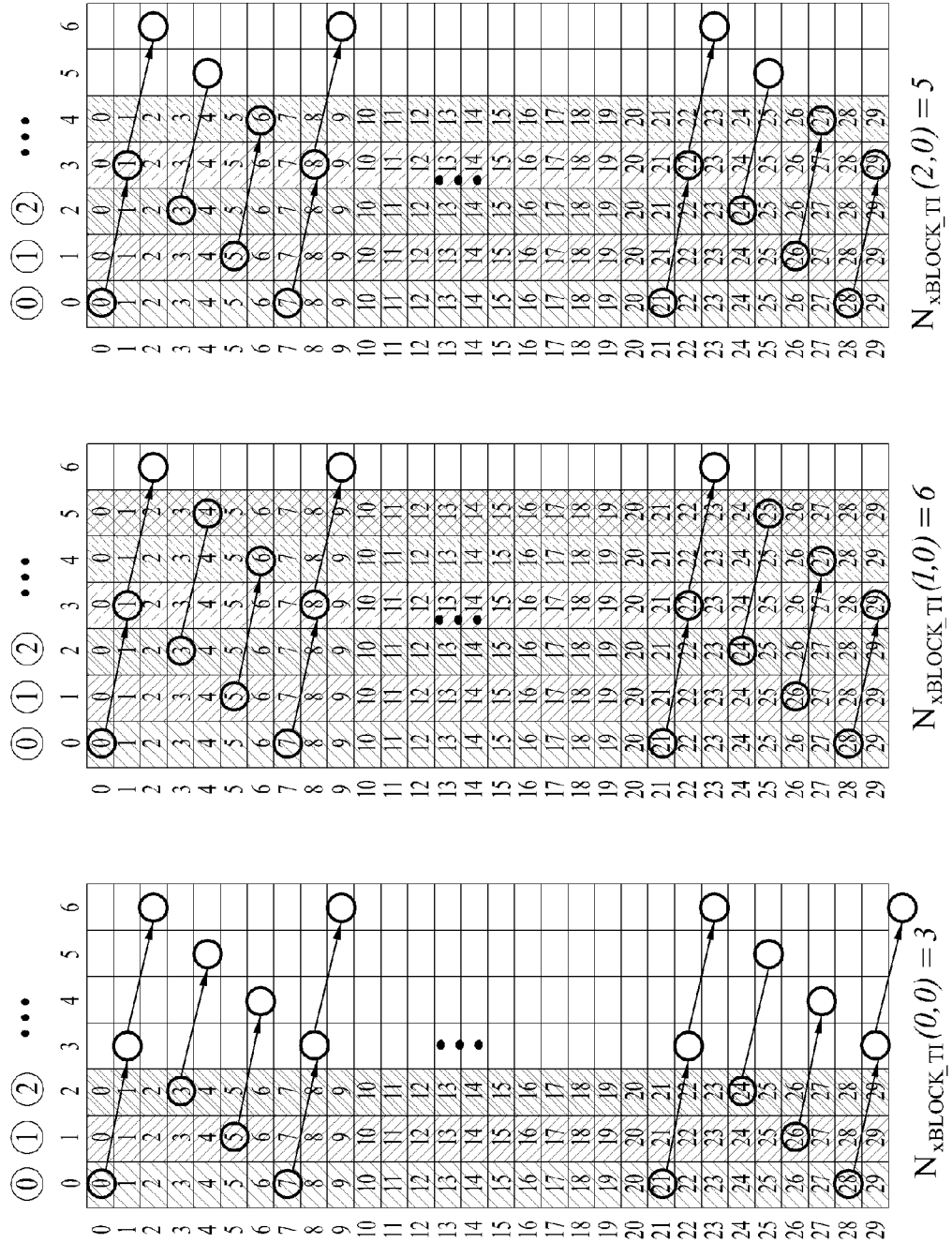
FIG. 28 illustrates a diagonal-wise reading pattern of a twisted row-column block interleaver according to an embodiment of the present invention.

FIG. 28 illustrates a diagonal-wise reading pattern of a twisted row-column block interleaver according to an embodiment of the present invention.

More specifically FIG. 28 shows a diagonal-wise reading pattern from each interleaving array with parameters of $N'_{xBLOCK\_TI\_MAX}=7$ and Sshift=(7−1)/2=3. Note that in the reading process shown as pseudocode above, if $V_i \geq N_{cells} N_{xBLOCK\_TI}(n,s)$, the value of Vi is skipped and the next calculated value of Vi is used.

Figure 29:
FIG. 29 illustrates interlaved XFECBLOCKs from each interleaving array according to an embodiment of the present invention.

FIG. 29 illustrates interlaved XFECBLOCKs from each interleaving array according to an embodiment of the present invention.

FIG. 29 illustrates the interleaved XFECBLOCKs from each interleaving array with parameters of $N'_{xBLOCK\_TI\_MAX}=7$ and Sshift=3.

Figure 30:
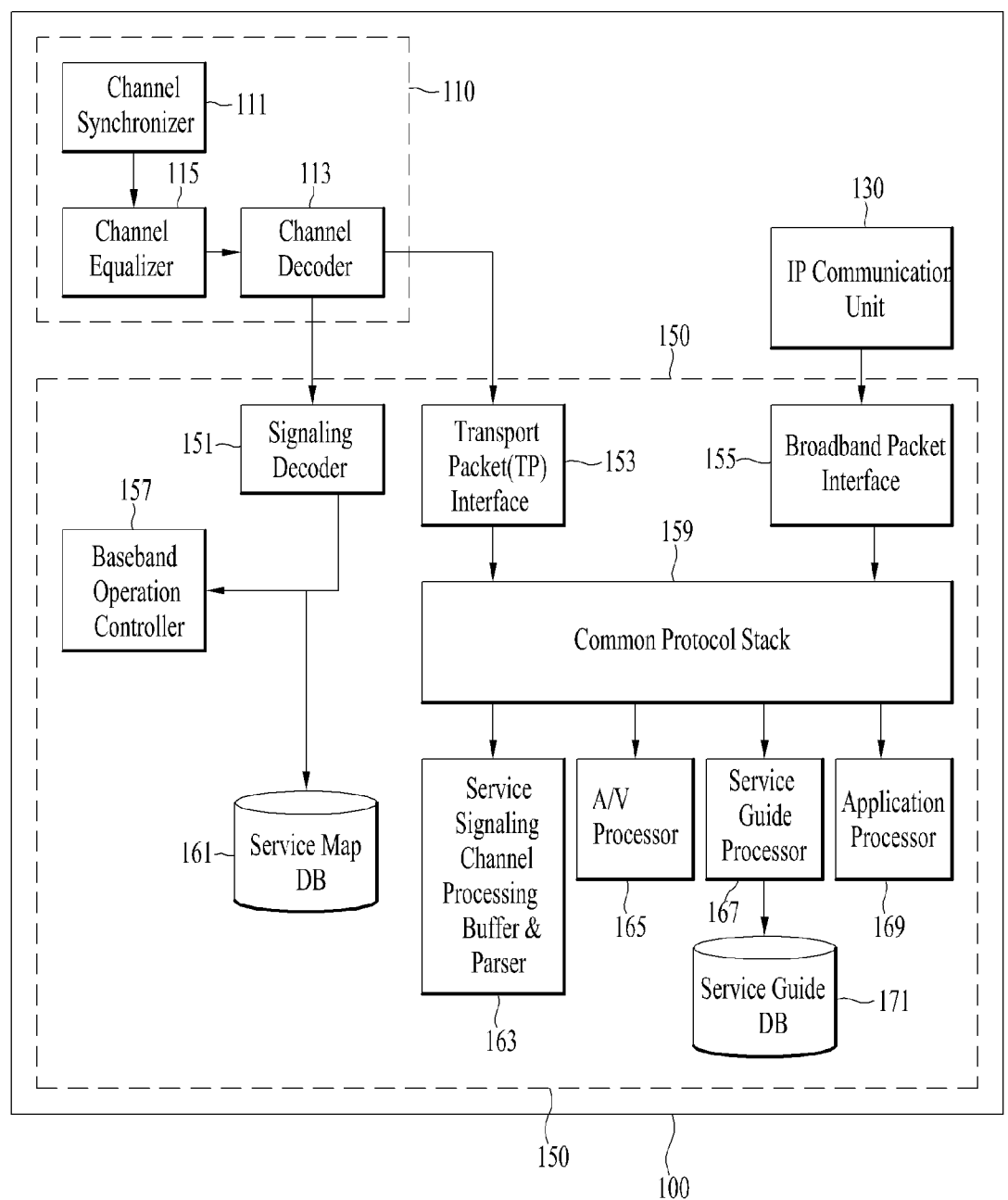
FIG. 30 illustrates the configuration of a broadcast reception apparatus according to an embodiment of the present invention.

FIG. 30 illustrates the configuration of a broadcast reception apparatus according to an embodiment of the present invention.

In the embodiment of FIG. 30, the broadcast reception apparatus 100 includes a broadcast receiving unit 110, an Internet Protocol (IP) communication unit 130, and a controller 150.

The broadcast receiving unit 110 may include one or more processors, one or more circuits, and one or more hardware modules that perform respective functions to be performed by the broadcast receiving unit 110. Specifically, the broadcast receiving unit 110 may be a System on Chip (SOC) in which several semiconductor parts are integrated as one. The SOC may be a semiconductor in which various kinds of multimedia parts, such as a graphics card, an audio card, a video card, and a modem, and various kinds of semiconductor parts, such as a processor and a DRAM, are integrated as one. The broadcast receiving unit 110 includes a channel synchronizer 111, a channel equalizer 113, and a channel decoder 115.

The channel synchronizer 111 synchronizes a symbol frequency with timing such that decoding can be performed in a baseband in which a broadcast signal can be received.

The channel equalizer 113 compensates for the distortion of the synchronized broadcast signal. Specifically, the channel equalizer 113 compensates for the distortion of the synchronized broadcast signal due to multipath, a Doppler effect, etc.

The channel decoder 115 decodes the broadcast signal, the distortion of which has been compensated for. Specifically, the channel decoder 115 extracts a transport frame from the broadcast signal, the distortion of which has been compensated for. At this time, the channel decoder 115 may perform Forward Error Correction (FEC).

The IP communication unit 130 receives and transmits data over the Internet. The IP communication unit 130 may include one or more processors, one or more circuits, and one or more hardware modules that perform respective functions to be performed by the IP communication unit 130. Specifically, the IP communication unit 130 may be a System On Chip (SOC) in which several semiconductor parts are integrated as one. The SOC may be a semiconductor in which various kinds of multimedia parts, such as a graphics card, an audio card, a video card, and a modem, and various kinds of semiconductor parts, such as a processor and a DRAM, are integrated as one.

The controller 150 may include one or more processors, one or more circuits, and one or more hardware modules that perform respective functions to be performed by the controller 150. Specifically, the controller 150 may be a System On Chip (SOC) in which several semiconductor parts are integrated as one. The SOC may be a semiconductor in which various kinds of multimedia parts, such as a graphics card, an audio card, a video card, and a modem, and various kinds of semiconductor parts, such as a processor and a DRAM, are integrated as one. The controller 150 includes a signaling decoder 151, a transport packet interface 153, a broadband packet interface 155, a baseband operation controller 157, a common protocol stack 159, a service map database 161, a service signaling channel processing buffer and parser 163, an A/V processor 165, a broadcast service guide processor 167, an application processor 169, and a service guide database 171.

The signaling decoder 151 decodes signaling information in a broadcast signal.

The transport packet interface 153 extracts a transport packet from the broadcast signal. At this time, the transport packet interface 153 may extract data, such as signaling information or an IP datagram, from the extracted transport packet.

The broadband packet interface 155 extracts an IP packet from data received over the Internet. At this time, the broadband packet interface 155 may extract signaling data or an IP datagram from the IP packet.

The baseband operation controller 157 controls operations related to the reception of broadcast information from the baseband.

The common protocol stack 159 extracts audio or video from the transport packet.

The A/V processor 165 processes the audio or the video.

The service signaling channel processing buffer and parser 163 parses and buffers signaling information that indicates a broadcast service. Specifically, the service signaling channel processing buffer and parser 163 may parse and buffer signaling information that indicates a broadcast service from the IP datagram.

The service map database 165 stores a broadcast service list including information about broadcast services.

The service guide processor 167 processes terrestrial broadcast service guide data that guides terrestrial broadcast service programs.

The application processor 169 extracts and processes application-related information from a broadcast signal.

The service guide database 171 stores program information of a broadcast service.

Figure 31:
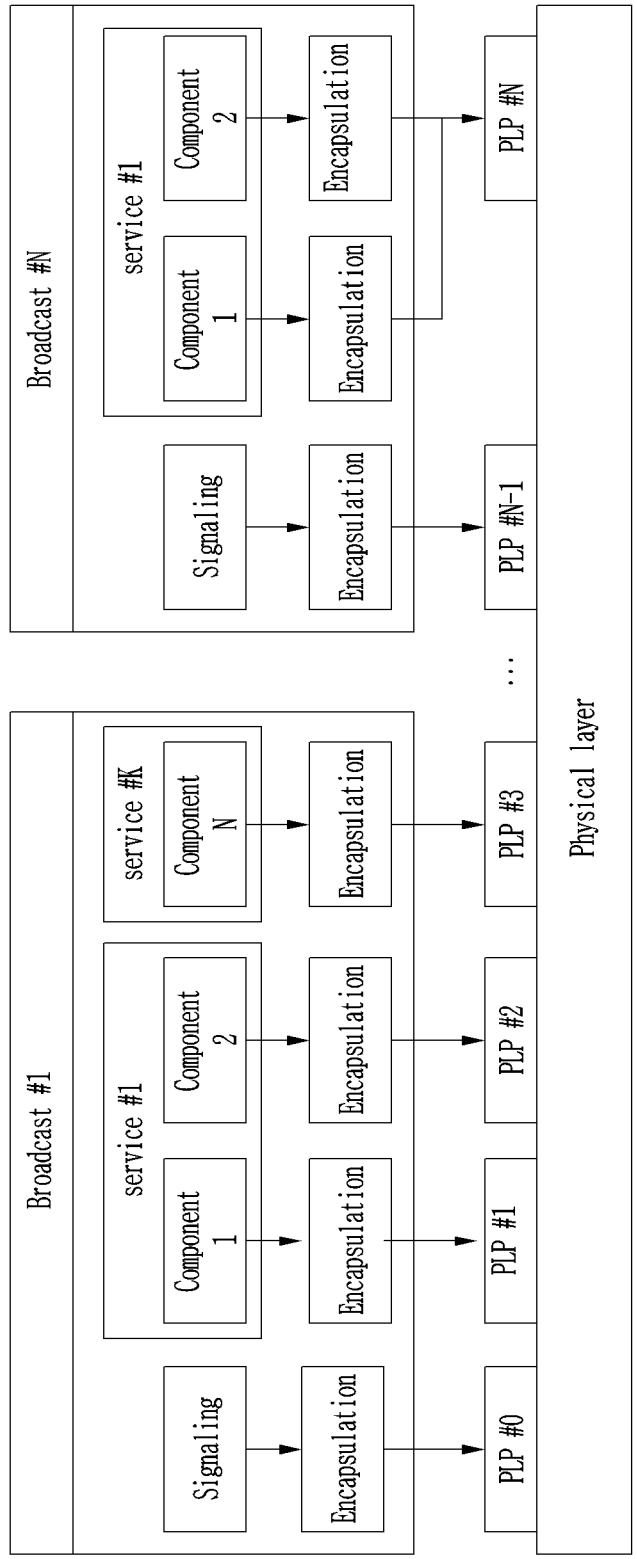
FIG. 31 illustrates a transport layer of a broadcast service according to an embodiment of the present invention.

FIG. 31 illustrates a transport layer of a broadcast service according to an embodiment of the present invention.

A broadcast transmission apparatus may transmit a broadcast service and data related to the broadcast service through at least one Physical Layer Pipe (PLP) over a single frequency or a plurality of frequencies. The PLP is a series of logical data transfer paths that can be identified on a physical layer. The PLP may also be referred to using other terms, such as data pipe. A single broadcast service may include a plurality of components. Each of the components may be one selected from among an audio component, a video component, and a data component. Each broadcasting station may transmit an encapsulated broadcast service through a single PLP or a plurality of PLPs using the broadcast transmission apparatus. Specifically, the broadcasting station may transmit a plurality of components included in a single service through a plurality of PLPs using the broadcast transmission apparatus. Alternatively, the broadcasting station may transmit a plurality of components included in a single service through a single PLP using the broadcast transmission apparatus. For example, in the embodiment of FIG. 31, a first broadcasting station (Broadcast #1) may transmit signaling information through a single PLP (PLP #0) using the broadcast transmission apparatus. In addition, in the embodiment of FIG. 31, the first broadcasting station (Broadcast #1) may transmit a first component (Component 1) and a second component (Component 2) included in a first broadcast service through a first PLP (PLP #1) and a second PLP (PLP #2), which are different from each other, respectively, using the broadcast transmission apparatus. In addition, in the embodiment of FIG. 31, an N-th broadcasting station (Broadcast #N) may transmit a first component (Component 1) and a second component (Component 2) included in a first broadcast service (Service #1) through an N-th PLP (PLP #N). At this time, a real-time broadcast service may be encapsulated using one selected from among an IP, a user datagram protocol (UDP), and a protocol for real-time content transport, such as a real-time transport protocol (RTP). Even non-real-time content or non-real-time data may be encapsulated using at least one packet selected from among, the IP, the UDP, and the content transport protocol, such as FLUTE. Consequently, a plurality of PLPs, through which one or more components are transferred, may be included in a transport frame that is transmitted by the broadcast transmission apparatus. Accordingly, the broadcast reception apparatus 100 must check a plurality of PLPs in order to scan a broadcast service for the acquisition of broadcast service connection information. Therefore, it is necessary to provide a broadcast transmission method and a broadcast reception method that enable the broadcast reception apparatus 100 to efficiently scan a broadcast service.

FIG. 32 illustrates a broadcast transport frame according to an embodiment of the present invention.

In the embodiment of FIG. 32, the broadcast transport frame includes a P1 part, an L1 part, a common PLP part, a scheduled and interleaved PLP part, and an auxiliary data part.

In the embodiment of FIG. 32, the broadcast transmission apparatus transmits information for transport signal detection through the P1 part of the broadcast transport frame. In addition, the broadcast transmission apparatus may transmit tuning information for broadcast signal tuning through the P1 part.

In the embodiment of FIG. 32, the broadcast transmission apparatus transmits the configuration of the broadcast transport frame and the characteristics of each PLP through the L part. At this time, the broadcast reception apparatus 100 may decode the L part based on the P1 part to acquire the configuration of the broadcast transport frame and the characteristics of each PLP.

In the embodiment of FIG. 32, the broadcast transmission apparatus may transmit information that is commonly applied to the PLPs through the common PLP part. In another concrete embodiment, the broadcast transport frame does not include the common PLP part.

In the embodiment of FIG. 32, the broadcast transmission apparatus transmits a plurality of components included in a broadcast service through the scheduled and interleaved PLP part. Here, the scheduled and interleaved PLP part includes a plurality of PLPs.

In the embodiment of FIG. 32, the broadcast transmission apparatus may indicate the PLP through which each component constituting a broadcast service is transmitted, via either the L1 part or the common PLP part. In order to acquire concrete broadcast service information for broadcast service scanning, etc., however, the broadcast reception apparatus 100 must decode all of the PLPs in the scheduled and interleaved PLP part.

Unlike the embodiment of FIG. 32, the broadcast transmission apparatus may transmit a broadcast transport frame including a broadcast service transmitted through the broadcast transport frame and an additional part including information about components included in the broadcast service.

At this time, the broadcast reception apparatus 100 may rapidly acquire the broadcast service and the information about the components included in the broadcast service through the additional part, which will be described hereinafter with reference to FIGS. 33 to 45.

FIG. 33 illustrates a broadcast transport frame according to another embodiment of the present invention.

In the embodiment of FIG. 33, the broadcast transport frame includes a P1 part, an L1 part, a fast information channel (FIC) part, a scheduled and interleaved PLP part, and an auxiliary data part.

The embodiment of FIG. 33 is identical to the embodiment of FIG. 32 except for the L1 part and the FIC part. The broadcast transmission apparatus transmits fast information through the FIC part. The fast information may include information about configuration of a broadcast stream transmitted through the transport frame, brief broadcast service information, and component information. The broadcast reception apparatus 100 may scan a broadcast service based on the FIC part. Specifically, the broadcast reception apparatus 100 may extract information about a broadcast service from the FIC part.

The L1 part may further include information about the version of fast information, which indicates whether the fast information included in the FIC part has been changed. In a case in which the fast information has been changed, the broadcast transmission apparatus may change the information about the version of the fast information. In addition, the broadcast reception apparatus 100 may determine whether to receive the fast information based on the information about the version of the fast information. Specifically, in a case in which the information about the version of the fast information that has been previously received is the same as the information about the version of the fast information included in the L1 part, the broadcast reception apparatus 100 may not receive the fast information.

The information included in the FIC part will be described in detail with reference to FIG. 34.

FIG. 34 illustrates the syntax of a fast information chunk according to an embodiment of the present invention.

The fast information chunk that is transmitted through the FIC part of the broadcast transport frame may include at least one selected from among an FIT_data_version field, a num_broadcast field, a broadcast_id field, a delivery_system_id field, a num_service field, a service_id field, a service_category field, a service_hidden_flag field, and an SP_indicator field.

The FIT_data_version field indicates version information about the syntax and semantics of the fast information chunk. The broadcast reception apparatus 100 may determine whether to process a corresponding fast information chunk using this field. For example, in a case in which the value of the FIT_data_version field indicates a version that the broadcast reception apparatus 100 does not support, the broadcast reception apparatus 100 may not process the fast information chunk. In a concrete embodiment, the FIT_data_version field may be an 8-bit field.

The num_broadcast field indicates the number of broadcasting stations that transmit a broadcast service through a corresponding frequency or transport frame that is transmitted. In a concrete embodiment, the num_broadcast field may be an 8-bit field.

The broadcast_id field indicates an identifier that identifies a broadcasting station that transmits a broadcast service through a corresponding frequency or transport frame. In a case in which the broadcast transmission apparatus transmits data based on an MPEG-2 TS, the broadcast_id field may have the same value as transport_stream_id of the MPEG-2 TS. In a concrete embodiment, the broadcast_id field may be a 16-bit field.

The delivery_system_id field indicates an identifier that identifies a broadcast delivery system that applies and processes the same transmission parameter over a broadcast network. In a concrete embodiment, the delivery_system_id field may be a 16-bit field.

The num_service field indicates the number of broadcast services that a broadcasting station corresponding to broadcast_id transmits in a corresponding frequency or transport frame. In a concrete embodiment, the num_service field may be an 8-bit field.

The service_id field indicates an identifier that identifies a broadcast service. In a concrete embodiment, the service_id field may be a 16-bit field.

The service_category field indicates the category of a broadcast service. Specifically, the service_category field may indicate at least one selected from among a TV service, a radio service, a broadcast service guide, an RI service, and emergency alerting. For example, in a case in which the value of the service_category field is 0x01, the service_category field may indicate a TV service. In a case in which the value of the service_category field is 0x02, the service_category field may indicate a radio service. In a case in which the value of the service_category field is 0x03, the service_category field may indicate an RI service. In a case in which the value of the service_category field is 0x08, the service_category field may indicate a service guide. In a case in which the value of the service_category field is 0x09, the service_category field may indicate emergency alerting. In a concrete embodiment, the service_category field may be a 6-bit field.

The service_hidden_flag field indicates whether a corresponding broadcast service is a hidden service. In a case in which the broadcast service is a hidden service, the broadcast service is a test service or a special service. In a case in which the corresponding service is a hidden service, therefore, the broadcast reception apparatus 100 may not show the corresponding service in a service guide or a service list. In addition, in a case in which the corresponding service is a hidden service, the broadcast reception apparatus 100 may prevent the corresponding service from being selected by a channel up/down key input, but may allow the corresponding service to be selected by a number key input. In a concrete embodiment, the service_hidden_flag field may be a 1-bit field.

The SP_indicator field may indicate whether one or more components of a corresponding broadcast service have been service-protected. For example, in a case in which the value of the SP_indicator field is 1, the SP_indicator field may indicate that one or more components of a corresponding broadcast service have been service-protected. In a concrete embodiment, the SP_indicator field may be a 1-bit field. A broadcast service transmission method and a broadcast service reception method using a fast information chunk will be described with reference to FIGS. 35 to 36.

Figure 35:
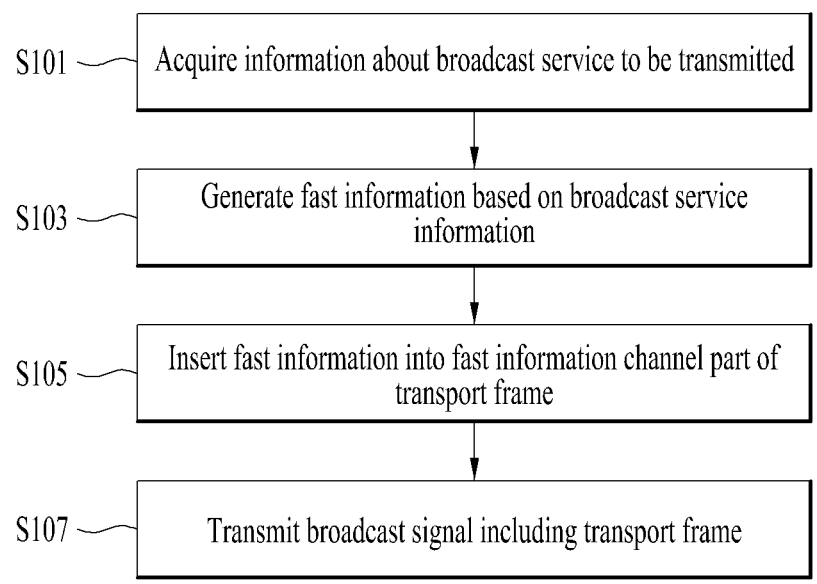
FIG. 35 illustrates a broadcast transmission apparatus according to an embodiment of the present invention transmitting a broadcast service.

FIG. 35 illustrates a broadcast transmission apparatus according to an embodiment of the present invention transmitting a broadcast service.

The broadcast transmission apparatus acquires information about a broadcast service to be transmitted through the controller (S101). Specifically, the broadcast transmission apparatus acquires information about a broadcast service to be included in a frequency or transport frame. In a concrete example, the broadcast transmission apparatus may acquire at least one selected from among a broadcasting station identifier, which identifies a broadcasting station for transmitting a broadcast, a delivery system identifier, which identifies a delivery system for delivering a broadcast, an identifier that identifies a broadcast service, information about the category of a broadcast service, information indicating whether the broadcast service is a hidden service, and information indicating whether the components of a broadcast service have been service-protected.

The broadcast transmission apparatus generates fast information based on broadcast service information through the controller (S103). The fast information may include at least one selected from among a broadcasting station identifier, which identifies a broadcasting station for transmitting a broadcast, a delivery system identifier, which identifies a delivery system for delivering a broadcast, an identifier that identifies a broadcast service, information about the category of a broadcast service, information indicating whether the broadcast service is a hidden service, information indicating whether the components of a broadcast service have been service-protected, information indicating the number of broadcasting stations that transmit a broadcast service in a transport frame into which fast information will be inserted, and information indicating the number of broadcast services corresponding to the respective broadcasting station identifiers in the transport frame. In a concrete embodiment, the broadcast transmission apparatus may generate the same fast information chunk as in the embodiment of FIG. 34.

The broadcast transmission apparatus inserts fast information into a fast information channel part of the transport frame through the controller (S105). The broadcast transmission apparatus may insert fast information into the fast information channel part of the transport frame in the same manner as in the embodiment of FIG. 33.

The broadcast transmission apparatus transmits a broadcast signal including the transport frame through a transmission unit (S107).

Figure 36:
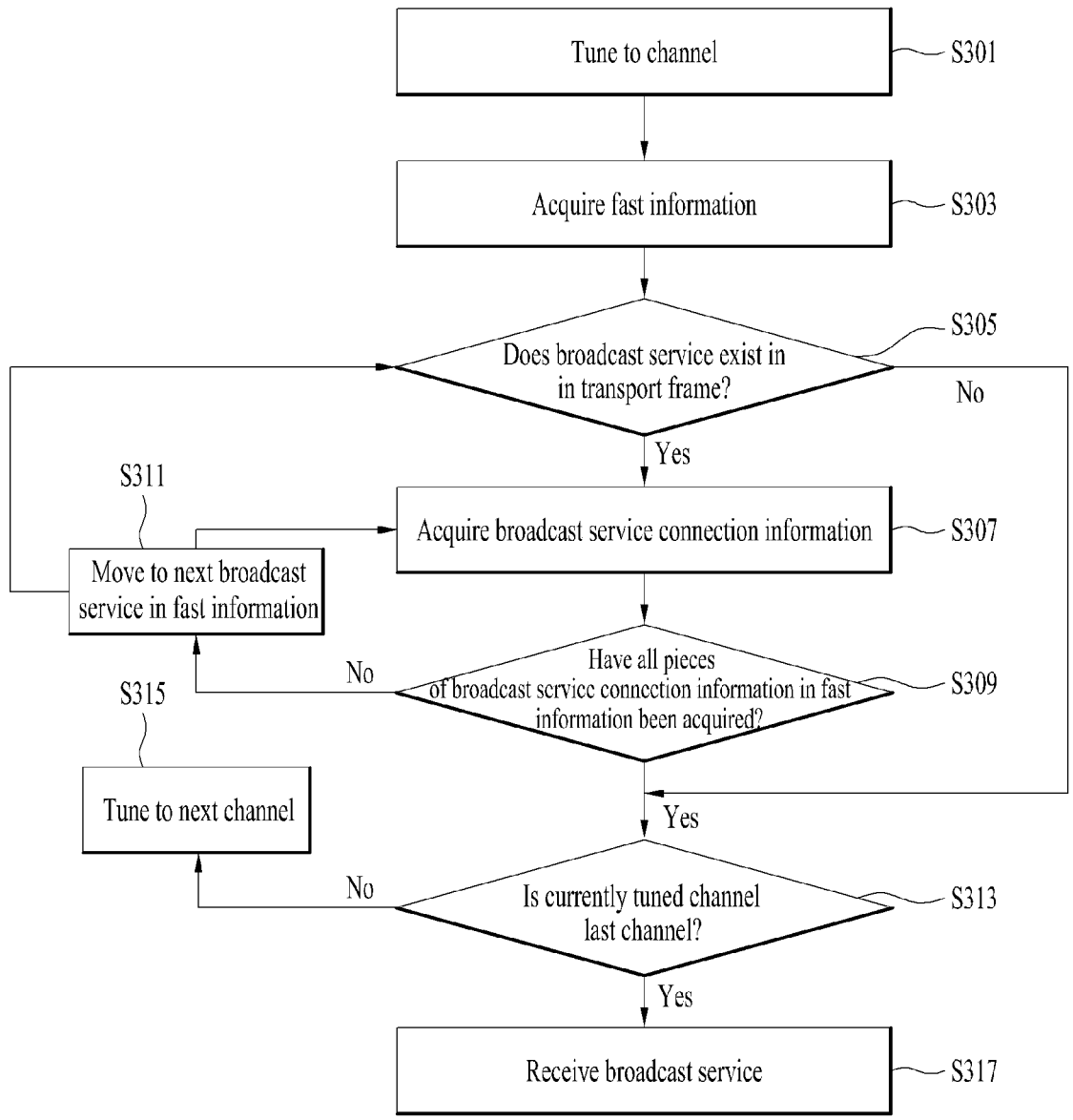
FIG. 36 illustrates a broadcast reception apparatus according to an embodiment of the present invention scanning a broadcast service.

FIG. 36 illustrates a broadcast reception apparatus according to an embodiment of the present invention scanning a broadcast service.

The broadcast reception apparatus 100 tunes the broadcast receiving unit 110 to a channel that is capable of receiving a broadcast signal (S301). In general, for terrestrial broadcasting, a channel list including a frequency that is capable of transmitting a broadcast service for a given region and information about concrete transmission parameters is prescribed. In addition, for cable broadcasting, a channel list including a frequency that is capable of transmitting a broadcast service for a given cable broadcasting provider and information about concrete transmission parameters is prescribed. In a concrete embodiment, therefore, the broadcast reception apparatus 100 may tune to a channel that is capable of receiving a broadcast signal based on a preset channel list.

The broadcast reception apparatus 100 acquires fast information through the controller 150 (S303). Specifically, the broadcast reception apparatus 100 may extract fast information from an FIC part of a transport frame. Here, the fast information may be the fast information chunk of FIG. 34.

In a case in which a broadcast service exists in the transport frame, the broadcast reception apparatus 100 acquires broadcast service connection information through the controller 150 (S305 and S307). In addition, the broadcast reception apparatus 100 may determine whether a broadcast service exists in the transport frame based on information indicating the number of broadcasting stations for transmitting a broadcast service in the transport frame. In another concrete embodiment, the broadcast reception apparatus 100 may determine whether a broadcast service exists in the transport frame based on information indicating whether a broadcast service corresponding to each broadcasting station identifier exists in the transport frame.

The broadcast service connection information may be the minimum information necessary to receive a broadcast service. Specifically, the broadcast service connection information may include at least one selected from among a broadcasting station identifier, which identifies a broadcasting station for transmitting a broadcast, a delivery system identifier, which identifies a delivery system for delivering a broadcast, an identifier that identifies a broadcast service, information about the category of a broadcast service, information indicating whether the broadcast service is a hidden service, information indicating whether the components of a broadcast service have been service-protected, information indicating the number of broadcasting stations that transmit a broadcast service in a transport frame into which fast information will be inserted, and information indicating the number of broadcast services corresponding to the respective broadcasting station identifiers in the transport frame. In a concrete embodiment, the broadcast reception apparatus 100 may generate a broadcast service list including connection information about a plurality of broadcast services based on the acquired broadcast service connection information.

In a case in which not all pieces of broadcast service connection information in the fast information have been acquired, the broadcast reception apparatus 100 acquires broadcast service connection information about the next broadcast service (S309 and S311). In a concrete embodiment, the fast information may include broadcast service connection information about a plurality of broadcast services. Here, the fast information may include broadcast service connection information in the form of a loop in which broadcast service connection information about the broadcast services is successively stored. Specifically, the fast information may include broadcast service connection information about a broadcast service that is provided by each broadcasting station in the form of a loop.

In a case in which no broadcast service exists in the transport frame or in a case in which all pieces of broadcast service connection information in the fast information have been acquired, the broadcast reception apparatus 100 determines whether the currently tuned channel is the last channel (S305, S309, and S313). Specifically, the broadcast reception apparatus 100 may determine whether the currently tuned channel is the last channel of a preset channel list.

In a case in which the currently tuned channel is not the last channel, the broadcast reception apparatus 100 tunes to the next channel to acquire fast information (S315).

In a case in which the currently tuned channel is the last channel, the broadcast reception apparatus 100 receives a broadcast service (S317). At this time, the broadcast service that is received by the broadcast reception apparatus 100 may be a preset broadcast service. In another concrete embodiment, the broadcast service that is received by the broadcast reception apparatus 100 may be a broadcast service for which the connection information was acquired last. In another concrete embodiment, the broadcast service that is received by the broadcast reception apparatus 100 may be a broadcast service for which the connection information was acquired first. In the embodiments of FIGS. 33 to 35, however, the broadcast reception apparatus 100 may acquire only brief information about broadcasting stations that exist in a corresponding frequency or transport frame and a broadcast service that is provided by each of the broadcasting stations. In order to acquire detailed information about each broadcast service transmitted in a corresponding frequency or transport frame, therefore, the broadcast reception apparatus 100 must perform an additional operation. For example, in order to acquire information about components constituting each broadcast service, the broadcast reception apparatus 100 must extract signaling information from the scheduled and interleaved PLP part in the transport frame. Therefore, it is necessary to provide a new broadcast transmission method, an operation method of the broadcast transmission apparatus, a broadcast reception apparatus, and an operation method of the broadcast reception apparatus that enable the broadcast reception apparatus 100 to rapidly and efficiently acquire detailed information about a broadcast service in a transport frame, which will be described with reference to FIGS. 37 to 48.

In a case in which a transport frame includes an additional PLP part including detailed information about broadcast services transmitted through the transport frame, the broadcast reception apparatus 100 may merely extract the additional PLP part to acquire detailed information about broadcast services transmitted through the transport frame. In addition, in a case in which a fast information chunk includes an additional PLP part including detailed information about broadcast services transmitted through a transport frame, the broadcast reception apparatus 100 may efficiently acquire information about the additional PLP part including detailed information about the broadcast services transmitted through the transport frame. Consequently, the transport frame may include an additional PLP part including detailed information about the broadcast services transmitted through the transport frame in the scheduled and interleaved PLP part. Here, the additional PLP part including detailed information about broadcast services transmitted through the transport frame may include signaling information that indicates a broadcast service. In another concrete embodiment, the additional PLP part including detailed information about broadcast services transmitted through the transport frame may include components included in each broadcast service.

In addition, the fast information chunk may include an additional PLP part that includes detailed information about broadcast services transmitted through the transport frame. Specifically, the fast information chunk may include an identifier that identifies the additional PLP part that includes detailed information about the broadcast services transmitted through the transport frame, which will be described in detail with reference to FIGS. 37 to 40. Hereinafter, the additional PLP part including the detailed information about the broadcast services transmitted through the transport frame will be referred to as a base PLP.

FIGS. 37 to 40 illustrate the syntax of a fast information chunk according to another embodiment of the present invention.

In the embodiment of FIG. 37, the fast information chunk further includes a base_PLP_id field and a base_PLP_version field, unlike the embodiment of FIG. 34.

The base_PLP_id field is an identifier that identifies a base PLP regarding a broadcast service that is provided by a broadcasting station corresponding to broadcast_id. In a concrete embodiment, the base PLP may transfer signaling information that indicates a broadcast service being transmitted through the transport frame. In a concrete embodiment, the signaling information that indicates the broadcast service may be MPEG2-TS PSI. In addition, in a concrete embodiment, the signaling information that indicates the broadcast service may be ATSC PSIP. In addition, in a concrete embodiment, the signaling information that indicates the broadcast service may be DVB SI. In another concrete embodiment, the base PLP may include components included in a broadcast service transmitted through the transport frame. In a concrete embodiment, the base_PLP_id field may be an 8-bit field.

The base_PLP_version field may indicate version information about the change of data transmitted through the base PLP. For example, when service signaling is changed in a case in which signaling information is transferred through base_PLP, the value of the base_PLP_version field may increase by 1. In a concrete embodiment, the base_PLP_version field may be a 5-bit field. The broadcast reception apparatus 100 may determine whether to receive data transmitted through base_PLP based on the base_PLP_version field. For example, in a case in which the value of the base_PLP_version field is the same as the value of the base_PLP_version field of data transmitted through the base PLP that has been previously received, the broadcast reception apparatus 100 may not receive data transmitted through the base PLP.

Meanwhile, the number of PLPs in the transport frame may be set to a maximum of 32. In this case, the maximum value that the base_PLP_id field can have is 32 or less, and therefore the base_PLP_id field may be a 6-bit field. In addition, the value that the num_service field can have is 32 or less, and therefore the num_service field may be a 5-bit field.

FIG. 38 illustrates an embodiment in which the base_PLP_id field is a 6-bit field and the num_service field is a 5-bit field.

In addition, the fast information chunk may include information about the components of a broadcast service. In a concrete embodiment, the fast information chunk may include a num_component field, a component_id_field, and a PLP_id_field.

The num_component field indicates the number of components constituting a corresponding broadcast service. In a concrete embodiment, the num_component field may be an 8-bit field.

The component_id field indicates an identifier that identifies a corresponding component in a broadcast service. In a concrete embodiment, the component_id field may be an 8-bit field.

The PLP_id field indicates an identifier that identifies a PLP, through which a corresponding component is transmitted in a transport frame. In a concrete embodiment, the PLP_id field may be an 8-bit field.

FIG. 39 illustrates an embodiment in which the fast information chunk includes a num_component field, a component_id field, and a PLP_id field.

In addition, as previously described, the number of PLPs in the transport frame may be set to a maximum of 32. In this case, even when the fast information chunk includes a num_component field, a component_id field, and a PLP_id field, a base_PLP_id field may be a 6-bit field. In addition, a num_service field may be a 5-bit field.

FIG. 40 illustrates an embodiment in which the fast information chunk includes a num_component field, a component_id field, and a PLP_id field, a base_PLP_id field is a 6-bit field, and a num_service field is a 5-bit field.

Figure 41:
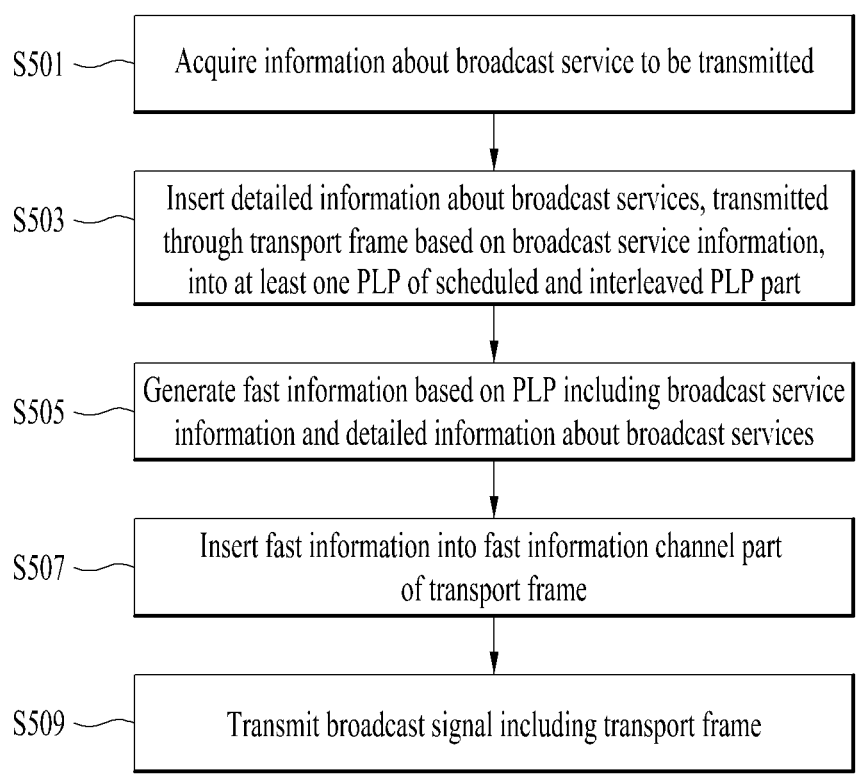
FIG. 41 illustrates a broadcast transmission apparatus according to another embodiment of the present invention transmitting a broadcast service.

FIG. 41 illustrates a broadcast transmission apparatus according to another embodiment of the present invention transmitting a broadcast service.

The broadcast transmission apparatus acquires information about a broadcast service to be transmitted through the controller (S501). Specifically, the broadcast transmission apparatus acquires information about a broadcast service to be included in a frequency or transport frame. In a concrete example, the broadcast transmission apparatus may acquire at least one selected from among a broadcasting station identifier, which identifies a broadcasting station for transmitting a broadcast, a delivery system identifier, which identifies a delivery system for delivering a broadcast, an identifier that identifies a broadcast service, information about the category of a broadcast service, information indicating whether the broadcast service is a hidden service, information indicating whether components of a broadcast service have been service-protected, information indicating an identifier of an component included in a broadcast service, and signaling information that indicates a broadcast service. The signaling information may be one selected from among MPEG2-TS PSI, ATSC PSIP, and DVB SI. In addition, the signaling information may include signaling information that indicates a broadcast service based on standards that will be newly established in the future in addition to the above-mentioned standards.

The broadcast transmission apparatus inserts detailed information about broadcast services transmitted through the transport frame based on broadcast service information into at least one PLP of the scheduled and interleaved PLP part through the controller (S503). As previously described, the detailed information about broadcast services may be signaling information that indicates a broadcast service. The signaling information may be one selected from among MPEG2-TS PSI, ATSC PSIP, and DVB SI. In addition, the signaling information may include signaling information that indicates a broadcast service based on standards that will be newly established in the future in addition to the above-mentioned standards. In addition, the broadcast transmission apparatus inserts components of each broadcast service included in the broadcast services transmitted through the transport frame based on the broadcast service information into at least one PLP of the scheduled and interleaved PLP part. Here, the PLP, into which the detailed information about broadcast services transmitted through the transport frame has been inserted, is a base PLP.

The broadcast transmission apparatus generates fast information based on the PLP including the broadcast service information and detailed information about the broadcast services through the controller (S505). The fast information may include at least one selected from among a broadcasting station identifier, which identifies a broadcasting station for transmitting a broadcast, a delivery system identifier, which identifies a delivery system for delivering a broadcast, an identifier that identifies a broadcast service, information about the category of a broadcast service, information indicating whether the broadcast service is a hidden service, information indicating whether components of a broadcast service have been service-protected, information indicating the number of broadcasting stations that transmit a broadcast service in a transport frame into which fast information will be inserted, information indicating the number of broadcast services corresponding to the respective broadcasting station identifiers in the transport frame, information indicating the number of components included in a broadcast service, an identifier that identifies components included in a broadcast service, and an identifier that identifies a PLP including a corresponding component. In addition, the fast information may include an identifier that identifies a base PLP. In addition, the fast information may include information indicating the change of information in the base PLP. In a concrete embodiment, the broadcast transmission apparatus may generate the same fast information chunk as in the embodiments of FIGS. 37 to 40.

The broadcast transmission apparatus inserts fast information into the fast information channel part of the transport frame through the controller (S507). The broadcast transmission apparatus may insert fast information into the fast information channel part of the transport frame in the same manner as in the embodiment of FIG. 33.

The broadcast transmission apparatus transmits a broadcast signal including the transport frame through a transmission unit (S509).

Figure 42:
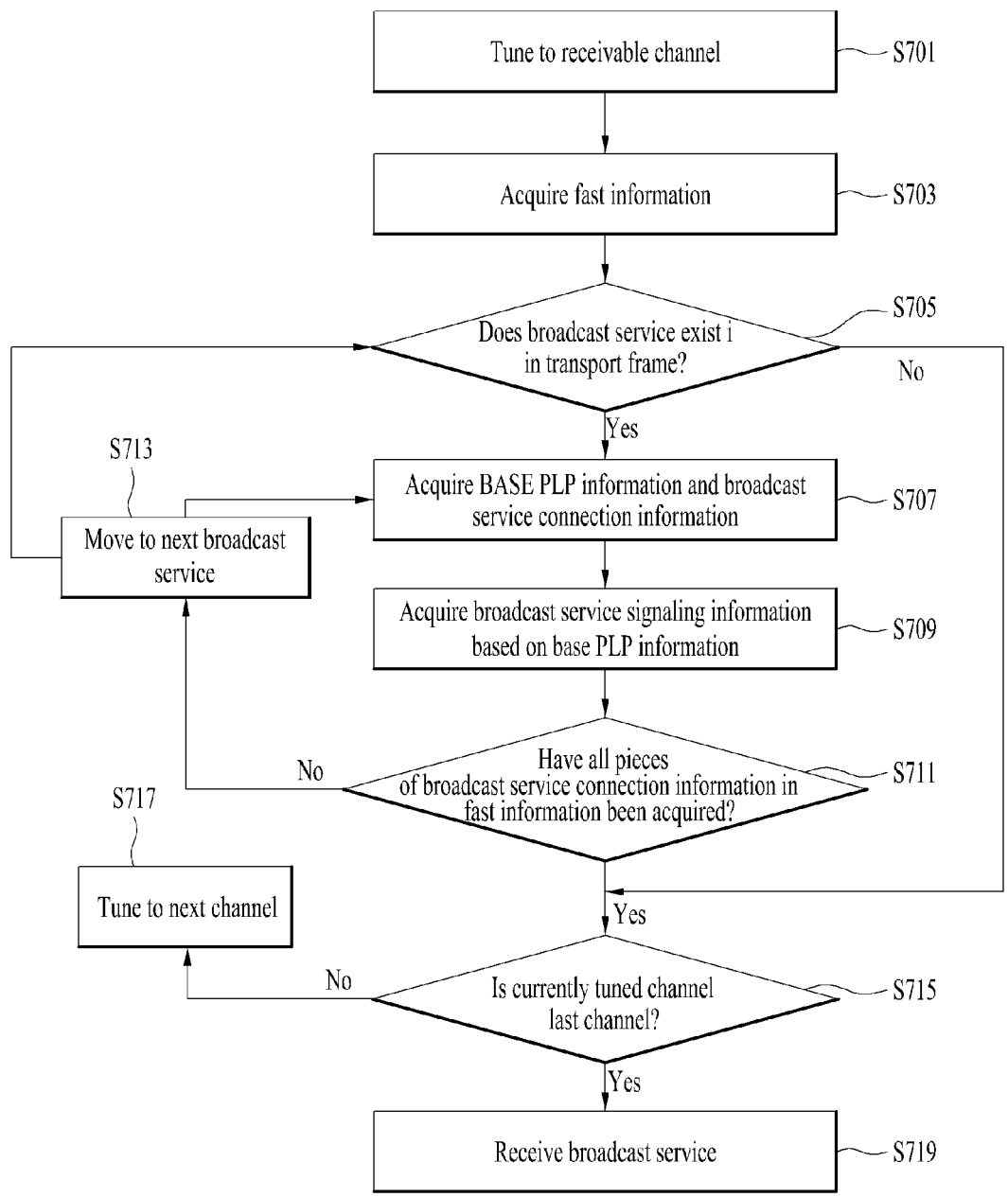
FIG. 42 illustrates a broadcast reception apparatus according to another embodiment of the present invention scanning a broadcast service.

FIG. 42 illustrates a broadcast reception apparatus according to another embodiment of the present invention scanning a broadcast service.

The broadcast reception apparatus 100 tunes the broadcast receiving unit 110 to a channel that is capable of receiving a broadcast signal (S701). In general, for terrestrial broadcasting, a channel list including a frequency that is capable of transmitting a broadcast service for a given region and information about concrete transmission parameters is prescribed, as previously described. In addition, for cable broadcasting, a channel list including a frequency that is capable of transmitting a broadcast service for a given cable broadcasting provider and information about concrete transmission parameters is prescribed. In a concrete embodiment, therefore, the broadcast reception apparatus 100 may tune to a channel that is capable of receiving a broadcast signal based on a preset channel list.

The broadcast reception apparatus 100 acquires fast information through the controller 150 (S703). Specifically, the broadcast reception apparatus 100 may extract fast information from an FIC part of a transport frame. Here, the fast information may be the fast information chunk in the embodiments of FIGS. 34 to 40.

In a case in which a broadcast service exists in the transport frame, the broadcast reception apparatus 100 acquires BASE PLP information and broadcast service connection information through the controller 150 (S705 and S707). In addition, the broadcast reception apparatus 100 may determine whether a broadcast service exists in the transport frame based on information indicating the number of broadcasting stations for transmitting a broadcast service in the transport frame. In another concrete embodiment, the broadcast reception apparatus 100 may determine whether a broadcast service exists in the transport frame based on information indicating whether a broadcast service corresponding to each broadcasting station identifier exists in the transport frame.

The broadcast service connection information may be the minimum information necessary to receive a broadcast service. Specifically, the broadcast service connection information may include at least one selected from among a broadcasting station identifier, which identifies a broadcasting station for transmitting a broadcast, a delivery system identifier, which identifies a delivery system for delivering a broadcast, an identifier that identifies a broadcast service, information about the category of a broadcast service, information indicating whether the broadcast service is a hidden service, information indicating whether components of a broadcast service have been service-protected, information indicating the number of broadcasting stations that transmit a broadcast service in a transport frame into which fast information will be inserted, information indicating the number of broadcast services corresponding to the respective broadcasting station identifiers in the transport frame, information indicating the number of components included in a broadcast service, an identifier that identifies components included in a broadcast service, and an identifier that identifies a PLP including a corresponding component. In a concrete embodiment, the broadcast reception apparatus 100 may generate a broadcast service list including connection information about a plurality of broadcast services based on the acquired broadcast service connection information. In addition, the base PLP information may include one selected from between an identifier that identifies a base PLP and information indicating the change of information in the base PLP.

The broadcast reception apparatus 100 acquires signaling information about a broadcast service based on the base PLP information through the controller 150. As previously described, the signaling information may be one selected from among MPEG2-TS PSI, ATSC PSIP, and DVB SI. In addition, the signaling information may include signaling information that indicates a broadcast service based on standards that will be newly established in the future in addition to the above-mentioned standards.

The operation of the broadcast reception apparatus 100 will be described in detail with reference to FIGS. 43 and 44.

Figure 43:
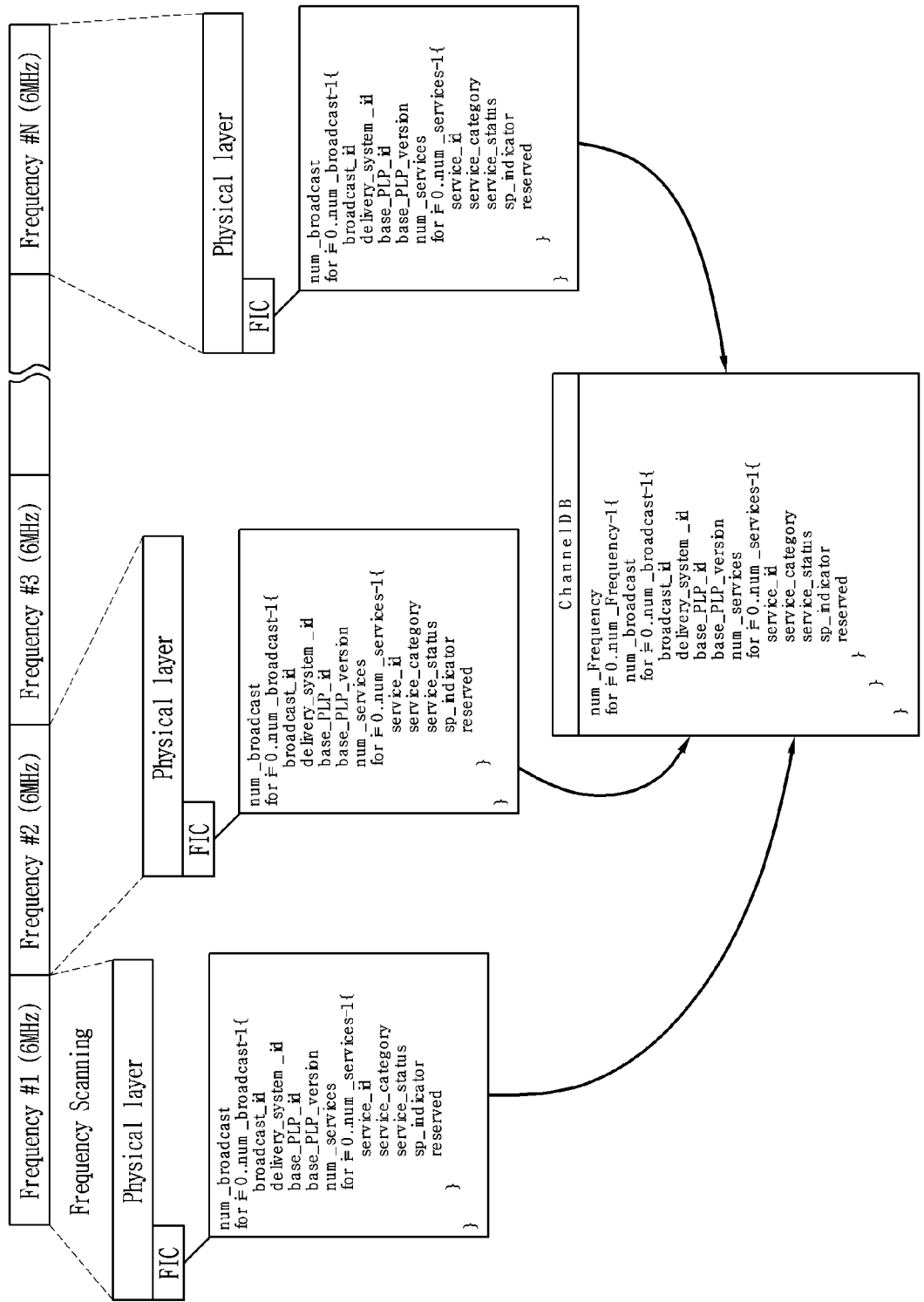
FIG. 43 illustrates the flow of broadcast data used by a broadcast reception apparatus according to an embodiment of the present invention to scan a broadcast service.
Figure 44:
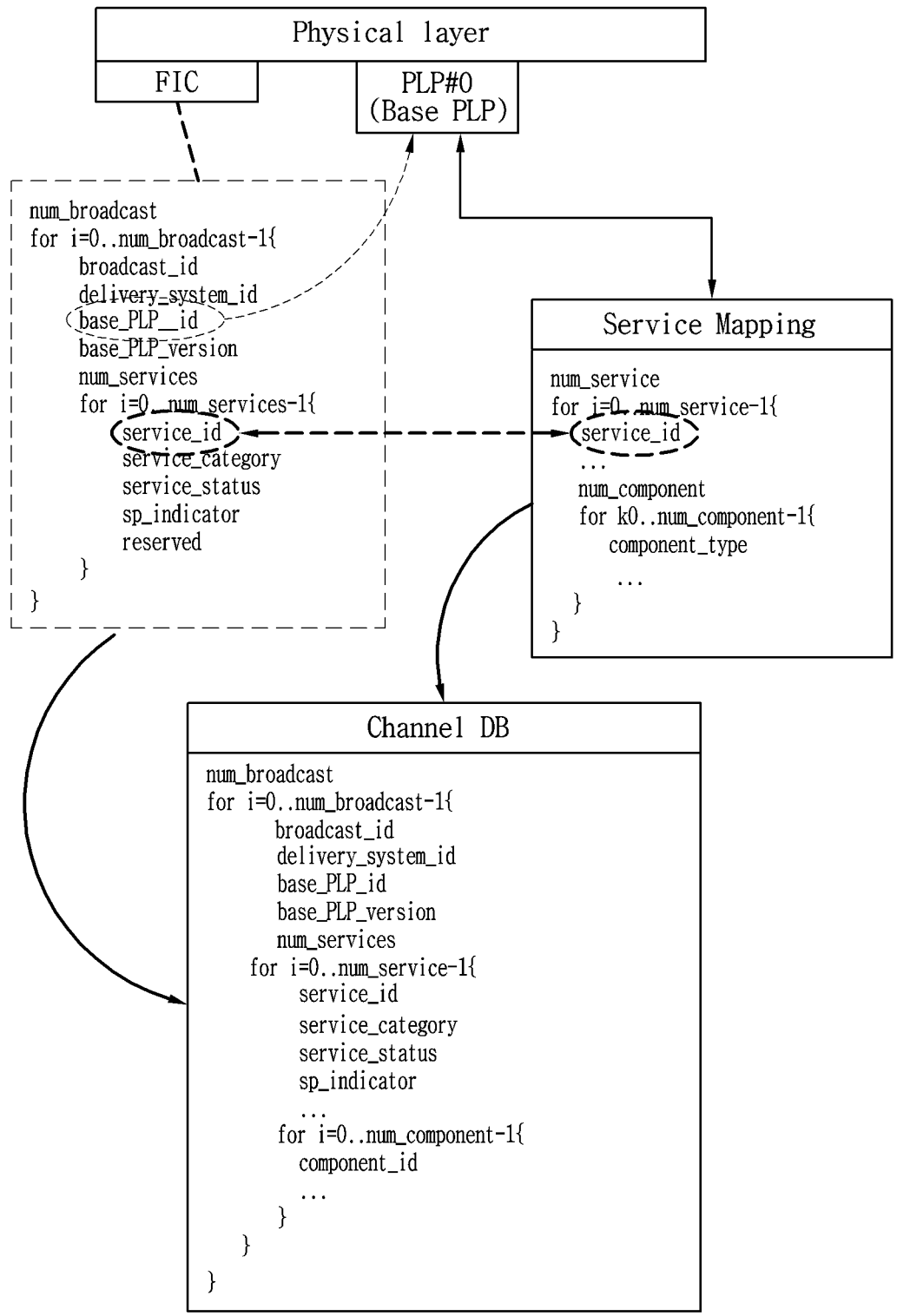
FIG. 44 illustrates the flow of broadcast data used by a broadcast reception apparatus according to an embodiment of the present invention to acquire broadcast service information.

As in the embodiment of FIG. 43, the broadcast reception apparatus 100 may acquire broadcast service connection information from fast information. In addition, the broadcast reception apparatus 100 may generate a broadcast service list including connection information about broadcast services. In order to acquire detailed information about the broadcast services, however, the broadcast reception apparatus 100 must acquire information from base_PLP. To this end, the broadcast reception apparatus 100 identifies base_PLP based on base_PLP information. Specifically, as in the embodiment of FIG. 44, the broadcast reception apparatus 100 may acquire a base_PLP identifier from fast information, and may identify base_PLP from a plurality of PLPs based on the base_PLP identifier. In addition, the broadcast reception apparatus 100 may acquire signaling information based on the broadcast service connection information from signaling information included in base_PLP. Specifically, the broadcast reception apparatus 100 may acquire signaling information corresponding to the broadcast service connection information. For example, the broadcast reception apparatus 100 may acquire the type of a component, included in a broadcast service corresponding to a broadcast service identifier acquired from the fast information, from base_PLP.

In a case in which not all pieces of broadcast service connection information in the fast information have been acquired, the broadcast reception apparatus 100 acquires broadcast service connection information about the next broadcast service (S711 and S713). In a concrete embodiment, the fast information may include broadcast service connection information about a plurality of broadcast services. Here, the fast information may include broadcast service connection information in the form of a loop in which the broadcast service connection information about the broadcast services is successively stored. Specifically, the fast information may include broadcast service connection information about a broadcast service that is provided by each broadcasting station in the form of a loop.

In a case in which no broadcast service exists in the transport frame or in a case in which all pieces of broadcast service connection information in the fast information have been acquired, the broadcast reception apparatus 100 determines whether the currently tuned channel is the last channel (S705, S711, and S715). Specifically, the broadcast reception apparatus 100 may determine whether the currently tuned channel is the last channel of a preset channel list, as previously described.

In a case in which the currently tuned channel is not the last channel, the broadcast reception apparatus 100 tunes to the next channel to acquire fast information (S717).

In a case in which the currently tuned channel is the last channel, the broadcast reception apparatus 100 receives a broadcast service (S719). Here, the broadcast service that is received by the broadcast reception apparatus 100 may be a preset broadcast service. In another concrete embodiment, the broadcast service that is received by the broadcast reception apparatus 100 may be a broadcast service for which the connection information was acquired last. In another concrete embodiment, the broadcast service that is received by the broadcast reception apparatus 100 may be a broadcast service for which the connection information was acquired first.

The broadcast reception apparatus 100 may efficiently acquire detailed information about a broadcast service as well as brief information about the broadcast service through base_PLP. In addition, the broadcast reception apparatus 100 may rapidly acquire detailed information about a broadcast service as well as brief information about the broadcast service through base_PLP.

In a case in which no additional FIC part exists in the transport frame, however, the broadcast transmission apparatus may transmit fast information in the form of a table through a common PLP part that transfers information shared in a PLP or an additional PLP. The fast information table may be encapsulated into a generic packet including an MPEG2-TS or IP/UDP datagram or an IP/UDP datagram. In addition, the broadcast reception apparatus 100 may receive the fast information table from the common PLP part or the additional PLP through the controller 150. In addition, the broadcast reception apparatus 100 may perform the operation of FIG. 44 with respect to the fast information table. The form of the fast information table will be described with reference to FIGS. 45 to 48.

FIG. 45 illustrates the syntax of a fast information table according to an embodiment of the present invention.

The fast information table may include at least one selected from among a table_id field, a section_syntax_indicator field, a private_indicator field, a section_length field, a table_id_extension field, a table_id_extension field, an FIT_data_version field, a current_next_indicator field, a section_number field, a last_section_number field, a num_broadcast field, a broadcast_id field, a delivery_system_id field, a base_PLP_id field, a base_PLP_version field, a num_service field, a service_id field, a service_category field, a service_hidden_flag field, an SP_indicator field, a num_component field, a component_id field, and a PLP_id field.

The table_id field indicates an identifier of the fast information table. The table_id field may be 0xFA, which is one of the reserved id values defined by ATSC A/65. In a concrete embodiment, the table_id field may be an 8-bit field.

The section_syntax_indicator field indicates whether the fast information table is a long type of private section table based on MPEG-2 TS. In a concrete embodiment, the section_syntax_indicator field may be a 1-bit field.

The private_indicator field indicates whether the current table corresponds to a private section. In a concrete embodiment, the private_indicator field may be a 1-bit field.

The section_length field indicates the length of a section included after the section_length field. In a concrete embodiment, the section_length field may be a 12-bit field.

The table_id_extension field may indicate an identifier that identifies fast information. In a concrete embodiment, the table_id_extension field may be a 16-bit field.

The FIT_data_version field indicates version information about the syntax and semantics of the fast information table. The broadcast reception apparatus 100 may determine whether to process the fast information table using this field. For example, in a case in which the value of the FIT_data_version field indicates a version that the broadcast reception apparatus 100 does not support, the broadcast reception apparatus 100 may not process the fast information table. In a concrete embodiment, the FIT_data_version field may be a 5-bit field.

The current_next_indicator field indicates whether information of the fast information table is currently usable. Specifically, in a case in which the value of the current_next_indicator field is 1, the current_next_indicator field may indicate that information of the fast information table is usable. In addition, in a case in which the value of the current_next_indicator field is 1, the current_next_indicator field may indicate that the information of the fast information table is usable next. In a concrete embodiment, the current_next_indicator field may be a 1-bit field.

The section_number field indicates the number of a current section. In a concrete embodiment, the section_number field may be an 8-bit field.

The last_section_number field indicates the number of the last section. In a case in which the fast information table is large, the fast information table may be transmitted in a state of having been divided into a plurality of sections. At this time, the broadcast reception apparatus 100 may determine whether to receive all sections necessary for the fast information table based on the section_number field and the last_section_number field. In a concrete embodiment, the last_section_number field may be an 8-bit field.

The num_broadcast field indicates the number of broadcasting stations that transmit a broadcast service through a corresponding frequency or transport frame that is transmitted. In a concrete embodiment, the num_broadcast field may be an 8-bit field.

The broadcast_id field indicates an identifier that identifies a broadcasting station that transmits a broadcast service through a corresponding frequency or transport frame. In a case in which the broadcast transmission apparatus transmits data based on MPEG-2 TS, broadcast_id may have the same value as transport_stream_id of MPEG-2 TS. In a concrete embodiment, the broadcast_id field may be a 16-bit field.

The delivery_system_id field indicates an identifier that identifies a broadcast delivery system that applies and processes the same transmission parameter over a broadcast network. In a concrete embodiment, the delivery_system_id field may be a 16-bit field.

The base_PLP_id field is an identifier that identifies a base PLP regarding a broadcast service that is provided by a broadcasting station corresponding to broadcast_id. In a concrete embodiment, the base PLP may transfer signaling information that indicates a broadcast service transmitted through the transport frame. In a concrete embodiment, the signaling information that indicates the broadcast service may be MPEG2-TS PSI. In addition, in a concrete embodiment, the signaling information that indicates the broadcast service may be ATSC PSIP. In addition, in a concrete embodiment, the signaling information that indicates the broadcast service may be DVB SI. In another concrete embodiment, the base PLP may include components included in a broadcast service transmitted through the transport frame. In a concrete embodiment, the base_PLP_id field may be an 8-bit field.

The base_PLP_version field may indicate version information about the change of data transmitted through the base PLP. For example, when a service signal is changed in a case in which signaling information is transferred through base_PLP, the value of the base_PLP_version field may increase by 1. In a concrete embodiment, the base_PLP_version field may be a 5-bit field.

The num_service field indicates the number of broadcast services that a broadcasting station corresponding to broadcast_id transmits in a corresponding frequency or transport frame. In a concrete embodiment, the num_service field may be an 8-bit field.

The service_id field indicates an identifier that identifies a broadcast service. In a concrete embodiment, the service_id field may be a 16-bit field.

The service_category field indicates the category of a broadcast service. Specifically, the service_category field may have at least one selected from among a TV service, a radio service, a broadcast service guide, an RI service, and emergency alerting. For example, in a case in which the value of the service_category field is 0x01, the service_category field may indicate a TV service. In a case in which the value of the service_category field is 0x02, the service_category field may indicate a radio service. In a case in which the value of the service_category field is 0x03, the service_category field may indicate an RI service. In a case in which the value of the service_category field is 0x08, the service_category field may indicate a service guide. In a case in which the value of the service_category field is 0x09, the service_category field may indicate emergency alerting. In a concrete embodiment, the service_category field may be a 6-bit field.

The service_hidden_flag field indicates whether a corresponding broadcast service is a hidden service. In a case in which the broadcast service is a hidden service, the broadcast service is a test service or a special service. In a case in which the corresponding service is a hidden service, therefore, the broadcast reception apparatus 100 may not show the corresponding service in a service guide or a service list. In addition, in a case in which the corresponding service is a hidden service, the broadcast reception apparatus 100 may prevent the corresponding service from being selected by a channel up/down key input, but may allow the corresponding service to be selected by a number key input. In a concrete embodiment, the service_hidden_flag field may be a 1-bit field.

The SP_indicator field may indicate whether one or more components of a corresponding broadcast service have been service-protected. For example, in a case in which the value of the SP_indicator field is 1, the SP_indicator field may indicate that one or more components of a corresponding broadcast service have been service-protected. In a concrete embodiment, the SP_indicator field may be a 1-bit field.

The num_component field indicates the number of components constituting a corresponding broadcast service. In a concrete embodiment, the num_component field may be an 8-bit field.

The component_id field indicates an identifier that identifies a corresponding component in a broadcast service. In a concrete embodiment, the component_id_field may be an 8-bit field.

The PLP_id field indicates an identifier that identifies a PLP, through which a corresponding component is transmitted in a transport frame. In a concrete embodiment, the PLP_id field may be an 8-bit field. The contents of information included in the fast information table are similar to those of the information included in the fast information chunk that has been previously described. Since the fast information table is not transmitted through the FIC channel part, however, the size of the information included in the fast information table is not limited to the same extent as the information included in the fast information chunk. Consequently, the fast information table may include information that is not included in the fast information chunk, which will be described with reference to FIG. 46.

FIG. 47 illustrates the syntax of a fast information table according to another embodiment of the present invention.

As in the embodiment of FIG. 46, the fast information table may include at least one selected from among a short_service_name_length field, a short_service_name field, a num_descriptors field, and a service_descriptor field.

The short_service_name_length field indicates the length of the value of the short_service_name field. In a concrete embodiment, the short_service_name_length field may be a 3-bit field.

The short_service_name field indicates the short name for a corresponding broadcast service. In a concrete embodiment, the short_service_name field may be a field having a bit size obtained by multiplying the value of short_service_name_length field by 8.

The num_descriptors field indicates the number of service-level descriptors including detailed information about a corresponding service. In a concrete embodiment, the num_descriptors field may be an 8-bit field.

The service_descriptor field indicates a service descriptor including detailed information about a corresponding service. Since the size of the fast information table is not limited to the same extent as the fast information chunk, as previously described, detailed information about broadcast service information may also be transmitted and received through service_descriptor. In addition, the fast information table may be transmitted and received in the form of an XML file in addition to the bitstream form described with reference to FIGS. 45 and 46, which will be described with reference to FIG. 47.

FIG. 47 illustrates the syntax of a fast information table according to another embodiment of the present invention.

In a case in which the fast information table is a table in an XML form, the fast information table may include at least one selected from among an FITdataversion attribute, a broadcastID attribute, a deliverySystemID attribute, a basePLPID attribute, a basePLPversion attribute, a serviceID attribute, a serviceCategory attribute, a serviceHidden attribute, a ServiceProtection attribute, a componentID attribute, and a PLPID attribute.

The FITdataversion attribute indicates version information about the syntax and semantics of the fast information table. The broadcast reception apparatus 100 may determine whether to process a corresponding fast information table using this field. For example, in a case in which the value of the FITdataversion attribute indicates a version that the broadcast reception apparatus 100 does not support, the broadcast reception apparatus 100 may not process the fast information table.

The broadcastID attribute indicates an identifier that identifies a broadcasting station that transmits a broadcast service through a corresponding frequency or transport frame. In a case in which the broadcast transmission apparatus transmits data based on MPEG-2 TS, the broadcastID attribute may have the same value as transport_stream_id of MPEG-2 TS.

The deliverySystemID attribute indicates an identifier that identifies a broadcast delivery system that applies and processes the same transmission parameter over a broadcast network.

The basePLPID attribute is an identifier that identifies a base PLP regarding a broadcast service that is provided by a broadcasting station corresponding to the broadcastID attribute. In a concrete embodiment, the base PLP may transfer signaling information that indicates a broadcast service being transmitted through the transport frame. In a concrete embodiment, the signaling information that indicates the broadcast service may be MPEG2-TS PSI. In addition, in a concrete embodiment, the signaling information that indicates the broadcast service may be ATSC PSIP. In addition, in a concrete embodiment, the signaling information that indicates the broadcast service may be DVB SI. In another concrete embodiment, the base PLP may include components included in a broadcast service transmitted through the transport frame.

The basePLPversion attribute may indicate version information about the change of data transmitted through the base PLP. For example, when service signaling is changed in a case in which signaling information is transferred through base_PLP, the value of the base_PLP_version field may increase by 1.

The serviceID attribute indicates an identifier that identifies a broadcast service.

The serviceCategory attribute indicates the category of a broadcast service. Specifically, the serviceCategory attribute may indicate at least one selected from among a TV service, a radio service, a broadcast service guide, an RI service, and emergency alerting. For example, in a case in which the value of the serviceCategory attribute is 0x01, the serviceCategory attribute may indicate a TV service. In a case in which the value of the serviceCategory attribute is 0x02, the serviceCategory attribute may indicate a radio service. In a case in which the value of the serviceCategory attribute is 0x03, the serviceCategory attribute may indicate an RI service. In a case in which the value of the serviceCategory attribute is 0x08, the serviceCategory attribute may indicate a service guide. In a case in which the value of the serviceCategory attribute is 0x09, the serviceCategory attribute may indicate emergency alerting.

The serviceHidden attribute indicates whether a corresponding broadcast service is a hidden service. In a case in which the broadcast service is a hidden service, the broadcast service is a test service or a special service. In a case in which the corresponding service is a hidden service, therefore, the broadcast reception apparatus 100 may not show the corresponding service in a service guide or a service list. In addition, in a case in which the corresponding service is a hidden service, the broadcast reception apparatus 100 may prevent the corresponding service from being selected by a channel up/down key input, but may allow the corresponding service to be selected by a number key input.

The ServiceProtection attribute may indicate whether one or more components of a corresponding broadcast service have been service-protected. For example, in a case in which the value of the ServiceProtection attribute is 1, the ServiceProtection attribute may indicate that one or more components of a corresponding broadcast service have been service-protected.

The componentID attribute indicates an identifier that identifies a corresponding component in a broadcast service.

The PLPID attribute indicates an identifier that identifies a PLP through which a corresponding component is transmitted in a transport frame.

The broadcast transmission apparatus may transmit a fast information table in an XML form over the Internet as well as a broadcasting network. Specifically, the broadcast reception apparatus 100 may request a fast information table regarding a specific frequency, and may receive the fast information table through the IP communication unit 130 over the Internet. It takes a predetermined period of time for the broadcast reception apparatus 100 to tune to a specific frequency and to receive, interpret, and process a broadcast signal. In addition, in a case in which no broadcast signal is received, it may be difficult for the broadcast reception apparatus 100 to scan a broadcast service corresponding to the specific frequency. In a case in which the broadcast reception apparatus 100 receives the fast information table through the IP communication unit 130 over the Internet, therefore, the broadcast reception apparatus 100 may efficiently scan the broadcast service. In addition, in a case in which the broadcast reception apparatus 100 receives the fast information table through the IP communication unit 130 over the Internet, therefore, the broadcast reception apparatus 100 may rapidly scan the broadcast service. In addition, as previously described, the broadcast reception apparatus 100 may receive the fast information table in the XML form over the broadcasting network, which will be described in detail with reference to FIG. 48.

FIG. 48 illustrates the syntax of a fast information table according to another embodiment of the present invention.

The broadcast transmission apparatus may transmit a fast information table in an XML form in the form of a section, and the broadcast reception apparatus 100 may receive a fast information table in an XML form in the form of a section.

The section including the fast information table may include at least one selected from among a table_id field, a section_syntax_indicator field, a private_indicator field, a section_length field, a table_id_extension field, a table_id_extension field, an FIT_data_version field, a current_next_indicator field, a section_number field, a last_section_number field, and a fit_byte( ) field.

The table_id field indicates an identifier of the section including the fast information table. The table_id field may be 0xFA, which is one of the reserved id values defined by ATSC A/65. In a concrete embodiment, the table_id field may be an 8-bit field.

The section_syntax_indicator field indicates whether the fast information table is a long type private section table based on MPEG-2 TS. In a concrete embodiment, the section_syntax_indicator field may be a 1-bit field.

The private_indicator field indicates whether the current table corresponds to a private section. In a concrete embodiment, the private_indicator field may be a 1-bit field.

The section_length field indicates the length of a section included after the section_length field. In a concrete embodiment, the section_length field may be a 12-bit field.

The table_id_extension field may indicate an identifier that identifies fast information. In a concrete embodiment, the table_id_extension field may be a 16-bit field.

The FIT_data_version field indicates version information about the syntax and semantics of the fast information table. The broadcast reception apparatus 100 may determine whether to process the fast information table using this field. For example, in a case in which the value of the FIT_data_version field indicates a version that the broadcast reception apparatus 100 does not support, the broadcast reception apparatus 100 may not process the fast information table. In a concrete embodiment, the FIT_data_version field may be a 5-bit field.

The current_next_indicator field indicates whether information in the fast information table is currently usable. Specifically, in a case in which the value of the current_next_indicator field is 1, the current_next_indicator field may indicate that information in the fast information table is usable. In addition, in a case in which the value of the current_next_indicator field is 1, the current_next_indicator field may indicate that the information in the fast information table is usable next. In a concrete embodiment, the current_next_indicator field may be a 1-bit field.

The section_number field indicates the number of a current section. In a concrete embodiment, the section_number field may be an 8-bit field.

The last_section_number field indicates the number of the last section. In a case in which the fast information table is large, the fast information table may be transmitted in a state of having been divided into a plurality of sections. In this case, the broadcast reception apparatus 100 may determine whether to receive all sections necessary for the fast information table based on the section_number field and the last_section_number field. In a concrete embodiment, the last_section_number field may be an 8-bit field.

The fit_byte( ) field includes a fast information table in an XML form. In a concrete embodiment, the fit_byte( ) field may include a fast information table in compressed XML form.

In order for the broadcast reception apparatus 100 to reproduce a broadcast service, reference time information is needed. Specifically, in order to reproduce a broadcast service, the broadcast reception apparatus 100 may synchronize the broadcast service with reference time information. When reproducing the broadcast service, it takes the broadcast reception apparatus 100 considerable time to tune the broadcast receiving unit 110 to the broadcast service and to synchronize the broadcast service. In addition, many consumers and broadcast providers consider broadcast service scanning time and playback start time after switching between broadcast services to be principal performance indicators. Therefore, it is necessary to provide a broadcast transmission apparatus, an operation method of the broadcast transmission apparatus, a broadcast reception apparatus 100, and an operation method of the broadcast reception apparatus 100 that are capable of reducing the time from broadcast service scanning to the start of broadcast playback and reducing the time from switching between broadcast services to the start of broadcast playback, which will be described with reference to FIGS. 49 to 58.

In a case in which fast information includes reference time information necessary to reproduce a broadcast service, the broadcast reception apparatus 100 may acquire the reference time information based on the fast information. In addition, the broadcast reception apparatus 100 may reproduce the broadcast service based on the reference time information. Here, the reference time information may indicate the reference time for a broadcast service of a transport frame including fast information. In particular, the reference time information may indicate the reference time for all broadcast services transmitted by a transport frame including fast information. In addition, the reference time information may indicate a reference time corresponding to start time of data transmitted by a transport frame including fast information in continuous data of a broadcast service. In addition, the reference time information may include one selected from among Network Time Protocol (NTP) time, Global Positioning System (GPS) time, MPEG2-TS time, and a Precision Time Protocol (PTP) timestamp. Specifically, the broadcast reception apparatus 100 may synchronize a plurality of media components included in a broadcast service based on the reference time information. At this time, the respective media components may be received over different communication networks. Specifically, the broadcast reception apparatus 100 may synchronize a first media component received over a first communication network with a second media component received over a second communication network based on the reference time information in order to reproduce a broadcast service. Here, the first communication network may be a broadcast network, and the second communication network may be the Internet. The data type of the fast information will be described in detail with reference to FIG. 49.

FIG. 49 illustrates the syntax of a fast information chunk according to another embodiment of the present invention.

The fast information chunk according to the embodiment of FIG. 49 further includes a system_time field, unlike the fast information chunk according to the embodiment of FIG. 37. The system_time field indicates reference time information. Specifically, the system_time field may be reference time information for all broadcast services transmitted in a broadcast frame. In addition, the system_time field may be reference time information corresponding to a start time of data transmitted by a transport frame including a fast information chunk in the continuous data of a broadcast service. In a concrete embodiment, the system_time field may be a GPS time type, in which time elapsed since Jan. 6, 1980 is calculated in terms of seconds. In addition, the system_time field may be an NTP timestamp type. In a concrete example, the system_time field may be a 32-bit or 64-bit field. Such fast information may have an XML form, which will be described with reference to FIG. 50.

FIG. 50 illustrates the syntax of a fast information table according to another embodiment of the present invention.

The fast information table according to the embodiment of FIG. 50 further includes a system_time attribute, unlike the fast information table according to the embodiment of FIG. 47. The system_time attribute indicates reference time information, like the system_time field of FIG. 49. The detailed definition and characteristics of the system_time attribute may be identical to those of the system_time field described with reference to FIG. 49. In a concrete embodiment, the fast information table may include a single system_time attribute, and the system_time attribute may be a string type.

In the embodiments of FIGS. 49 and 50, however, the broadcast transmission.apparatus and the broadcast reception apparatus must always use the same type of reference time information. Therefore, it is necessary to provide fast information that is capable of signaling a reference time in various types, which will be described with reference to FIGS. 51 and 52.

The fast information may further include reference time type information indicating the time type of reference time information. Here, the reference time type information may be one selected from among GPS time, an NTP timestamp, MPEG2-TS time, and a Precision Time Protocol (PTP) timestamp. The type of the fast information chunk will be described in detail with reference to FIG. 51.

FIG. 51 illustrates the syntax of a fast information chunk according to another embodiment of the present invention.

The fast information chunk according to the embodiment of FIG. 51 further includes a system_time_format field, unlike the fast information chunk according to the embodiment of FIG. 49. The system_time_format field indicates the time type of reference time that is indicated by the system_time field. In a concrete embodiment, in a case in which the value of the system_time_format field is 0x01, the system_time_format field may indicate GPS time. In a case in which the value of the system_time_format field is 0x02, the system_time_format field may indicate an NTP timestamp. In a case in which the value of the system_time_format field is 0x03, the system_time_format field may indicate MPEG2-TS time. In a case in which the value of the system_time_format field is 0x04, the system_time_format field may indicate a PTP timestamp. In a concrete embodiment, the system_time_format field may be an 8-bit field. In addition, the fast information may be information in an XML form, which will be described with reference to FIG. 52.

FIG. 52 illustrates the syntax of a fast information table according to another embodiment of the present invention The fast information table according to the embodiment of FIG. 52 further includes a system_time_format attribute, unlike the fast information table according to the embodiment of FIG. 50. The system_time_format attribute indicates the time type of reference time that is indicated by the system_time attribute, like the system_time_format field of FIG. 51. Values that the system_time_format attribute can have may be the same as those of the system_time_format field of FIG. 51. In a concrete embodiment, the fast information table may include a single system_time_format attribute, and the system_time_format attribute may be a string type.

In the embodiments of FIGS. 48 to 52, however, a plurality of broadcast services use the same reference time. Therefore, it is necessary to provide fast information that enables a plurality of broadcast services to use different reference times, which will be described with reference to FIGS. 53 to 56.

The fast information may include reference time information for each broadcast service. Specifically, the fast information may include a plurality of pieces of reference time information for a plurality of broadcast services transmitted in a transport frame. Here, the reference time information may indicate reference time corresponding to start time of data transmitted by a transport frame including fast information in continuous data of a corresponding broadcast service. In addition, the fast information may include reference time type information indicating the time type of each piece of reference time information. Here, the reference time type information may indicate one selected from among GPS time, an NTP timestamp, an MPEG2-TS clock, and a PTP timestamp. The type of the fast information will be described in detail with reference to FIGS. 53 and 54.

FIG. 53 illustrates the syntax of a fast information chunk according to a further embodiment of the present invention.

The fast information chunk according to the embodiment of FIG. 53 further includes a reference_clock_format field and a reference_clock field, unlike the fast information chunk according to the embodiment of FIG. 37. The reference_clock field indicates a plurality of pieces of reference time information corresponding to a plurality of broadcast services that is transmitted in a transport frame including a fast information chunk. In a concrete embodiment, the reference_clock field may be a 16-bit field. The reference_clock_format field indicates the time type of each piece of reference time information. The reference_clock_format field may indicate one selected from among GPS time, an NTP timestamp, an MPEG2-TS clock, and a PTP timestamp. In a concrete embodiment, in a case in which the value of the reference_clock_format field is 0x00, the reference_clock_format field may indicate GPS time. In a case in which the value of the reference_clock_format field is 0x01, the reference_clock_format field may indicate an NTP timestamp. In a case in which the value of the reference_clock_format field is 0x02, the reference_clock_format field may indicate an MPEG2-TS clock. In a case in which the value of the reference_clock_format field is 0x03, the reference_clock_format field may indicate a PTP timestamp. In a concrete embodiment, the reference_clock_format field may be a 32-bit field or a 64-bit field. The fast information chunk may have an XML form, which will be described with reference to FIG. 54.

FIG. 54 illustrates the syntax of a fast information table according to another embodiment of the present invention.

The fast information table according to the embodiment of FIG. 54 further includes a referenceClockFormat attribute and a refrenceClock attribute, unlike the fast information table according to the embodiment of FIG. 47. The refrenceClock attribute indicates a plurality of pieces of reference time information corresponding to a plurality of broadcast services transmitted in a transport frame including a fast information chunk, like the reference_clock field of FIG. 53. The detailed definition and characteristics of the refrenceClock attribute may be identical to those of the reference_clock field described with reference to FIG. 53. In a concrete embodiment, the fast information may include the refrenceClock attribute in every broadcast service, and the refrenceClock attribute may be a string type. The referenceClockFormat attribute indicates the time type of each piece of reference time information, like the reference_clock_format field of FIG. 53. The detailed definition and characteristics of the referenceClockFormat attribute may be identical to those of the reference_clock_format field described with reference to FIG. 53. In a concrete embodiment, the fast information may include the referenceClock attribute in every broadcast service, and the referenceClockFormat may be a string type.

As previously described, the fast information may be indicated in the form of a table section. At this time, the fast information may be encapsulated into an MPEG2-TS or an IP datagram. In addition, the broadcast reception apparatus 100 may receive the fast information table from the common PLP part or the additional PLP through the controller 150. Here, the fast information table may include reference time information. The reference time information may indicate reference time corresponding to start time of data transmitted by a transport frame including fast information in continuous data of a corresponding broadcast service. In addition, the fast information may include time type information indicating the time type of reference time information. Here, the reference time type information may indicate one selected from among GPS time, an NTP timestamp, an MPEG2-TS clock, and a PTP timestamp. The type of the fast information table will be described in detail with reference to FIG. 55.

FIG. 55 illustrates the syntax of a fast information table according to another embodiment of the present invention.

The fast information table according to the embodiment of FIG. 55 further includes a system_time_format field and a system_time field, unlike the fast information table according to the embodiment of FIG. 45. The system_time field indicates reference time information of a broadcast service. Definition and characteristics of the system_time field may be identical to those of the system_time field described with reference to FIG. 49. In a concrete embodiment, the system_time field may be an 8-bit field. The system_time_format field indicates reference time type information indicating the time type of reference time information that is indicated by the system_time field. Definition and characteristics of the system_time_format field may be identical to those of the system_time_format field described with reference to FIG. 51. In a concrete embodiment, the system_time_format field may be a 32-bit field or a 64-bit field.

In addition, the fast information table may include a plurality of pieces of reference time information for a plurality of broadcast services transmitted in a transport frame including fast information. Here, the reference time information may indicate reference time corresponding to the start time of data transmitted in a transport frame including fast information in continuous data of a corresponding broadcast service. In addition, the fast information may include reference time type information indicating the time type of each piece of reference time information. Here, the reference time type information may indicate one selected from among GPS time, an NTP timestamp, an MPEG2-TS clock, and a PTP timestamp. The type of the fast information table will be described in detail with reference to FIG. 56.

FIG. 56 illustrates the syntax of a fast information table according to a further embodiment of the present invention.

The fast information table according to the embodiment of FIG. 56 further includes a reference_clock_format field and a reference_clock field, unlike the fast information table according to the embodiment of FIG. 45. The reference_clock field indicates reference time information of a corresponding broadcast service. Specifically, the definition and characteristics of the reference_clock field may be identical to those of the reference_clock field described with reference to FIG. 53. In a concrete embodiment, the reference_clock field may be a 16-bit field. The reference_clock_format field indicates the time type of the reference time information that is indicated by the reference_clock field. Definition and characteristics of the reference_clock_format field may be identical to those of the reference_clock_format field described with reference to FIG. 53. In a concrete embodiment, in a case in which the value of the reference_clock_format field is 0x00, the reference_clock_format field may indicate GPS time. In a case in which the value of the reference_clock_format field is 0x01, the reference_clock_format field may indicate an NTP timestamp. In a case in which the value of the reference_clock_format field is 0x02, the reference_clock_format field may indicate an MPEG2-TS clock. In a case in which the value of the reference_clock_format field is 0x03, the reference_clock_format field may indicate a PTP timestamp. In a concrete embodiment, the reference_clock_format field may be a 32-bit field or a 64-bit field. The operations of the broadcast transmission apparatus and the broadcast reception apparatus 100 will be described in detail with reference to FIGS. 57 and 58.

FIG. 57 is a view illustrating the configuration of Fast_Information_Chunk( ) according to another embodiment of the present invention in a case in which all components constituting a broadcast service are transmitted through the same Physical Layer Pipe.

A fast information chunk according to an embodiment of the present invention may be referred to as a fast information table and/or a service list table. A fast information chunk according to an embodiment of the present invention may be transmitted in a state of having been divided into one or more sections. A fast information chunk according to an embodiment of the present invention may be expressed using a binary or XML format.

A fast information chunk according to an embodiment of the present invention may support rapid channel scanning and service acquisition. As shown in this figure, the fast information chunk may include information about each broadcast service.

A fast information chunk according to an embodiment of the present invention may include information that is required in order to show a viewer a service list. Furthermore, a fast information chunk according to an embodiment of the present invention may enable a viewer to select the first service by selecting a channel number or a channel up/down key.

In an embodiment of the present invention, in a case in which all components constituting a broadcast service are transmitted through the same path, it is possible to add information related to each broadcast service and/or information about a PLP, through which the corresponding service is transmitted, in Fast_Information_Chunk( ). Consequently, it is not necessary for a receiver according to an embodiment of the present invention to acquire information about a broadcast service and/or the number of components constituting the corresponding broadcast service and/or a PLP related to the corresponding components. In addition, it is not necessary to acquire or process service signaling information, such as PSI/SI, obtained through base_PLP_id. In addition, it is not necessary to repeatedly provide information about the transmission of each component in Fast_Information_Chunk.

Fast_Information_Chunk according to an embodiment of the present invention may include an FIT_data_version field, a num_broadcast field, a broadcast_id field, a delivery_system_id field, a base_PLP_id field, a base_PLP_version field, a num_service field, a service_id field, a service_category field, a service_hidden_flag field, an SP_indicator field, and/or a PLP_id field.

The FIT_data_version field indicates information about the version of corresponding Fast_Information_Chunk. That is, in a case in which information included in the corresponding Fast_Information_Chunk is changed, the value of this field may be changed.

The num_broadcast field indicates the number of broadcasting stations that transmit a broadcast service and/or content.

The broadcast_id field identifies a broadcasting station. For a broadcasting station that transmits data based on MPEG-2 TS, this field may have the same value as the transport_stream_id field. This field may include an IP address of a broadcasting station that transmits a broadcast service and/or content.

The delivery_system_id field may identify a delivery system that delivers broadcast service and/or content. This field may identify a broadcast delivery system that is capable of applying and processing the same transmission parameter over a corresponding broadcast network. In an embodiment of the present invention, this field may indicate that the broadcast service and/or content is transmitted over a broadcast network and/or an IP network.

The base_PLP_id field may identify a Physical Layer Pipe (PLP), through which service signaling information (PSI/SI information, etc.) of the broadcasting station identified by the broadcast_id field is transmitted. In addition, this field may identify a representative PLP, through which signaling information for decoding components constituting a broadcast service in the corresponding broadcasting station is transmitted. Here, the service signaling information may include service layer signaling information.

The base_PLP_version field may indicate version information of base_PLP. That is, this field may indicate the change of information in base_PLP identified by the base_PLP_id field. This field may indicate the change of service layer signaling information that is transmitted in a state of being included in base_PLP. For example, this field may indicate the change of protocol of the service layer signaling information.

The num_service field indicates the number of broadcast services that is transmitted by the broadcasting station identified by the broadcast_id field. That is, this field indicates the number of broadcast services described in Fast_Information_Chunk.

The service_id field may identify a broadcast service.

The service_category field may indicate the category of a service. In an embodiment of the present invention, the category indicated by this field may include s Basic TV, a Basic Radio, an RI service, a Service Guide, and Emergency Alerting. Here, the Basic TV may include linear A/V service, the Basic Radio may include linear audio only service, and the RI service may include app-based service.

The service_hidden_flag field may indicate whether a corresponding service is a hidden service. In a case in which the service is a hidden service, this service is a test service or a service that is used itself. Consequently, the receiver according to the embodiment of the present invention may ignore this service, or may not display this service on a service list.

The SP_indicator field may indicate whether a corresponding service or one or more components in the corresponding service are service-protected.

The PLP_id field may identify a PLP, through which all components constituting a broadcast service are transmitted, in a case in which all of the components constituting the corresponding service are transmitted through the same PLP.

FIG. 58 is a view illustrating the configuration of Fast_Information_Chunk( ) according to another embodiment of the present invention in a case in which all components constituting a broadcast service are transmitted through the same Physical Layer Pipe.

In an embodiment of the present invention, Fast_Information_Chunk( ) may be shown in the form of a signaling table section. According to an embodiment of the present invention, Fast_Information_Chunk( ) divided into one or more sections may be encapsulated into an MPEG-2 TS and/or IP datagram. According to an embodiment of the present invention, Fast_Information_Chunk( ) may be transmitted through a fast information channel, which is an additional channel for rapid and easy service scanning and acquisition. Alternatively, Fast_Information_Chunk( ) may be transmitted through a common PLP or an additional PLP.

One section constituting Fast_Information_Chunk( ) according to an embodiment of the present invention may further include a table_id field, a section_syntax_indicator field, a private_indicator field, a section_length field, a table_id_extension field, a current_next_indicator field, a section_number field, and/or a last_section_number field in addition to the fields included in Fast_Information_Chunk( ) that were described with reference to the preceding figure.

The table_id field may indicate that this table is Fast_Information_table.

The section_syntax_indicator field must have a value of 1. In a case in which the value of the section_syntax_indicator field is 0, a receiver according to an embodiment of the present invention determines that an error has occurred.

The private_indicator field may indicate whether a corresponding section is private.

The section_length field indicates the length of a corresponding section.

The table_id_extension field indicates the extension type of the table_id field.

The current_next_indicator field indicates whether a corresponding table is valid.

The section_number field indicates the number of a corresponding section.

The last_section_number field indicates the number of the last of the sections constituting a corresponding table.

FIG. 59 is a view illustrating the configuration of Fast_Information_Chunk( ) according to another embodiment of the present invention.

An embodiment of the present invention may be signaled as one table for both a case in which all components constituting a broadcast service are transmitted through the same Physical Layer Pipe and a case in which all components constituting a broadcast service are transmitted through different Physical Layer Pipes Fast_Information_Chunk( ) according to an embodiment of the present invention may include an FIT_data_version field, a num_broadcast field, a broadcast_id field, a delivery_system_id field, a base_PLP_id field, a base_PLP_version field, a num_service field, a service_id field, a service_category field, a service_hidden_flag field, an SP_indicator field, a DP_delivery_type field, a DP_ID field, a num_component field, a component_id_length field, and/or a component_id field.

The DP_delivery_type field indicates the type of a Data Pipe (DP) through which a corresponding service is transmitted. Here, "Data Pipe" may have the same meaning as "Physical Layer Pipe" (PLP). For example, in a case in which the value of this field is 0x01 (or "service"), this indicates that all components constituting a corresponding service are transmitted through a single DP. In a case in which the value of this field is 0x02 (or "component"), this indicates that all components constituting a corresponding service are transmitted through different DPs.

The DP_ID field may identify a DP, through which a corresponding service or component is transmitted. According to an embodiment of the present invention, in a case in which that all components constituting a corresponding service are transmitted through a single DP, one DP_ID field may exist in a single service. On the other hand, in a case in which that the respective components are transmitted through different DPs, a plurality of DP_ID fields may exist in one component.

The num_component field indicates the number of components constituting a single service.

The component_id_length field indicates the length of the component_id field.

The component_id field may identify components constituting a corresponding service. For example, this field may be used to distinguish between the respective components in MPD of MPEG DASH. According to an embodiment of the present invention, this field may include an MPD@id field, a Period@id field, an AdaptationSet@id field, and/or a Representation@id field.

The FIT_data_version field, the num_broadcast field, the broadcast_id field, the delivery_system_id field, the base_PLP_id field, the base_PLP_version field, the num_service field, the service_id field, the service_category field, the service_hidden_flag field, and the SP_indicator field have been described in detail with reference to the figure before the preceding figure.

FIG. 60 is a view illustrating the configuration of Fast_Information_Chunk( ) according to another embodiment of the present invention.

In an embodiment of the present invention, Fast_Information_Chunk( ) may be shown in the form of a signaling table section. According to an embodiment of the present invention, Fast_Information_Chunk( ) divided into one or more sections may be encapsulated into an MPEG-2 TS and/or IP datagram. According to an embodiment of the present invention, Fast_Information_Chunk( ) may be transmitted through a fast information channel, which is an additional channel for rapid and easy service scanning and acquisition. Alternatively, Fast_Information_Chunk( ) may be transmitted through a common PLP or an additional PLP.

One section constituting Fast_Information_Chunk( ) according to an embodiment of the present invention may further include a table_id field, a section_syntax_indicator field, a private_indicator field, a section_length field, a table_id_extension field, a current_next_indicator field, a section_number field, and/or a last_section_number field in addition to the fields included in Fast_Information_Chunk( ) that were described with reference to the preceding figure.

The table_id field may indicate that this table is Fast_Information_table.

The section_syntax_indicator field must have a value of 1. In a case in which the value of the section_syntax_indicator field is 0, a receiver according to an embodiment of the present invention determines that an error has occurred.

The private_indicator field may indicate whether a corresponding section is private.

The section_length field indicates the length of a corresponding section.

The table_id_extension field indicates the extension type of the table id field.

The current_next_indicator field indicates whether a corresponding table is valid.

The section_number field indicates the number of a corresponding section.

The last_section_number field indicates the number of the last one of the sections constituting a corresponding table.

Figure 61:
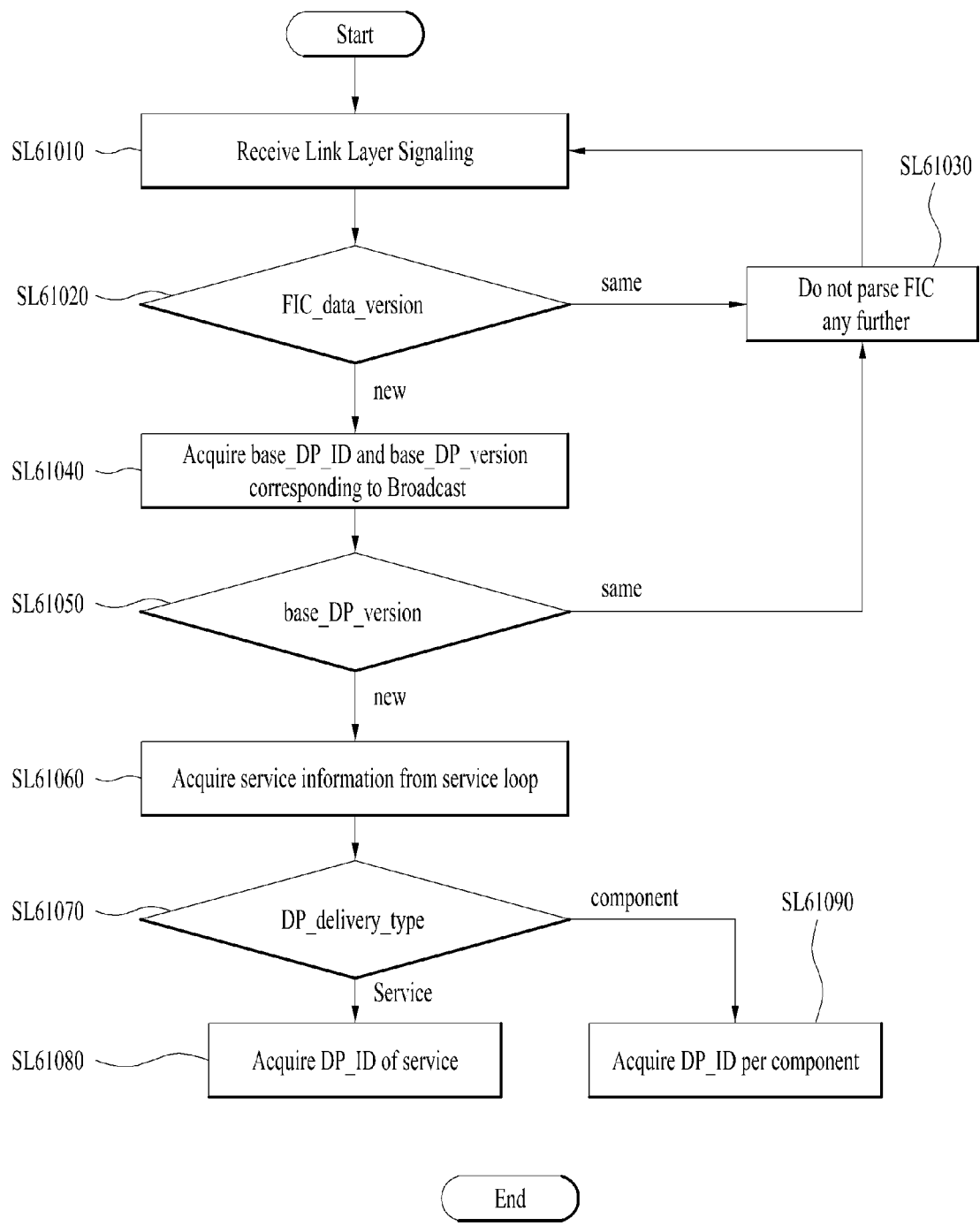
FIG. 61 is a view illustrating a process of acquiring information included in Fast_Information_Chunk( ) according to an embodiment of the present invention.

FIG. 61 is a view illustrating a process of acquiring information included in Fast_Information_Chunk( ) according to an embodiment of the present invention.

A receiver according to an embodiment of the present invention may receive Link Layer Signaling (SL61010). At this time, Fast_Information_Chunk( ) according to an embodiment of the present invention may be transmitted in a state of being included in Link Layer Signaling and/or Service Layer Signaling. Alternatively, Fast_Information_Chunk( ) according to an embodiment of the present invention may be transmitted through a separate channel.

The receiver according to the embodiment of the present invention may parse Fast_Information_Chunk( ) included in Link Layer Signaling, and may check the value of an FIC_data_version field in Fast_Information_Chunk( ) (SL16020). Here, the FIC_data_version field may have the same meaning as the FIT_data_version field.

In a case in which the version information is determined not to have changed as the result of checking the value of the FIC_data_version field, the receiver according to the embodiment of the present invention may not parse Fast_Information_Chunk( ) any further (SL61030). In a case in which the version information has changed, however, the receiver according to the embodiment of the present invention may acquire a base_DP_ID field and/or a base_DP_version field in Fast_Information_Chunk( ) and may check the value of the acquired field (SL61040).

In a case in which the value of the acquired base_DP_version field has not changed, the receiver according to the embodiment of the present invention may not parse Fast_Information_Chunk( ) any further (SL61050 and SL61030). In a case in which the value of the base_DP_version field has been changed, on the other hand, the receiver according to the embodiment of the present invention may acquire service information from a service loop in Fast_Information_Chunk( ) (SL61050 and SL61060).

In a case in which the value of the DP_delivery_type field indicates that all components constituting a service are transmitted through a single DP as the result of checking the value of this field, the receiver according to the embodiment of the present invention may acquire DP_ID of the service (SL61070 and SL61080). In a case in which the value of this field indicates that all components constituting a service are transmitted through different DPs, on the other hand, the receiver according to the embodiment of the present invention may acquire an DP_ID per component (SL61070 and SL61090).

Figure 62:
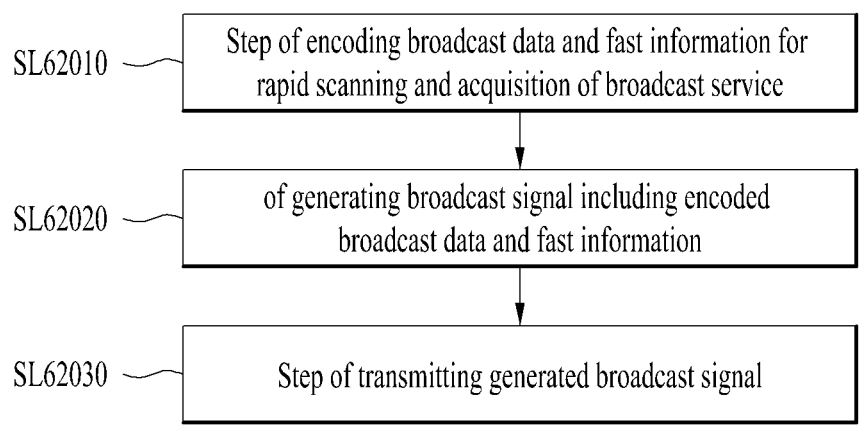
FIG. 62 is a view illustrating a broadcast signal transmission method according to an embodiment of the present invention.

FIG. 62 is a view illustrating a broadcast signal transmission method according to an embodiment of the present invention.

The broadcast signal transmission method according to the embodiment of the present invention may include a step of encoding broadcast data and fast information for rapid scanning and acquisition of a broadcast service (SL62010), a step of generating a broadcast signal including the encoded broadcast data and fast information (SL62020), and/or a step of transmitting the generated broadcast signal (SL62030). Here, "fast information" may have the meaning of information included in the Fast Information Chunk, Fast Information Table, and/or the Service List Table.

According to another embodiment of the present invention, the fast information may include identification information of a Physical Layer Pipe (PLP), through which service layer signaling information including information about a broadcast service and components is transmitted. Here, the service layer signaling information may include signaling information about a broadcast service and/or signaling information about components constituting a broadcast service. The physical layer pipe, through which the service layer signaling information is transmitted, may be a base PLP, a common PLP, etc. Identification information of the physical layer pipe, through which the service layer signaling information is transmitted, may be a base_PLP_id field, which was described with reference to FIG. 57.

According to another embodiment of the present invention, the fast information may include information indicating whether all components constituting a broadcast service are transmitted in a state of being included in a single physical layer pipe. Here, the information indicating whether all components constituting the broadcast service are transmitted in a state of being included in a single physical layer pipe may be a DP_delivery_type field, which was described with reference to FIG. 59.

According to another embodiment of the present invention, in a case in which all components constituting a broadcast service are transmitted in a state of being included in a single physical layer pipe, the fast information may include identification information of the physical layer pipe, through which the broadcast service is transmitted. In a case in which all components constituting a broadcast service are transmitted in a state of being included in different physical layer pipes, the fast information may include identification information of the respective physical layer pipes, through which the components constituting the broadcast service are transmitted. Here, the identification information of the physical layer pipe may be a DP_ID field and/or a PLP_ID field. According to an embodiment of the present invention, in a case in which DP_ID is included in a service level in the fast information, this may identify a PLP, through which a broadcast service is transmitted, and, in a case in which DP_ID is included in a component level in the fast information, this may identify a PLP, through which components constituting a broadcast service are transmitted, which were described with reference to FIG. 59.

According to another embodiment of the present invention, in a case in which components constituting a broadcast service are transmitted in a state of being included in different physical layer pipes, the fast information may include component identification information, which identifies the respective components constituting the broadcast service, and/or length information of the component identification information. Here, the component identification information may be a component_id field, and the length information of the component identification information may be a component_id_length field, which were described with reference to FIG. 59.

According to another embodiment of the present invention, the fast information may be transmitted in a state of being included in a common PLP, through which information shared by a plurality of physical layer pipes is transmitted, which was described with reference to FIG. 32.

Figure 63:
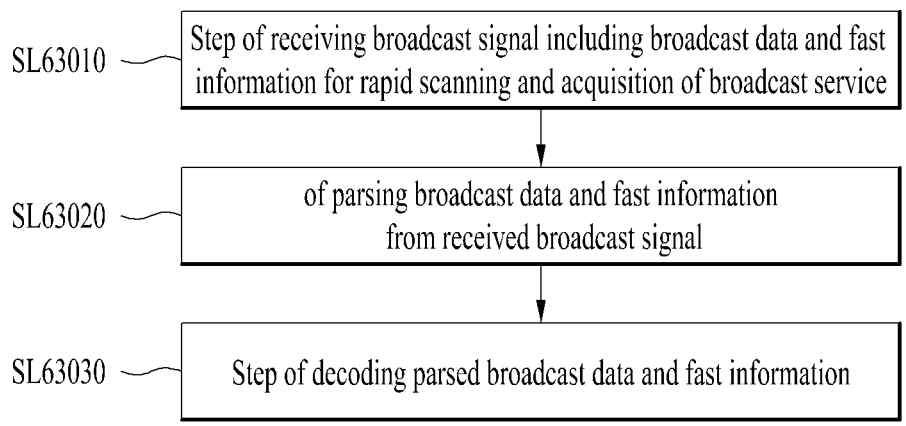
FIG. 63 is a view illustrating a broadcast signal reception method according to an embodiment of the present invention.

FIG. 63 is a view illustrating a broadcast signal reception method according to an embodiment of the present invention.

The broadcast signal reception method according to the embodiment of the present invention may include a step of receiving a broadcast signal including broadcast data and fast information for rapid scanning and acquisition of a broadcast service (SL63010), a step of parsing the broadcast data and fast information from the received broadcast signal (SL63020), and/or a step of decoding the parsed broadcast data and fast information (SL63030). Here, "fast information" may have the meaning of information included in the Fast Information Chunk, the Fast Information Table, and/or the Service List Table.

According to another embodiment of the present invention, the fast information may include identification information of a Physical Layer Pipe (PLP), through which service layer signaling information including information about a broadcast service and components is transmitted. Here, the service layer signaling information may include signaling information about a broadcast service and/or signaling information about components constituting a broadcast service. The physical layer pipe, through which the service layer signaling information is transmitted, may be a base PLP, a common PLP, etc. Identification information of the physical layer pipe, through which the service layer signaling information is transmitted, may be a base_PLP_id field, which was described with reference to FIG. 57.

According to another embodiment of the present invention, the fast information may include information indicating whether all components constituting a broadcast service are transmitted in a state of being included in a single physical layer pipe. Here, the information indicating whether all components constituting the broadcast service are transmitted in a state of being included in a single physical layer pipe may be a DP_delivery_type field, which was described with reference to FIG. 59.

According to another embodiment of the present invention, in a case in which all components constituting a broadcast service are transmitted in a state of being included in a single physical layer pipe, the fast information may include identification information of the physical layer pipe, through which the broadcast service is transmitted. In a case in which all components constituting a broadcast service are transmitted in a state of being included in different physical layer pipes, the fast information may include identification information of the respective physical layer pipes, through which the components constituting the broadcast service are transmitted. Here, the identification information of the physical layer pipe may be a DP_ID field and/or a PLP_ID field. According to an embodiment of the present invention, in a case in which DP_ID is included in a service level in the fast information, this may identify a PLP, through which a broadcast service is transmitted, and, in a case in which DP_ID is included in a component level in the fast information, this may identify a PLP, through which components constituting a broadcast service are transmitted, which were described with reference to FIG. 59.

According to another embodiment of the present invention, in a case in which components constituting a broadcast service are transmitted in a state of being included in different physical layer pipes, the fast information may include component identification information, which identifies the respective components constituting the broadcast service, and/or length information of the component identification information. Here, the component identification information may be a component_id field, and the length information of the component identification information may be a component_id_length field, which were described with reference to FIG. 59.

According to another embodiment of the present invention, the fast information may be transmitted in a state of being included in a common PLP, through which information shared by a plurality of physical layer pipes is transmitted, which was described with reference to FIG. 32.

Figure 64:
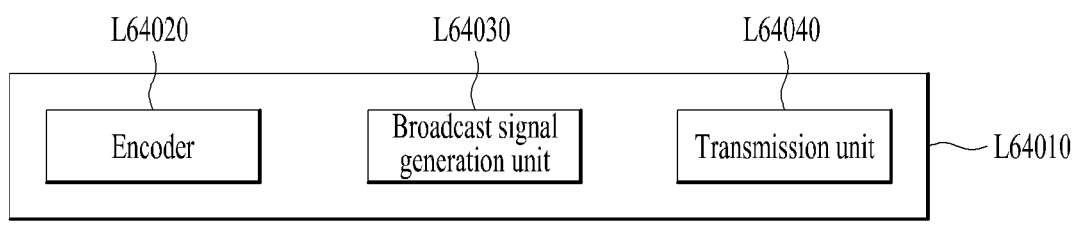
FIG. 64 is a view illustrating the configuration of a broadcast signal transmission apparatus according to an embodiment of the present invention.

FIG. 64 is a view illustrating the configuration of a broadcast signal transmission apparatus according to an embodiment of the present invention.

A broadcast signal transmission apparatus L64010 according to an embodiment of the present invention may include an encoder L64020, a broadcast signal generation unit L64030, and/or a transmission unit L64040.

The encoder L64020 may encode broadcast data and fast information for rapid scanning and acquisition of a broadcast service.

The broadcast signal generation unit L64030 may generate a broadcast signal including the encoded broadcast data and fast information.

The transmission unit L64040 may transmit the generated broadcast signal.

Figure 65:
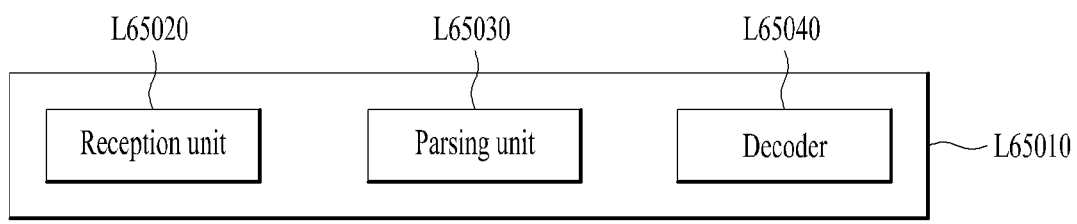
FIG. 65 is a view illustrating the configuration of a broadcast signal reception apparatus according to an embodiment of the present invention.

FIG. 65 is a view illustrating the configuration of a broadcast signal reception apparatus according to an embodiment of the present invention.

A broadcast signal reception apparatus L65010 according to an embodiment of the present invention may include a reception unit L65020, a parsing unit L65030, and/or a decoder L65040.

The reception unit may receive a broadcast signal including broadcast data and fast information for rapid scanning and acquisition of a broadcast service.

The parsing unit may parse the broadcast data and fast information from the received broadcast signal.

The decoder may decode the parsed broadcast data and fast information.

According to another embodiment of the present invention, the fast information may include identification information of a Physical Layer Pipe (PLP), through which service layer signaling information including information about a broadcast service and components is transmitted.

Figures 66, 67:
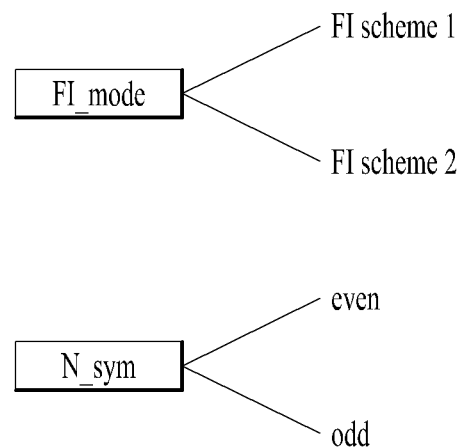
FIG. 66 illustrates signaling for single-memory deinterleaving irrespective of the number of symbols in a frame according to an embodiment of the present invention.
FIG. 67 illustrates FI schemes of FSS in signaling for single-memory deinterleaving irrespective of the number of symbols in a frame according to an embodiment of the present invention.

FIG. 66 illustrates signaling for single-memory deinterleaving irrespective of the number of symbols in a frame according to an embodiment of the present invention.

As described above, the frequency interleaver according to the present invention performs interleaving using different interleaving sequences in a plurality of OFDM symbols, but the frequency deinterleaver may perform single-memory deinterleaving on the received OFDM symbols.

The present invention proposes a method for performing single-memory deinterleaving by the frequency deinterleaver irrespective of whether the number of OFDM symbols in one frame is an even number or an odd number. To this end, the above-described architecture of the frequency interleaver may operate differently depending on whether the number of OFDM symbols is an even number or an odd number. Furthermore, signaling information related thereto may be additionally defined in the above-described preamble and/or the physical layer signal (PLS). As such, single-memory deinterleaving is not limited to a case in which the number of OFDM symbols is an even number, and may always be enabled.

Here, the PLS may be transmitted in a frame starting symbol (FSS) of every frame. Alternatively, according to another embodiment, the PLS may be transmitted in the first OFDM symbol. Otherwise, based on whether the PLS is present, signaling information corresponding to the PLS may be completely transmitted in the preamble. Or, signaling information corresponding to the preamble and/or the PLS may be transmitted in bootstrap information. The bootstrap information may be an information part located in front of the preamble.

Information about, for example, a processing operation used by the frequency interleaver of the transmitter may include an FI_mode field and an N_sym field.

The FI_mode field may be a 1-bit field which can be located in the preamble. The FI_mode field may indicate an interleaving scheme used in the FSS or the first OFDM symbol of every frame.

The interleaving scheme indicated as the FI_mode field may include FI scheme #1 and FI scheme #2.

FI scheme #1 can indicate that the frequency interleaver of the transmitter performs random writing operation and then linear reading operation on the FSS. This case may correspond to a case in which the FI_mode field value is 0. The random writing or linear reading operation may be performed in or from memory using a value generated by an arbitrary random sequence generator using, for example, a pseudo-random binary sequence (PRBS). Here, linear reading may refer to sequentially reading operation.

FI scheme #2 can indicate that the transmitter performs linear writing operation and then random reading operation on the FSS. This case may correspond to a case in which the FI_mode field value is 1. Likewise, the linear writing or random reading operation may be performed in or from memory using a value generated by an arbitrary random sequence generator using, for example, PRBS. Here, linear writing may refer to a sequentially writing operation.

In addition, the FI_mode field may indicate an interleaving scheme used in a frame edge symbol (FES) or the last OFDM symbol of every frame. The interleaving scheme applied to the FES may be indicated differently from the value of the N_sym field transmitted by the PLS. That is, the interleaving scheme indicated as the FI_mode field may differ depending on whether the number of OFDM symbols is an odd number or an even number. Mapping information between the two fields may be predefined as a table by the transmitter and the receiver.

The FI_mode field may be defined and transmitted in a part of the frame other than the preamble according to another embodiment.

The N_sym field may be a field which can be located in the PLS part. The number of bits of the N_sym field is variable according to embodiments. The N_sym field may indicate number of OFDM symbols included in one frame. As such, the receiver can acquire information about whether the number of OFDM symbols is an even number or an odd number.

Operation of the frequency deinterleaver corresponding to the frequency interleaver irrespective of the number of OFDM symbols in one frame is as described below. This frequency deinterleaver may perform single-memory deinterleaving by utilizing the proposed signaling fields irrespective of whether the number of OFDM symbols is an even number or an odd number.

Initially, the frequency deinterleaver may perform frequency deinterleaving on the FSS using information of the FI_mode field of the preamble because the frequency interleaving scheme used in the FSS is indicated as the FI_mode.

The frequency deinterleaver may perform frequency deinterleaving on the FES using signaling information of the FI_mode field and signaling information of the N_sym field of the PLS. In this case, the mapping information between the two fields may be acquired using the predefined table. A description of the predefined table will be given below.

Overall deinterleaving operation on the other symbols may be performed inversely from the interleaving operation of the transmitter. That is, on a pair of contiguously input OFDM symbols, the frequency deinterleaver may perform deinterleaving using one interleaving sequence. Here, the interleaving sequence may be an interleaving sequence used by the frequency interleaver for reading & writing. The frequency deinterleaver may perform reading & writing operation inversely using the interleaving sequence.

However, the frequency deinterleaver according to the present invention may not use a ping pong architecture using double memories. The frequency deinterleaver may perform deinterleaving on contiguously input OFDM symbols using a single memory. As such, the efficiency of using memory by the frequency deinterleaver may be increased.

FIG. 67 illustrates FI schemes of FSS in signaling for single-memory deinterleaving irrespective of the number of symbols in a frame according to an embodiment of the present invention.

An interleaving scheme applied to frequency interleaving operation may be determined using the above-described FI_mode field and the N_sym field.

In the case of FSS, when the number of OFDM symbols indicated as the N_sym field is an even number, FI scheme #1 may be performed on the FSS irrespective of the FI_mode field value.

When the number of OFDM symbols indicated as the N_sym field is an odd number, FI scheme #1 may be applied to the FSS if the FI_mode field has a value of 0, and FI scheme #2 may be applied to the FSS if the FI_mode field has a value of 1. That is, when the number of OFDM symbols is an odd number, FI schemes #1 and #2 may be alternately applied to the FSS symbols for frequency interleaving.

FIG. 68 illustrates operation of a reset mode in signaling for single-memory deinterleaving irrespective of the number of symbols in a frame according to an embodiment of the present invention.

For frequency interleaving on FES, the above-described symbol offset generator may adopt a reset mode as a new concept. The reset mode may refer to a mode in which a symbol offset value generated by the symbol offset generator is '0'.

For frequency interleaving on FES, whether to use the reset mode may be determined using the above-described FI_mode field and the N_sym field.

When the number of OFDM symbols indicated as the N_sym field is an even number, the reset mode of the symbol offset generator may not operate (off) irrespective of the value of the FI_mode field.

When the number of OFDM symbols indicated as the N_sym field is an odd number, if the value of the FI_mode field is 0, the symbol offset generator may operate in the reset mode (on). Otherwise, if the value of the FI_mode field is 1, the reset mode of the symbol offset generator may not operate (off). That is, when the number of OFDM symbols is an odd number, the reset mode may be alternately turned on and off for frequency interleaving.

FIG. 69 illustrates equations indicating input and output of the frequency interleaver in signaling for single-memory deinterleaving irrespective of the number of symbols in a frame according to an embodiment of the present invention.

As described above, OFDM symbol pairs of memory bank-A and memory bank-B may be processed through the above-described interleaving operation. As described above, for interleaving, a variety of different interleaving seeds generated by cyclically shifting one main interleaving seed may be used. Here, the interleaving seed may also be called an interleaving sequence. Alternatively, the interleaving seed may also be called an interleaving address value, an address value, or an interleaving address. Here, the term "interleaving address value(s)" can be used for referring plural address values, or for referring a interleaving seed which is a singular. That is, depending on embodiments, interleaving address value(s) can mean H(p) itself, or each addresses belong to H(p).

Input of frequency interleaving to be interleaved within one OFDM symbol may be indicated as Om,1 (t50010). Here, data cells may be indicated as xm,1,0, . . . xm,1,Ndata−1. Meanwhile, p may indicate a cell index, 1 may indicate an OFDM symbol index, and m may indicate a frame index. That is, xm,1,p may indicate a p-th data cell of an 1-th OFDM symbol of an m-th frame. Ndata may indicate the number of data cells. Nsym may indicate the number of symbols (frame signaling symbols, normal data symbols, or frame edge symbols).

Data cells which are interleaved based on the above-described operation may be indicated as Pm,1 (t50020). The interleaved data cells may be indicated as vm,1,0, . . . vm,1,Ndata−1. Meanwhile, p, 1, and m may have the above-described index values.

FIG. 70 illustrates equations of a logical operation mechanism of frequency interleaving based on FI scheme #1 and FI scheme #2 in signaling for single-memory deinterleaving irrespective of the number of symbols in a frame according to an embodiment of the present invention.

A description is now given of frequency interleaving based on FI scheme #1. As described above, frequency interleaving may be performed using an interleaving sequence (interleaving address) of each memory bank.

Interleaving operation on an even symbol (j mod 2=0) may be mathematically expressed as given by equation t51010. On input data x, frequency interleaving may be performed using the interleaving sequence (interleaving address) to acquire output v. Here, p-th input data x may be permuted to be identical to H(p)-th output data v.

That is, on an even symbol (the first symbol), random writing operation may be performed using the interleaving sequence, and then linear reading operation for sequentially reading data may be performed. Here, the interleaving sequence (interleaving address) may be a value generated by an arbitrary random sequence generator using, for example, PRBS.

Interleaving operation on an odd symbol (j mod 2=1) may be mathematically expressed as given by equation t51020. On input data x, frequency interleaving may be performed using the interleaving sequence (interleaving address) to acquire output v. Here, H(p)-th input data x may be permuted to be identical to p-th output data v. That is, compared to the interleaving process performed on the even symbol, the interleaving sequence (interleaving address) may be applied inversely.

That is, on an odd symbol (the second symbol), a linear writing operation for sequentially writing data in memory may be performed, and then random reading operation for randomly reading the data using the interleaving sequence may be performed. Likewise, the interleaving sequence (interleaving address) may be a value generated by an arbitrary random sequence generator using, for example, PRBS.

A description is now given of frequency interleaving based on FI scheme #2.

In the case of frequency interleaving based on FI scheme #2, operation on an even/odd symbol may be performed inversely from the operation based on FI scheme #1.

That is, on the even symbol, linear writing operation may be performed and then random reading operation may be performed as given by equation t51020. In addition, on the odd symbol, random writing operation may be performed and then linear reading operation may be performed as given by equation t51010. A detailed description thereof is the same as that given above in relation to FI scheme #1.

The symbol index 1 may be indicated as 0, 1, . . . , Nsym−1, and the cell index p may be indicated as 0, 1, . . . , Ndata−1. According to another embodiment, the frequency interleaving scheme on an even symbol and the frequency interleaving scheme on an odd symbol may be switched. In addition, according to another embodiment, the frequency interleaving scheme based on FI scheme #1 and the frequency interleaving scheme based on FI scheme #2 may be switched.

Figure 71:
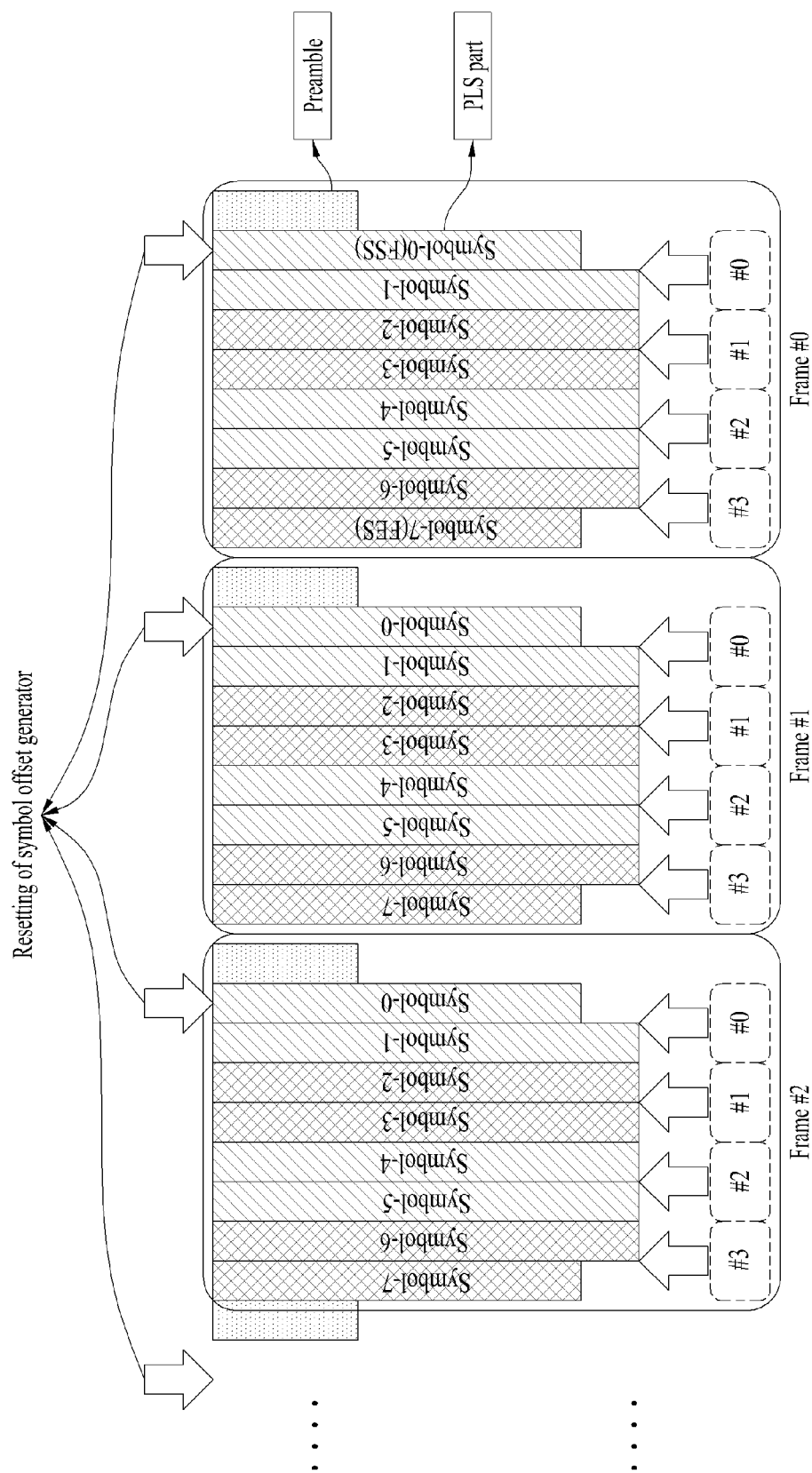
FIG. 71 illustrates an example in which the number of symbols is an even number in signaling for single-memory deinterleaving irrespective of the number of symbols in a frame according to an embodiment of the present invention.

FIG. 71 illustrates an example in which the number of symbols is an even number in signaling for single-memory deinterleaving irrespective of the number of symbols in a frame according to an embodiment of the present invention.

In the current embodiment, the N_sym field may indicate that the number of OFDM symbols in one frame is an even number. The current embodiment assumes that one frame includes one preamble and eight OFDM symbols. According to another embodiment, bootstrap information may be further included in front of the preamble. The bootstrap information is not illustrated.

In the current embodiment, one frame may include one FSS and one FES. Here, it is assumed that the FSS and the FES have the same length. In addition, since information of the N_sym field is transmitted in the PLS part, the frequency deinterleaver may acquire the corresponding information after decoding the FSS. Furthermore, the current embodiment assumes that the N_sym field is completely decoded before operation on the FES is performed.

In the FSS of each frame, the value of the symbol offset generator may be reset to 0. Accordingly, the first and second symbols may be processed using the same interleaving sequence. In addition, sequence #0 may be used for operation whenever each frame starts. After that, sequences #1 and #2 may be sequentially used for operation of the frequency interleaver/deinterleaver.

Figure 72:
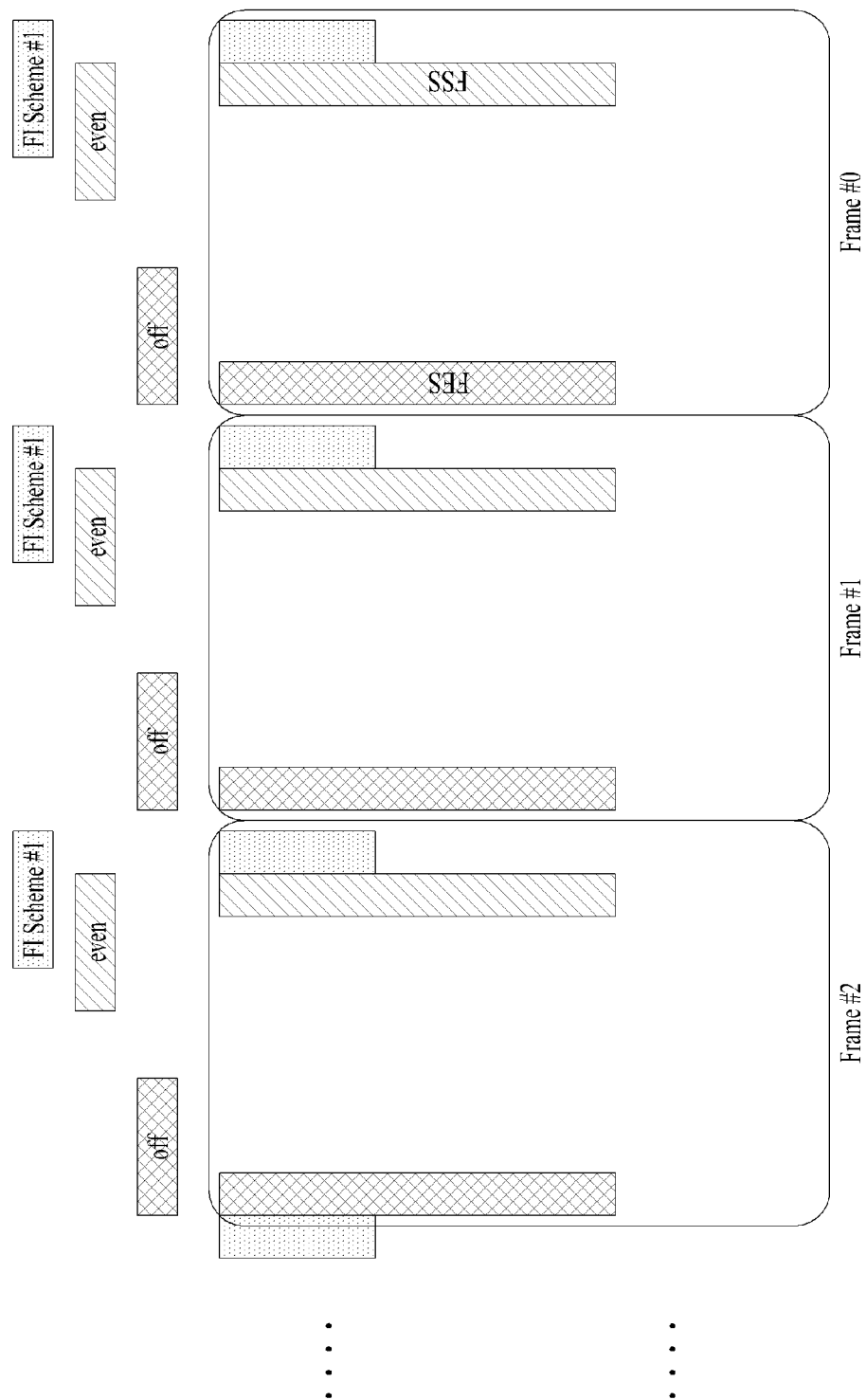
FIG. 72 illustrates an example in which the number of symbols is an even number in signaling for single-memory deinterleaving irrespective of the number of symbols in a frame according to an embodiment of the present invention.

FIG. 72 illustrates an example in which the number of symbols is an even number in signaling for single-memory deinterleaving irrespective of the number of symbols in a frame according to an embodiment of the present invention.

In the first frame, information about an interleaving scheme of the FSS may be acquired from the FI_mode field of the preamble. In the current embodiment, since the number of OFDM symbols is an even number, only FI scheme #1 may be used.

Then, the FSS may be decoded and thus N_sym information may be acquired. The N_sym information indicates that the number of symbols in the current frame is an even number. After that, the acquired FI_mode information and the N_sym information may be used when the frequency deinterleaver decodes the FES. Since the number of symbols is an even number, the symbol offset generator does not operate in the above-described reset mode. That is, the reset mode may be in an off state.

Subsequently, even in another frame, since an even number of OFDM symbols are included, the frequency deinterleaver may operate in the same manner. That is, the FI scheme to be used in the FSS is FI scheme #1, and the reset mode to be used in the FES may be in an off state.

Figure 73:
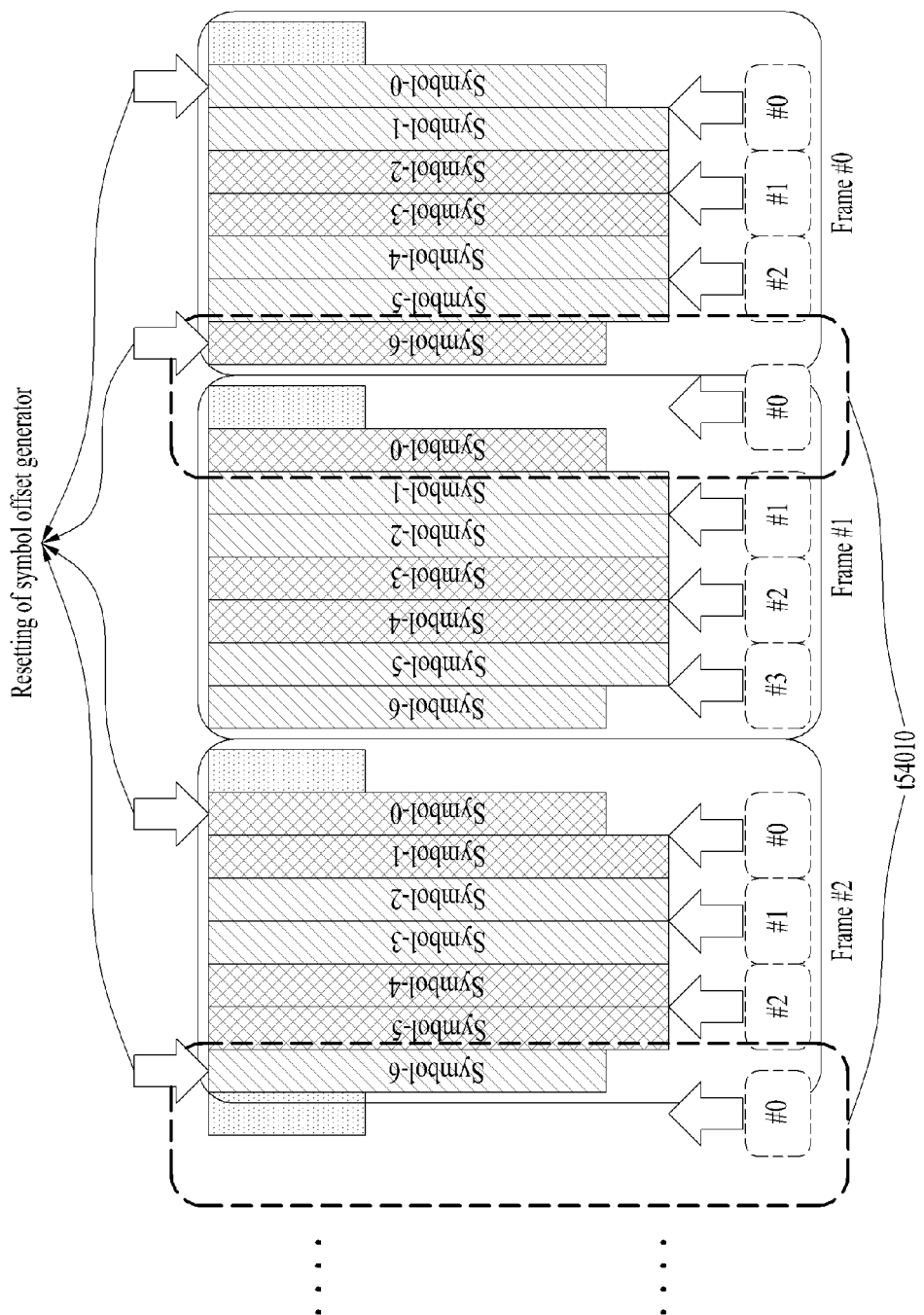
FIG. 73 illustrates an example in which the number of symbols is an odd number in signaling for single-memory deinterleaving irrespective of the number of symbols in a frame according to an embodiment of the present invention.

FIG. 73 illustrates an example in which the number of symbols is an odd number in signaling for single-memory deinterleaving irrespective of the number of symbols in a frame according to an embodiment of the present invention.

In the current embodiment, the N_sym field may indicate that the number of OFDM symbols in one frame is an odd number. The current embodiment assumes that one frame includes one preamble and seven OFDM symbols. According to another embodiment, bootstrap information may be further included in front of the preamble. The bootstrap information is not illustrated.

In the current embodiment, like the case in which the number of symbols is an even number, one frame may include one FSS and one FES. Here, it is assumed that the FSS and the FES have the same length. In addition, since information of the N_sym field is transmitted in the PLS part, the frequency deinterleaver may acquire the corresponding information after decoding the FSS. Furthermore, the current embodiment assumes that the N_sym field is completely decoded before operation on the FES is performed.

In the FSS of each frame, the value of the symbol offset generator may be reset to 0. Furthermore, in the FES of an arbitrary frame, the symbol offset generator may operate in a reset mode based on the values of the FI_mode field and the N_sym field. Accordingly, in the FES of the arbitrary frame, the value of the symbol offset generator may be reset or not reset to 0. These reset operations may be alternately performed on frames.

The symbol offset generator may be reset in the last symbol of the first frame, i.e., the FES. Accordingly, the interleaving sequence may be reset to sequence #0. As such, the frequency interleaver/deinterleaver may process the corresponding FES based on sequence #0 (t54010).

In the FSS of a subsequent frame, the symbol offset generator may be reset again and thus sequence #0 may be used (t54010). The symbol offset generator may not be reset in the FES of the second frame (frame #1), and may be reset again in the FES of the third frame (frame #2).

Figure 74:
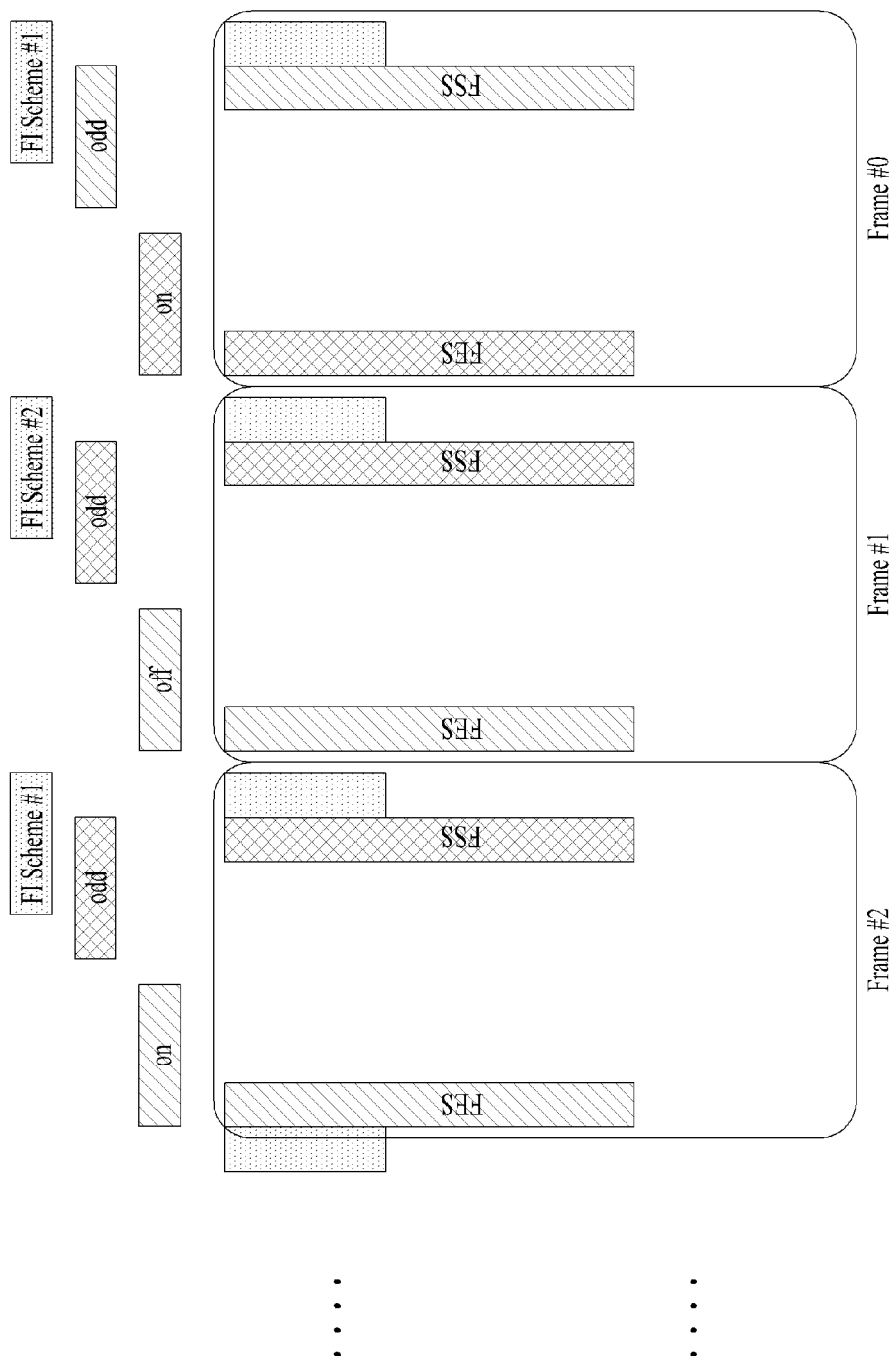
FIG. 74 illustrates an example in which the number of symbols is an odd number in signaling for single-memory deinterleaving irrespective of the number of symbols in a frame according to an embodiment of the present invention.

FIG. 74 illustrates an example in which the number of symbols is an odd number in signaling for single-memory deinterleaving irrespective of the number of symbols in a frame according to an embodiment of the present invention.

In the first frame, information about an interleaving scheme of the FSS may be acquired from the FI_mode field of the preamble. Since the number of OFDM symbols is an odd number, FI scheme #1 and FI scheme #2 may be used. In the current embodiment, FI scheme #1 is used in the first frame.

Then, the FSS may be decoded and thus N_sym information may be acquired. The N_sym information indicates that the number of symbols in the current frame is an odd number. After that, the acquired FI_mode information and the N_sym information may be used when the frequency deinterleaver decodes the FES. Since the number of symbols is an odd number and FI scheme#1 is used, the FI_mode field value is 0. Since the FI_mode is 0, the symbol offset generator may operate in the above-described reset mode. That is, the reset mode may be in an on state.

The symbol offset generator may operate in the reset mode and thus may be reset to 0. Since the FI_mode field value is 1 in the second frame, this indicates that the FSS is processed based on FI scheme #2. The N_sym field indicates that the number of symbols is an odd number. In the second frame, since the FI_mode field value is 1 and the number of symbols is an odd number, the symbol offset generator may not operate in the reset mode.

In this manner, the FI scheme to be used in the FSS may be alternately set to FI schemes #1 and #2. Furthermore, the reset mode to be used in the FES may be alternately set to be on and off. According to another embodiment, the settings may not be changed every frame.

Figure 75:
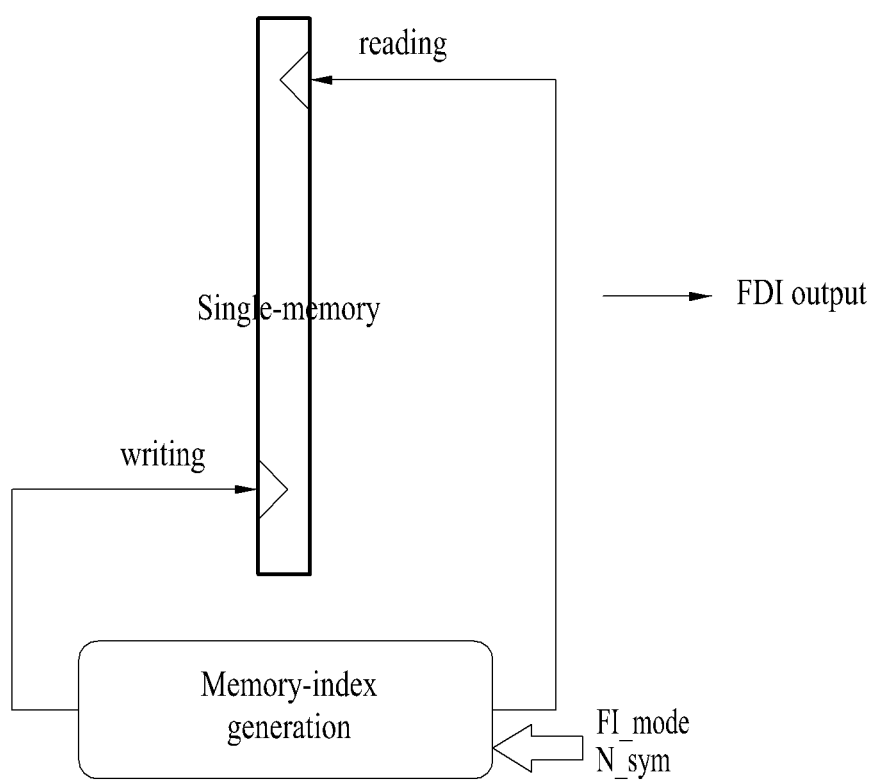
FIG. 75 illustrates operation of the frequency deinterleaver in signaling for single-memory deinterleaving irrespective of the number of symbols in a frame according to an embodiment of the present invention.

FIG. 75 illustrates operation of the frequency deinterleaver in signaling for single-memory deinterleaving irrespective of the number of symbols in a frame according to an embodiment of the present invention.

The frequency deinterleaver may perform frequency deinterleaving using information of the predefined FI_mode field and/or the N_sym field. As described above, the frequency deinterleaver may operate using a single memory. Basically, frequency deinterleaving may be inverse operation of the frequency interleaving operation performed by the transmitter, to restore the order of data.

As described above, frequency deinterleaving on the FSS may be performed based on information about the FI scheme which is acquired from the FI_mode field and the N_sym field of the preamble. Frequency deinterleaving on the FES may be performed based on information indicating whether to the reset mode operates, which is acquired using the FI_mode field and the N_sym field.

That is, on a pair of input OFDM symbols, the frequency deinterleaver may perform inverse operation of the reading/writing operation of the frequency interleaver. One interleaving sequence may be used in this operation.

However, as described above, the frequency interleaver follows the ping pong architecture using double memories, but the frequency deinterleaver may perform deinterleaving using a single memory. This single-memory frequency deinterleaving operation may be performed using information of the FI_mode field and the N_sym field. This information may allow single-memory frequency deinterleaving even on a frame having an odd number of OFDM symbols irrespective of the number of OFDM symbols.

The frequency interleaver according to the present invention may perform frequency interleaving on all data cells of the OFDM symbols. The frequency interleaver may map the data cells to available data carriers of the symbols.

The frequency interleaver according to the present invention may operate in different interleaving modes based on FFT size. For example, when the FFT size is 32K, the frequency interleaver may perform random writing/linear reading operation on an even symbol and perform linear writing/random reading operation on an odd symbol as in FI scheme #1 described above. Alternatively, when the FFT size is 16K or 8K, the frequency interleaver may perform linear reading/random writing operation on all symbols irrespective of an even/odd number.

The FFT size, which determines whether to switch the interleaving modes, may vary according to embodiments. That is, interleaving as in FI scheme #1 may be performed in the case of 32K and 16K, and interleaving irrespective of an even/odd number may be performed in the case of 8K. Alternatively, interleaving as in FI scheme #1 may be performed for all FFT sizes, or interleaving irrespective of an even/odd number may be performed for all FFT sizes. Otherwise, according to another embodiment, interleaving as in FI scheme #2 may be performed for a specific FFT size.

This frequency interleaving operation may be performed using the above-described interleaving sequence (interleaving address). The interleaving sequence may be variously generated using an offset value as described above. Alternatively, address check may be performed to generate various interleaving sequences.

Figure 76:
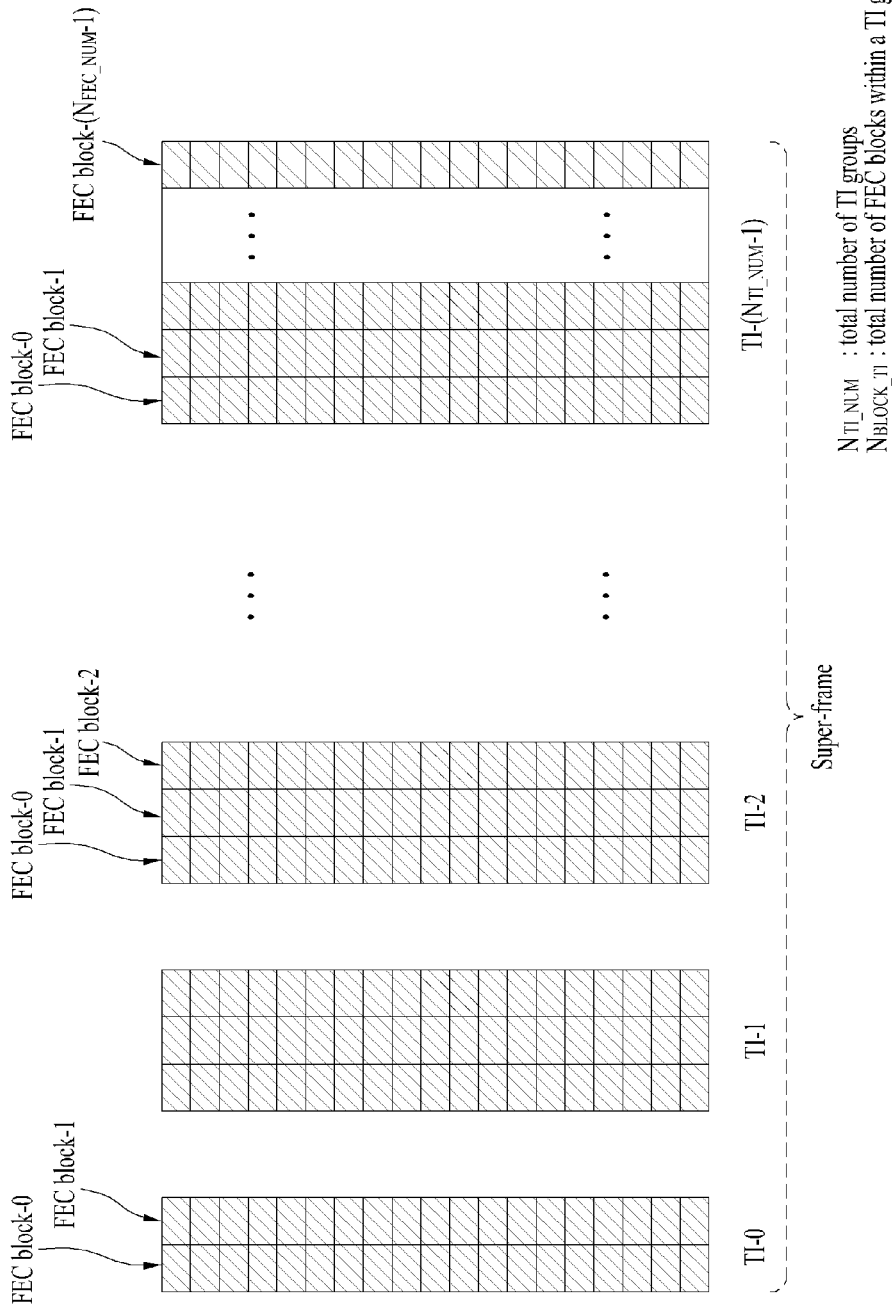
FIG. 76 illustrates the concept of a variable bit-rate system according to an embodiment of the present invention.

FIG. 76 illustrates the concept of a variable bit-rate system according to an embodiment of the present invention.

Specifically, a transport superframe, shown in FIG. 76, is composed of $N_{TI\_NUM}$ TI groups and each TI group can include $N_{BLOCK\_TI}$ FEC blocks. In this case, TI groups may respectively include different numbers of FEC blocks. The TI group according to an embodiment of the present invention can be defined as a block for performing time interleaving and can be used in the same meaning as the aforementioned TI block or IF. That is, one IF can include at least one TI block and the number of FEC blocks in the TI block is variable.

When TI groups include different numbers of FEC blocks, the present invention performs interleaving on the TI groups using one twisted row-column block interleaving rule in an embodiment. Accordingly, the receiver can perform deinterleaving using a single memory. A description will be given of an input FEC block memory arrangement method and reading operation of the time interleaver in consideration of variable bit-rate (VBR) transmission in which the number of FEC blocks can be changed per TI group.

Figure 77:
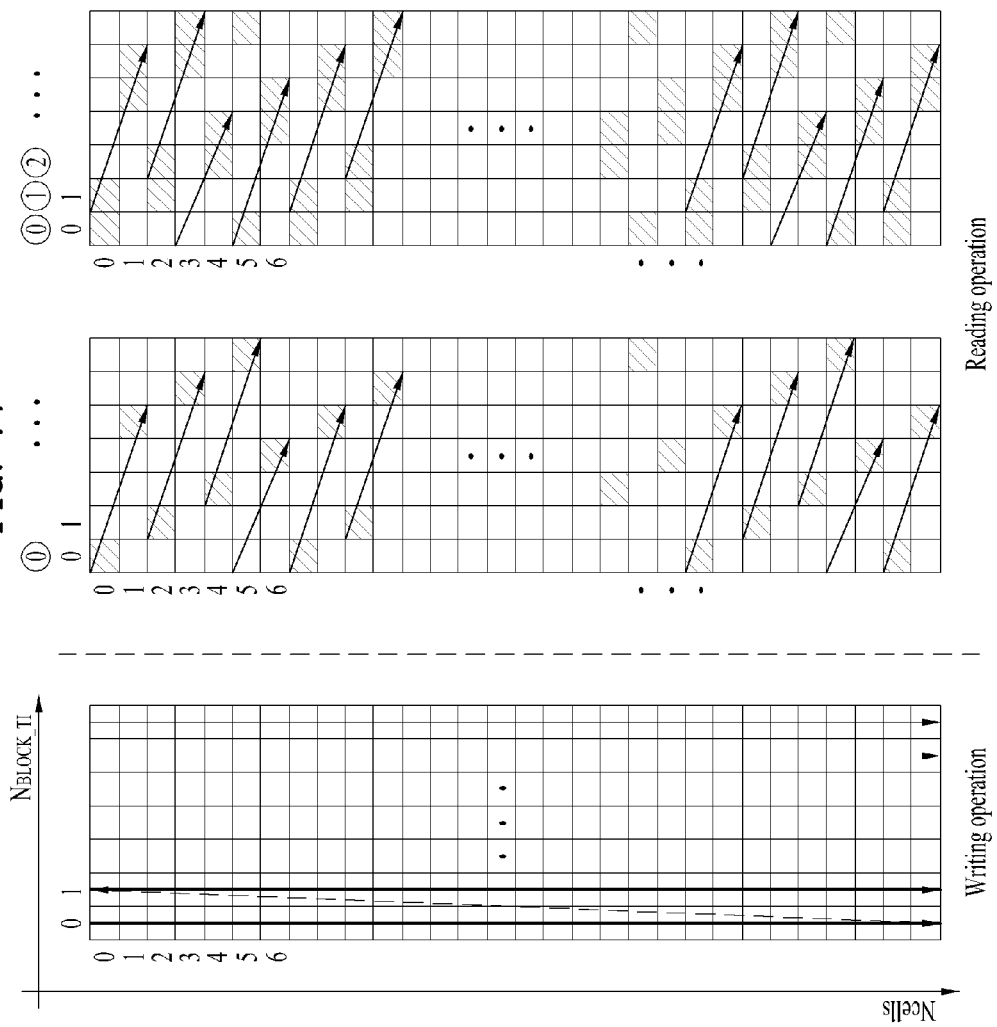
FIG. 77 illustrates writing and reading operations of block interleaving according to an embodiment of the present invention.

FIG. 77 illustrates writing and reading operations of block interleaving according to an embodiment of the present invention. Detailed descriptions about this figure was described before.

FIG. 78 shows equations representing block interleaving according to an embodiment of the present invention.

The equations shown in the figure represent block interleaving applied per TI group. As expressed by the equations, shift values can be respectively calculated in a case in which the number of FEC blocks included in a TI group is an odd number and a case in which the number of FEC blocks included in a TI group is an even number. That is, block interleaving according to an embodiment of the present invention can calculate a shift value after making the number of FEC blocks be an odd-number.

A time interleaver according to an embodiment of the present invention can determine parameters related to interleaving on the basis of a TI group having a maximum number of FEC blocks in the corresponding superframe. Accordingly, the receiver can perform deinterleaving using a single memory. Here, for a TI group having a smaller number of FEC blocks than the maximum number of FEC blocks, virtual FEC blocks corresponding to a difference between the number of FEC blocks and the maximum number of FEC blocks can be added.

Virtual FEC blocks according to an embodiment of the present invention can be inserted before actual FEC blocks. Subsequently, the time interleaver according to an embodiment of the present invention can perform interleaving on the TI groups using one twisted row-column block interleaving rule in consideration of the virtual FEC blocks. In addition, the time interleaver according to an embodiment of the present invention can perform the aforementioned skip operation when a memory-index corresponding to virtual FEC blocks is generated during reading operation. In the following writing operation, the number of FEC blocks of input TI groups is matched to the number of FEC blocks of output TI groups. Consequently, according to time interleaving according to an embodiment of the present invention, loss of data rate of data actually transmitted may be prevented through skip operation even if virtual FEC blocks are inserted in order to perform efficient single-memory deinterleaving in the receiver.

FIG. 79 illustrates virtual FEC blocks according to an embodiment of the present invention.

The left side of the figure shows parameters indicating a maximum number of FEC blocks in a TI group, the actual number of FEC blocks included in a TI group and a difference between the maximum number of FEC blocks and the actual number of FEC blocks, and equations for deriving the number of virtual FEC blocks.

The right side of the figure shows an embodiment of inserting virtual FEC blocks into a TI group. In this case, the virtual FEC blocks can be inserted before actual FEC blocks, as described above.

FIG. 80 shows equations representing reading operation after insertion of virtual FEC blocks according to an embodiment of the present invention.

Skip operation illustrated in the figure can skip virtual FEC blocks in reading operation.

Figure 81:
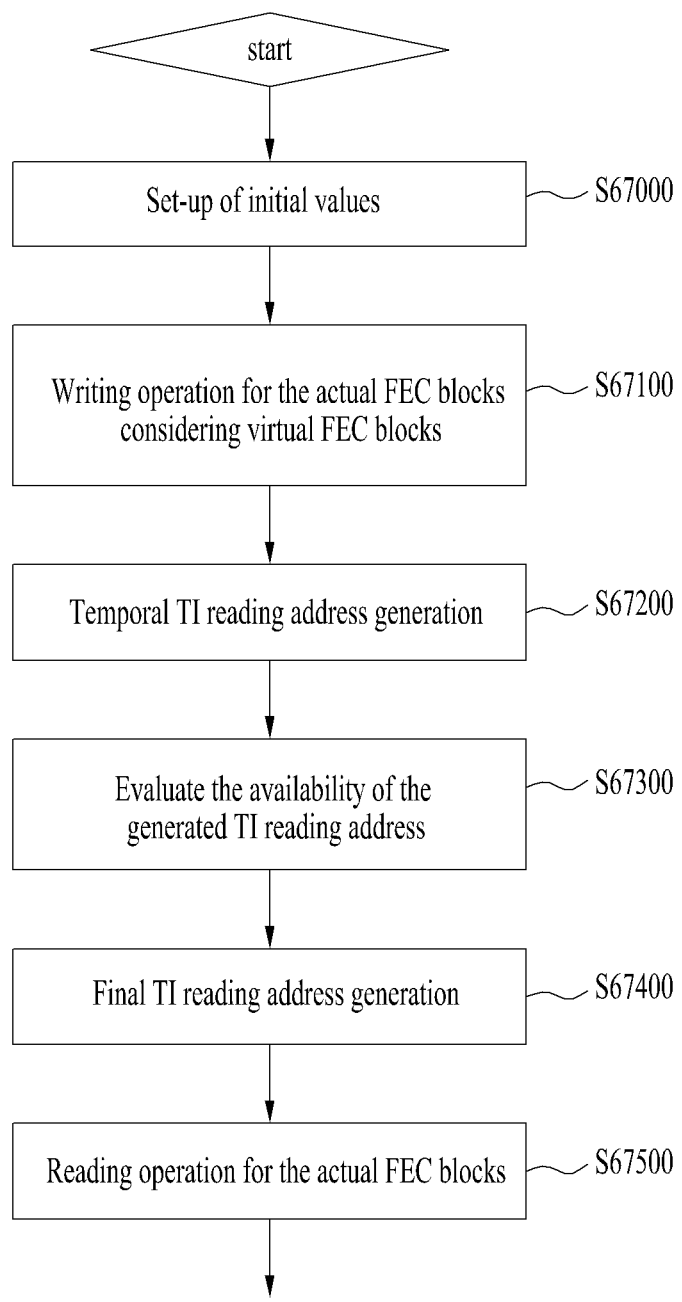
FIG. 81 is a flowchart illustrating a time interleaving process according to an embodiment of the present invention.

FIG. 81 is a flowchart illustrating a time interleaving process according to an embodiment of the present invention.

A time interleaver according to an embodiment of the present invention can setup initial values (S67000).

Then, the time interleaver according to an embodiment of the present invention can perform writing operation on actual FEC blocks in consideration of virtual FEC blocks (S67100).

The time interleaver according to an embodiment of the present invention can generate a temporal TI address (S67200).

Subsequently, the time interleaver according to an embodiment of the present invention can evaluate the availability of the generated TI reading address (S67300). Then, the time interleaver according to an embodiment of the present invention can generate a final TI reading address (S67400).

The time interleaver according to an embodiment of the present invention can read the actual FEC blocks (S67500).

FIG. 82 shows equations representing a process of determining a shift value and a maximum TI block size according to an embodiment of the present invention.

The figure shows an embodiment in which the number of TI groups is 2, the number of cells in a TI group is 30, the number of FEC blocks included in the first TI group is 5 and the number of FEC blocks included in the second TI block is 6. While a maximum number of FEC blocks is 6, 6 is an even number. Accordingly, a maximum number of FEC blocks, which is adjusted in order to obtain the shift value, can be 7 and the shift value can be calculated as 4.

Figure 83:
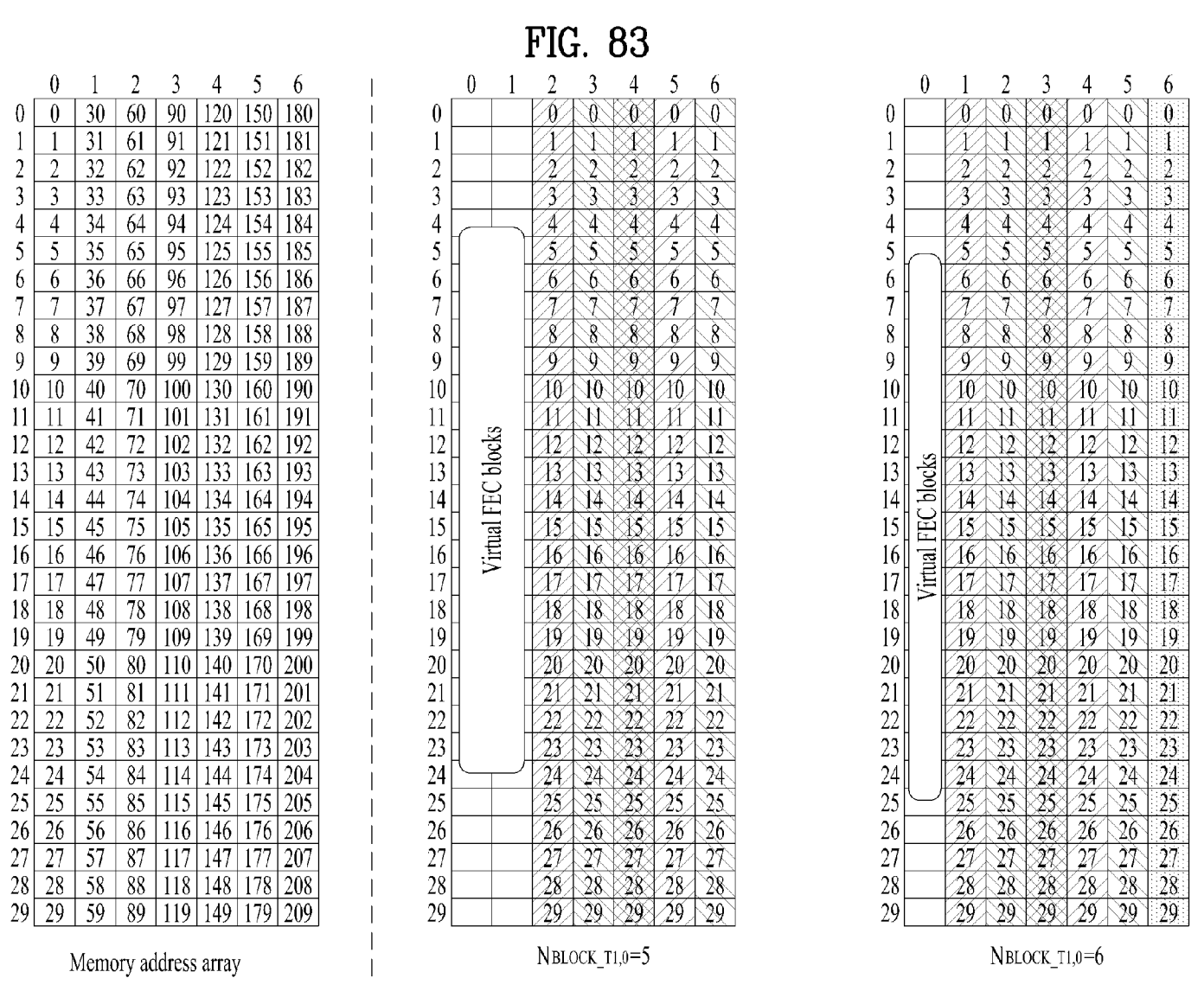
Figure 84:
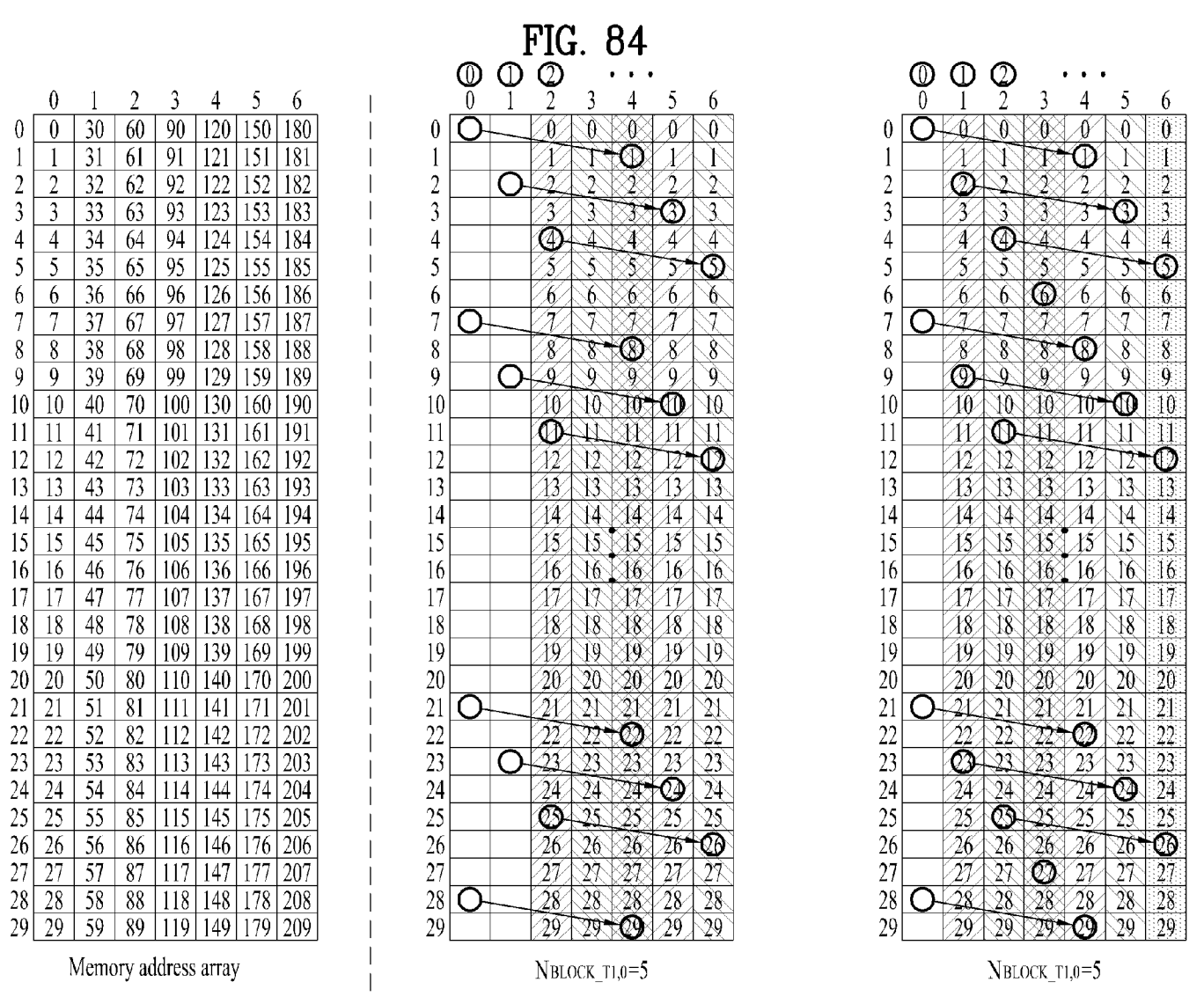

FIGS. 83 to 85 illustrate a TI process of the embodiment described before.

FIG. 83 illustrates writing operation according to an embodiment of the present invention.

FIG. 83 shows writing operation for the two TI groups described before.

A block shown in the left side of the figure represents a TI memory address array and blocks shown in the right side of the figure illustrate writing operation when two virtual FEC blocks and one virtual FEC block are respectively inserted into two continuous TI groups. Since the adjusted maximum number of FEC blocks is 7, as described above, two virtual FEC blocks are inserted into the first TI group and one virtual FEC block is inserted into the second TI group.

FIG. 84 illustrates reading operation according to an embodiment of the present invention.

A block shown in the left side of the figure represents a TI memory address array and blocks shown in the right side of the figure illustrate reading operation when two virtual FEC blocks and one virtual FEC block are respectively inserted into two continuous TI groups. In this case, reading operation can be performed on the virtual FEC blocks in the same manner as the reading operation performed on actual FEC blocks.

FIG. 85 illustrates a result of skip operation in reading operation according to an embodiment of the present invention.

As shown in the figure, virtual FEC blocks can be skipped in two TI groups.

Figure 86:
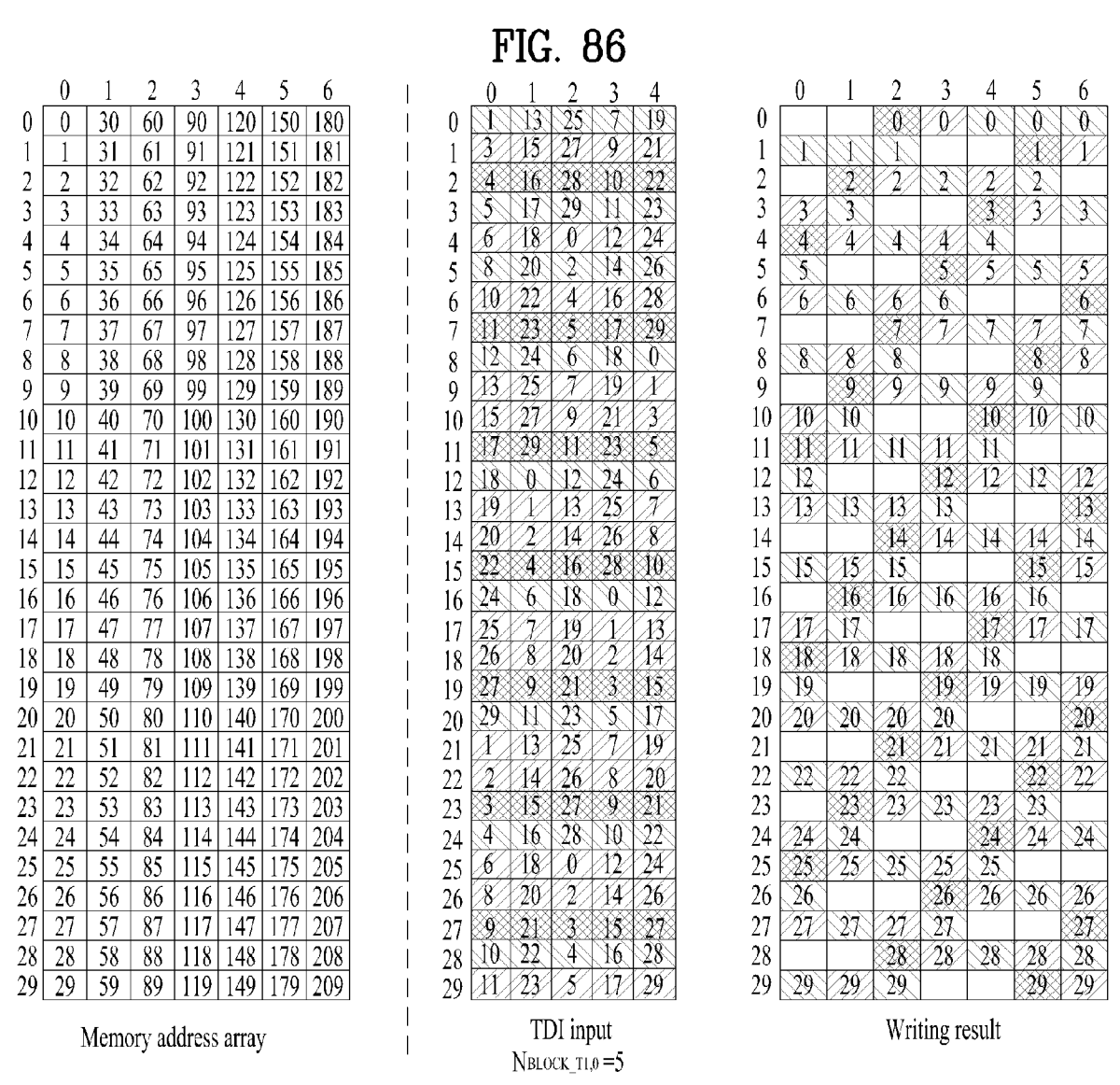
Figure 87:
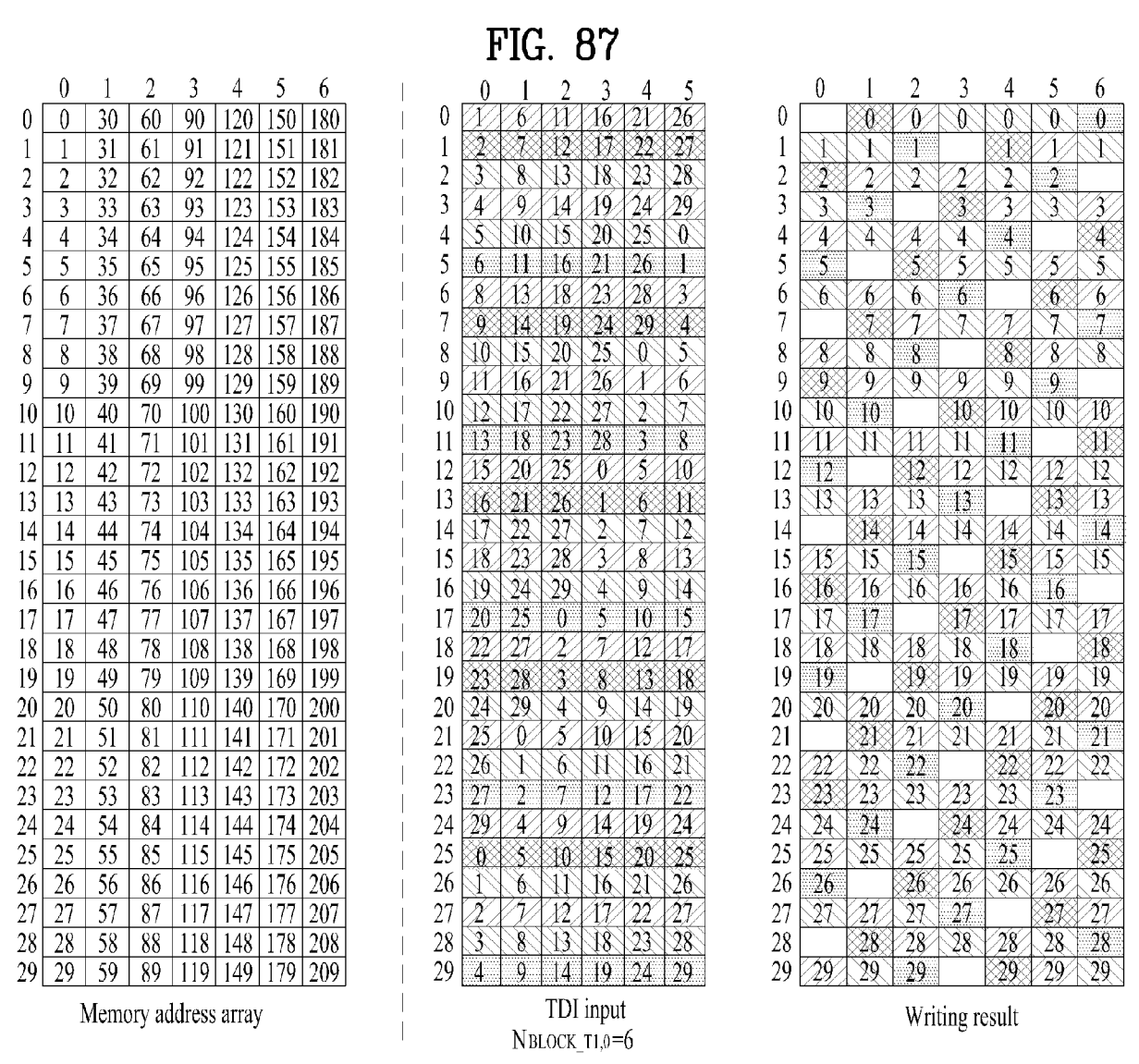

FIGS. 86 to 88 illustrate time deinterleaving corresponding to a reverse of TI described before.

Specifically, FIG. 86 illustrates time deinterleaving for the first TI group and FIG. 87 illustrates time deinterleaving for the second TI group.

FIG. 86 shows a writing process of time deinterleaving according to an embodiment of the present invention.

A left block in the figure shows a TI memory address array, a middle block shows the first TI group input to a time deinterleaver and a right block shows a writing process performed in consideration of virtual FEC blocks that are skipped with respect to the first TI group.

As shown in the figure, two virtual FEC blocks skipped during TI can be restored for correct reading operation in the writing process. In this case, the positions and quantity of the skipped two virtual FEC blocks can be estimated through an arbitrary algorithm.

FIG. 87 illustrates a writing process of time deinterleaving according to another embodiment of the present invention.

A left block in the figure shows a TI memory address array, a middle block shows the second TI group input to the time deinterleaver and a right block shows a writing process performed in consideration of virtual FEC blocks that are skipped with respect to the second TI group.

As shown in the figure, one virtual FEC block skipped during TI can be restored for correct reading operation in the writing process. In this case, the position and quantity of the skipped one virtual FEC block can be estimated through an arbitrary algorithm.

FIG. 88 shows equations representing reading operation of time deinterleaving according to another embodiment of the present invention.

A TDI shift value used in the receiver can be determined by a shift value used in the transmitter, and skip operation can skip virtual FEC blocks in reading operation, similarly to skip operation performed in the transmitter.

Figure 89:
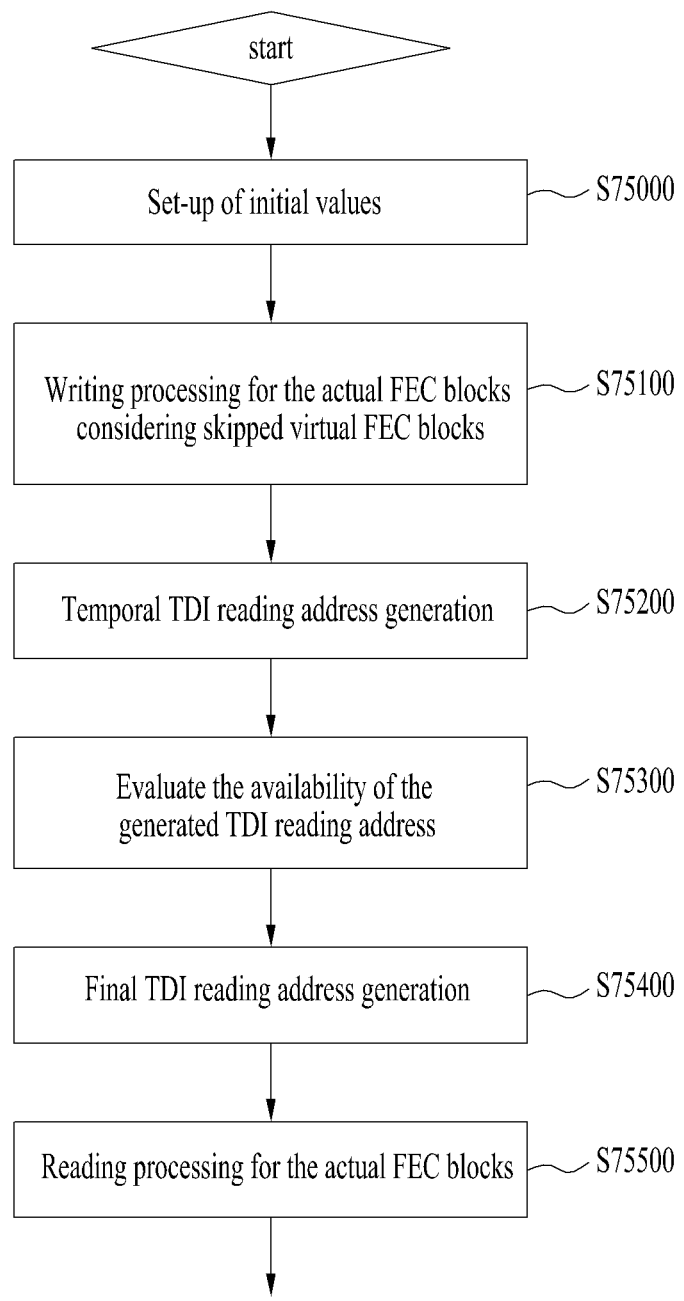
FIG. 89 is a flowchart illustrating a time deinterleaving process according to an embodiment of the present invention.

FIG. 89 is a flowchart illustrating a time deinterleaving process according to an embodiment of the present invention.

A time deinterleaver according to an embodiment of the present invention can setup initial values (S75000).

Then, the time deinterleaver according to an embodiment of the present invention can perform writing operation on actual FEC blocks in consideration of virtual FEC blocks (S75100).

Subsequently, the time deinterleaver according to an embodiment of the present invention can generate a temporal TDI reading address (S75200).

The time deinterleaver according to an embodiment of the present invention can evaluate the availability of the generated TDI reading address (S75300). Then, the time deinterleaver according to an embodiment of the present invention can generate a final TDI reading address (S75400).

Subsequently, the time deinterleaver according to an embodiment of the present invention can read the actual FEC blocks (S75500).

Features, structures, effects, etc. previously described in connection with the embodiments are included in at least one embodiment of the present invention and not necessarily in only one embodiment. Furthermore, the features, structures, effects, etc. of each embodiment of the present invention may be combined in any suitable manner with one or more other embodiments or may be changed by those skilled in the art to which the embodiments pertain. Therefore, it is to be understood that contents associated with such combination or change fall within the scope of the present invention.

Although the present invention has been described with reference to embodiments thereof, the embodiments are therefore to be construed in all aspects as illustrative and not restrictive. It should be understood that numerous other modifications and applications may be devised by those skilled in the art that will fall within the intrinsic aspects of the embodiments. For example, various variations and modifications are possible in concrete constituent elements of the embodiments. In addition, it is to be understood that differences relevant to the variations and modifications fall within the scope of the present invention defined in the appended claims.

MODE FOR INVENTION

Various embodiments have been described in the best mode for carrying out the invention.

INDUSTRIAL APPLICABILITY

The present invention is used in fields in which broadcast signals are provided.

Various equivalent modifications are possible within the spirit and scope of the present invention, as those skilled in the relevant art will recognize and appreciate. Accordingly, it is intended that the present invention cover the modifications and variations of this invention provided they come within the scope of the appended claims and their equivalents.

The invention claimed is:

1. A method of transmitting a broadcast signal, the method comprising:
generating, by a broadcast transmitter, service data of a service and service signaling information for acquiring the service and components of the service;
generating, by the broadcast transmitter, signaling data for rapid service scan by acquisition of basic service information, the signaling data including:
a first service identifier uniquely identifying the service,
a service category which indicates a category of the service, and
protection information indicating whether or not a component of the service is protected;
encoding, by the broadcast transmitter, physical layer pipes (PLPs) carrying the service data and the service signaling information, the encoded PLPs carrying the signaling data; and
transmitting, by the broadcast transmitter, a broadcast signal carrying a signal frame carrying the encoded PLPs,
wherein the signaling data further includes location information for locating the service signaling information, and
wherein the service signaling information includes a second service identifier referencing to the first service identifier for linking the service described in the service signaling information to the service described in the signaling data.

2. The method of claim 1, wherein the signaling data is transmitted in link layer signaling data.

3. The method of claim 1, further comprising:
frequency interleaving, by the broadcast transmitter, data in the signal frame based on a sequence used for every pair of orthogonal frequency division multiplexing (OFDM) symbols comprised of two consecutive OFDM symbols.

4. An apparatus for transmitting a broadcast signal, the apparatus comprising:
a processor configured to:
generate service data of a service and service signaling information for acquiring the service and components of the service,
generate signaling data for rapid service scan by acquisition of basic service information, the signaling data including:
a first service identifier uniquely identifying the service,
a service category which indicates a category of the service, and
protection information indicating whether or not a component of the service is protected, and
encode physical layer pipes (PLPs) carrying the service data and the service signaling information, the encoded PLPs carrying the signaling data; and
a transceiver configured to transmit a broadcast signal carrying a signal frame carrying the encoded PLPs,
wherein the signaling data further includes location information for locating the service signaling information, and
wherein the service signaling information includes a second service identifier referencing to the first service identifier for linking the service described in the service signaling information to the service described in the signaling data.

5. The apparatus of claim 4, wherein the signaling data is transmitted in link layer signaling data.

6. The apparatus of claim 4, wherein the processor is further configured to frequency interleave data in the signal frame based on a sequence used for every pair of orthogonal frequency division multiplexing (OFDM) symbols pair comprised of two consecutive OFDM symbols.

7. A method of receiving a broadcast signal, the method comprising:
    receiving, by a broadcast receiver, a broadcast signal carrying a signal frame carrying physical layer pipes (PLPs), the PLPs carrying service data of a service, service signaling information for acquiring the service and components of the service, and signaling data for rapid service scan by acquisition of basic service information, wherein the signaling data includes:
        a first service identifier uniquely identifying the service,
        a service category which indicates a category of the service, and
        protection information indicating whether or not a component of the service is protected;
    parsing and decoding, by the broadcast receiver, the signaling data from the received broadcast signal, wherein the signaling data further includes location information for locating the service signaling information;
    parsing and decoding, by the broadcast receiver, the service signaling information from the received broadcast signal using the location information in the signaling data, wherein the service signaling information includes a second service identifier referencing to the first service identifier for linking the service described in the service signaling information to the service described in the signaling data; and
    parsing and decoding, by the broadcast receiver, the service data of the service from the received broadcast signal using the second signaling information.

8. The method of claim 7, wherein the signaling data is received in link layer signaling data.

9. The method of claim 7, wherein data in the signal frame is frequency interleaved based on a sequence used for every pair of orthogonal frequency division multiplexing (OFDM) symbols comprised of two consecutive OFDM symbols.

10. An apparatus for receiving a broadcast signal, the apparatus comprising:
    a transceiver configured to receive a broadcast signal carrying a signal frame carrying physical layer pipes (PLPs), the PLPs carrying service data of a service, service signaling information for acquiring the service and components of the service, and signaling data for rapid service scan by acquisition of basic service information, wherein the signaling data includes:
        a first service identifier uniquely identifying the service,
        a service category which indicates a category of the service, and
        protection information indicating whether or not a component of the service is protected; and
    a processor configured to:
        parse and decode the signaling data from the received broadcast signal, wherein the wherein the signaling data further includes location information for locating the service signaling information,
        parse and decode the service signaling information from the received broadcast signal using the location information in the signaling data, wherein the service signaling information includes a second service identifier referencing to the first service identifier for linking the service described in the service signaling information to the service described in the signaling data, and
        parse and decode the service data of the service from the received broadcast signal using the second signaling information.

11. The apparatus of claim 10, wherein the signaling data is received in link layer signaling data.

12. The apparatus of claim 10, wherein data in the signal frame is frequency interleaved based on a sequence used for every pair of orthogonal frequency division multiplexing (OFDM) symbols comprised of two consecutive OFDM symbols.

* * * * *